United States Patent
Wakai

(10) Patent No.: US 7,904,837 B2
(45) Date of Patent: Mar. 8, 2011

(54) INFORMATION PROCESSING APPARATUS AND GUI COMPONENT DISPLAY METHOD FOR PERFORMING DISPLAY OPERATION ON DOCUMENT DATA

(75) Inventor: Masanori Wakai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 749 days.

(21) Appl. No.: 11/465,201

(22) Filed: Aug. 17, 2006

(65) Prior Publication Data

US 2007/0052685 A1   Mar. 8, 2007

(30) Foreign Application Priority Data

Sep. 8, 2005 (JP) ................................. 2005-261126

(51) Int. Cl.
*G06F 17/26* (2006.01)
*G06F 17/27* (2006.01)
*G06F 17/28* (2006.01)
*G06F 3/048* (2006.01)
*G06F 3/00* (2006.01)

(52) U.S. Cl. ......... 715/863; 715/253; 715/268; 715/277; 715/763; 715/800; 715/810

(58) Field of Classification Search .................. 715/863, 715/810, 800, 763, 277, 268, 253
See application file for complete search history.

(56) References Cited

U.S. PATENT DOCUMENTS

| | | | | |
|---|---|---|---|---|
| 7,028,900 B2* | 4/2006 | Capozzi et al. | ........... | 235/462.01 |
| 7,526,129 B2* | 4/2009 | Bargeron | .................... | 382/179 |
| 7,581,194 B2* | 8/2009 | Iwema et al. | .................. | 715/810 |
| 7,703,001 B2* | 4/2010 | Takaai et al. | ................... | 715/232 |
| 7,717,712 B2* | 5/2010 | Brun et al. | ...................... | 434/156 |
| 7,787,712 B2* | 8/2010 | Takahashi et al. | ............ | 382/305 |
| 7,831,933 B2* | 11/2010 | Marggraff et al. | ............ | 715/863 |
| 2004/0139398 A1* | 7/2004 | Testa et al. | ..................... | 715/517 |
| 2005/0046878 A1* | 3/2005 | Kido | .............................. | 358/1.2 |
| 2005/0275638 A1* | 12/2005 | Kolmykov-Zotov et al. | . | 345/179 |
| 2006/0047639 A1* | 3/2006 | King et al. | ......................... | 707/3 |
| 2007/0098263 A1* | 5/2007 | Furukawa et al. | ............ | 382/181 |

FOREIGN PATENT DOCUMENTS

| | | |
|---|---|---|
| CN | 1525358 | 9/2004 |
| JP | 2004-342024 A | 2/2004 |
| WO | WO2005038648 A1 | 4/2005 |

OTHER PUBLICATIONS

NPL Reference U: Microsoft Power Point—Snag it Screen Show—Copyright 2003.*

* cited by examiner

*Primary Examiner* — Doug Hutton
*Assistant Examiner* — Soumya Dasgupta
(74) *Attorney, Agent, or Firm* — Canon U.S.A., Inc. I.P. Division

(57) ABSTRACT

An information processing apparatus includes an interpretation unit configured to interpret a command written on computerized document data, a creation unit configured to create a graphical user interface (GUI) component used to perform execution of the command interpreted by the interpretation unit, and a display control unit configured to cause a display apparatus to display document data corresponding to target data that represents a target of the execution and to display the created GUI component at a position corresponding to the command written on the document data.

3 Claims, 44 Drawing Sheets

GUI COMPONENT DATA

| FUNCTION | RELATIVE DISPLAY POSITION AND SIZE |
|---|---|
| PRINT | (70,10),(90,25) |

~71

FIG.10
HANDWRITTEN COMMAND DEFINITION DATA
| STROKE | COMMAND | GUI COMPONENT |
|---|---|---|
|  | PRINT | 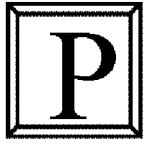 ~101 |
|  | REPRODUCTION | 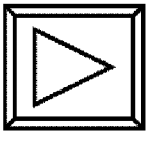 |
|  | NEXT PAGE | 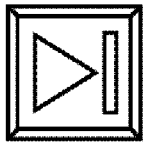 |
|  | SOUND-VOLUME CHANGE | 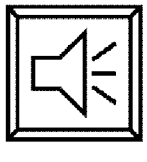 |
|  | TRANSMISSION | 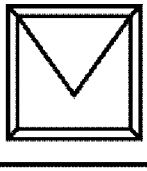 |

GUI COMPONENT DATA

| FUNCTION | RELATIVE DISPLAY POSITION AND SIZE | INSTRUCTION TARGET |
|---|---|---|
| REPRODUCTION | (50,85),(60,95) | MOVING IMAGE OBJECT 173 |

EXECUTABLE PROCESS DEFINITION DATA

| KINDS OF INSTRUCTION TARGET | EXECUTABLE PROCESSES | |
|---|---|---|
| MOVING IMAGE | PRINT, REPRODUCTION, SOUND-VOLUME CHANGE, TRANSMISSION | ~201 |
| STILL IMAGE | PRINT, TRANSMISSION | ~202 |
| SCANNED DOCUMENT ITSELF | PRINT, NEXT PAGE, TRANSMISSION | ~203 |

GUI COMPONENT DATA

| FUNCTION | RELATIVE DISPLAY POSITION AND SIZE | INSTRUCTION TARGET |
|---|---|---|
| NEXT PAGE | (50,85),(60,95) | SCANNED DOCUMENT ITSELF 231 |

241

GUI COMPONENT DATA

| FUNCTIONS | RELATIVE DISPLAY POSITION AND SIZE | INSTRUCTION TARGETS | |
|---|---|---|---|
| REPRODUCTION | (50,55),(60,65) | MOVING IMAGE OBJECT 263 | ~271 |
| REPRODUCTION | (60,85),(70,95) | MOVING IMAGE OBJECT 263 | ~272 |

GUI COMPONENT DATA

| FUNCTIONS | RELATIVE DISPLAY POSITION AND SIZE | INSTRUCTION TARGETS | |
|---|---|---|---|
| REPRODUCTION | (50,55),(60,65) | MOVING IMAGE OBJECT 263 | 271 |
| SOUND-VOLUME CHANGE | (60,85),(70,95) | MOVING IMAGE OBJECT 263 | 301 |

GUI COMPONENT DATA

| FUNCTIONS | RELATIVE DISPLAY POSITION AND SIZE | INSTRUCTION TARGETS | |
|---|---|---|---|
| REPRODUCTION | (50,55),(60,65) | MOVING IMAGE OBJECT 263 | 271 |
| NEXT PAGE | (60,85),(70,95) | SCANNED DOCUMENT ITSELF 261 | 351 |

FIG.38

GUI COMPONENT DATA

| ID | FUNCTIONS | RELATIVE DISPLAY POSITION AND SIZE | SCANNED DOCUMENT ID | INSTRUCTION TARGETS |
|---|---|---|---|---|
| 112 | REPRODUCTION | (50,55),(60,65) | file021 | MOVING IMAGE OBJECT 263 |
| 115 | NEXT PAGE | (60,85),(70,95) | file021 | SCANNED DOCUMENT ITSELF 261 |
| ⋮ | ⋮ | ⋮ | ⋮ | ⋮ |

~382

GUI COMPONENT DATA

| FUNCTIONS | RELATIVE DISPLAY POSITION AND SIZE | INSTRUCTION TARGET | OPERATIONS |
|---|---|---|---|
| TRANSMISSION | (70,10),(90,25) | SCANNED DOCUMENT ITSELF 261 | "Yamada" |

441

INFORMATION PROCESSING APPARATUS AND GUI COMPONENT DISPLAY METHOD FOR PERFORMING DISPLAY OPERATION ON DOCUMENT DATA

BACKGROUND OF THE INVENTION

1. Field of the Invention

The present invention relates to an information processing apparatus and to a graphical user interface (GUI) component display method for performing a display operation on document data.

2. Description of the Related Art

Hitherto, there has been an information processing apparatus having a handwriting input unit, such as a personal computer (PC) with a digitizer, a personal digital assistance (PDA), or a large screen display device. In such an information processing apparatus, generally, a GUI displayed on a screen is operated using a keyboard or a mouse. One such information processing apparatus has a function of giving a GUI an instruction to execute a handwritten input command. Such an information processing apparatus is used in a conference system.

For example, Japanese Patent Application Laid-Open No. 2004-342024 discusses an apparatus adapted to draw graphics, input characters, and select items on the screen of a monitor by tracing graphics or characters with a pen-type indicating device, such as a stylus pen, on a tablet.

Also, related techniques of performing presentations at conferences using data computerized by scanning general documentation or documents have been developed. For example, in a case where a presentation is performed according to a related technique using document data obtained by scanning a document, a presenter may take time to select an instruction indicating an operation to perform. Also, there is a demand for displaying an image represented by the document data by enlarging the displayed image as much as possible.

SUMMARY OF THE INVENTION

An aspect of the present invention is to overcome the above-described problems, and is, for example, to enhance operability with respect to document data representing an image of a document, which is currently displayed.

According to an aspect of the present invention, an information processing apparatus includes an interpretation unit configured to interpret a command written on computerized document data, a creation unit configured to create a graphical user interface component used to perform execution of the command interpreted by the interpretation unit, and a display control unit configured to cause a display apparatus to display document data corresponding to target data that represents a target of the execution and to display the graphical user interface component at a position corresponding to the command written on the document data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

FIG. 10 is a table illustrating an example of handwritten command definition data.

FIG. 20 is a table illustrating an example of executable process definition data.

FIG. 38 is a table illustrating an example of data concerning a GUI component displayed in the display apparatus according to the fourth exemplary embodiment.

DETAILED DESCRIPTION OF THE EMBODIMENTS

Exemplary embodiments of the invention will be described in detail below with reference to the drawings.

Figure 1:
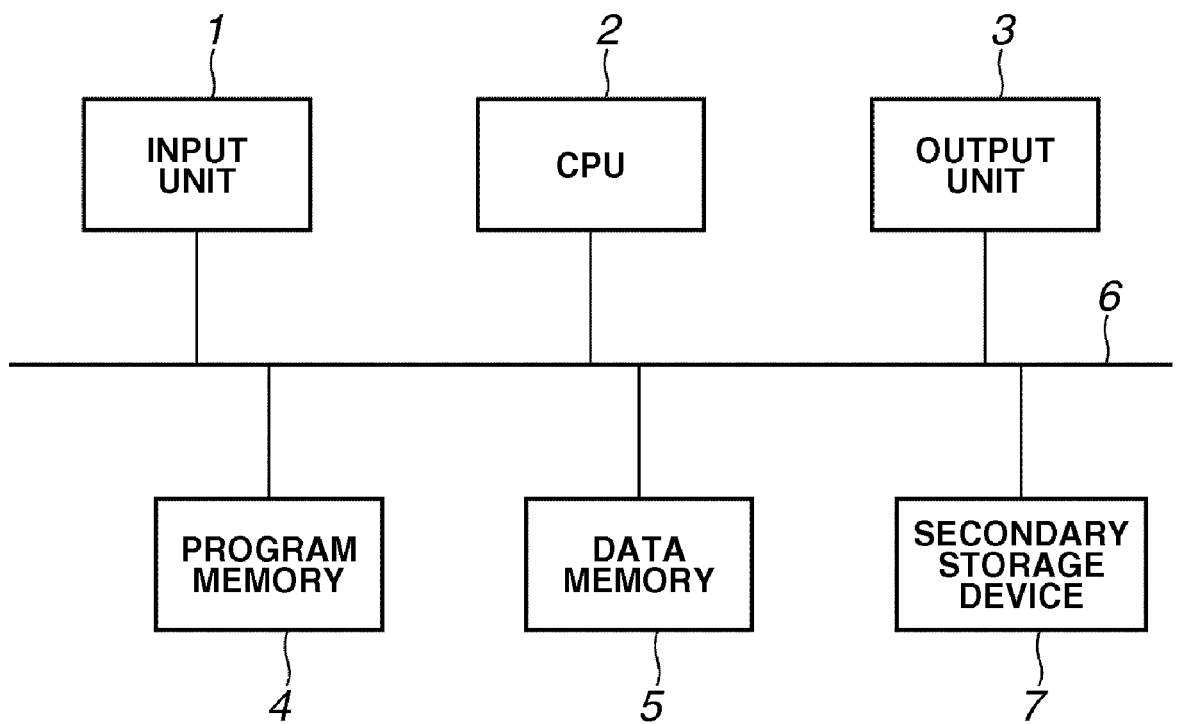
FIG. 1 is a block diagram illustrating an exemplary hardware configuration of a display apparatus.

FIG. 1 is a block diagram illustrating an exemplary hardware configuration of a display apparatus serving as an information processing apparatus.

An input unit 1 shown in FIG. 1 receives, via a network, document data representing a document scanned by a multifunction peripheral. A central processing unit (CPU) 2 performs computations and logical determinations for various kinds of processing. The CPU 2 controls each component of the display apparatus connected to a bus 6. The CPU 2 also provides functions, which will be described later, and performs processes, which will be described in flowcharts, according to programs stored in a program memory 4 that will be described later.

An output unit 3 outputs data. The output unit 3 is a display device, such as a liquid crystal display (LCD) or a cathode ray tube (CRT). The program memory 4 stores programs and may be either a read-only memory (ROM) or a random access memory (RAM) to which programs are loaded from external storage devices or media.

A data memory 5 stores data generated in various processes. Examples of electronic data to be stored in the data memory 5 are data representing a document scanned as will be described later, GUI component data representing a GUI component associated with the scanned document, data representing a document from which a handwritten command is removed, and registration data. The data memory 5 is, for example, a RAM. A secondary storage device 7 is a nonvolatile storage device, such as a hard disk drive device. The data memory 5 is adapted to be preliminarily loaded with data, which is necessary for processing, from the secondary storage device 7 before the processing. Alternatively, the data memory 5 refers to data stored in the secondary storage device 7 each time when the data is needed. The bus 6 transfers an address signal designating each component to be controlled by the CPU 2, a control signal used by the CPU 2 to control each component, and data transferred between the components.

Figure 2:
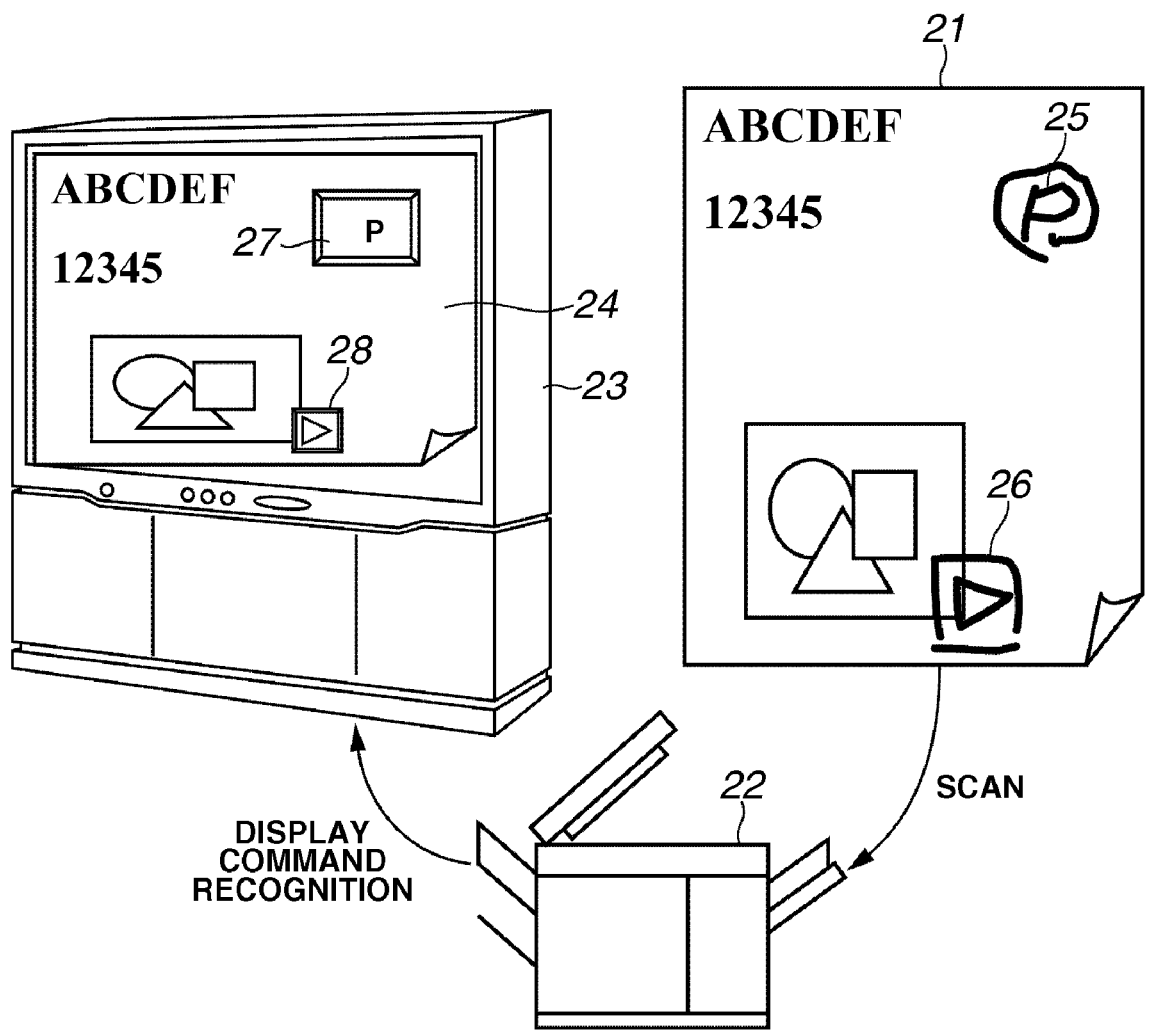
FIG. 2 is a block diagram illustrating an exemplary configuration of a display system.

FIG. 2 is a block diagram illustrating an exemplary configuration of a display system.

As shown in FIG. 2, a paper document 21 is scanned by an image forming apparatus 22 (the multifunction peripheral). Scanned document data 24 serving as computerized document data corresponding to the paper document 21 is displayed on the screen of a display apparatus 23. Also, as shown in FIG. 2, results of recognition of handwritten commands 25 and 26 written on the document 21 are displayed as GUI components 27 and 28 operable on the screen of the display apparatus 23. The GUI components 27 and 28 correspond to the handwritten commands 25 and 26, respectively. According to the present exemplary embodiment, a GUI is a graphical user interface that is visually represented and that enables a user (operator) to intuitively perform operations using a pointing device or the like.

Figure 3:
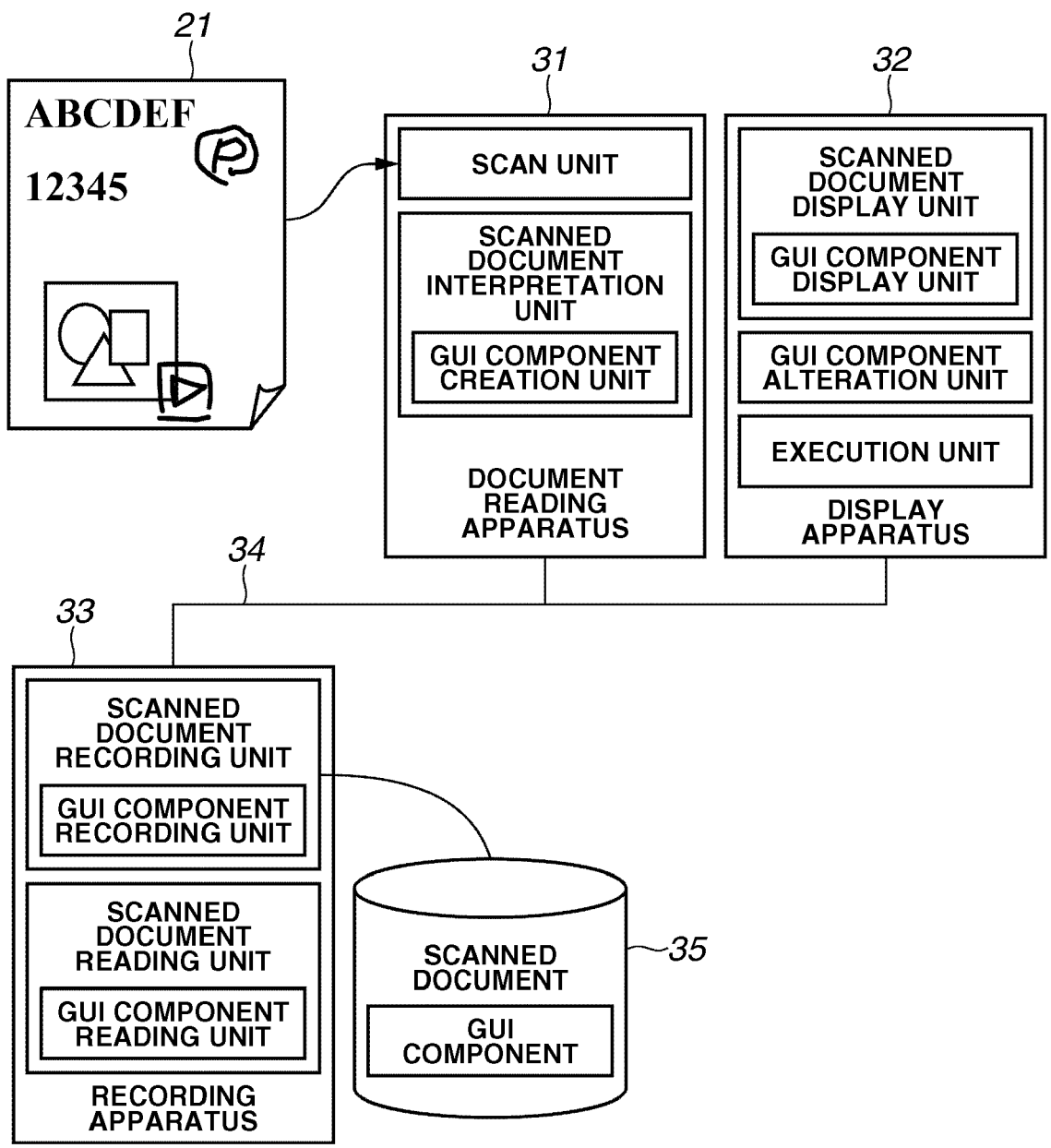
FIG. 3 is a block diagram illustrating an exemplary functional configuration of the display system.

FIG. 3 is a block diagram illustrating the functional configuration of the display system illustrated in FIG. 2. FIG. 3 shows an example of dividing the image system according to functions into a document reading apparatus 31, a display apparatus 32, and a recording apparatus 33, for simplicity of description. The image forming apparatus 22 shown in FIG. 2 includes the document reading apparatus 31 shown in FIG. 3. The display apparatus 23 shown in FIG. 2 corresponds to the display apparatus 32 shown in FIG. 3. The recording apparatus 33 corresponds to the data memory 5 shown in FIG. 1. A database 35 corresponds to the secondary storage device 7 shown in FIG. 1. That is, according to the present exemplary embodiment, the database 35 is incorporated in the display apparatus 23. However, the database 35 may be an external device.

The document 21 shown in FIG. 3 is scanned by a scan unit of the document reading apparatus 31. A scanned document interpretation unit interprets a scanned document. A GUI component creation unit creates GUI components according to results of interpretation performed by the scanned document interpretation unit. Data representing the scanned document and the created GUI component are sent to the display apparatus 32 and the recording apparatus 33 via a network 34.

The display apparatus 32 displays both the document, which is scanned by the document reading apparatus 31, and the GUI component and accepts an operation performed by a user. The recording apparatus 33 performs association between the scanned document and the GUI component, which are sent thereto, and records the scanned document and the GUI component, which are associated with each other, in the database 35. The recorded data is read in response to an operation performed by the user.

Figure 4:
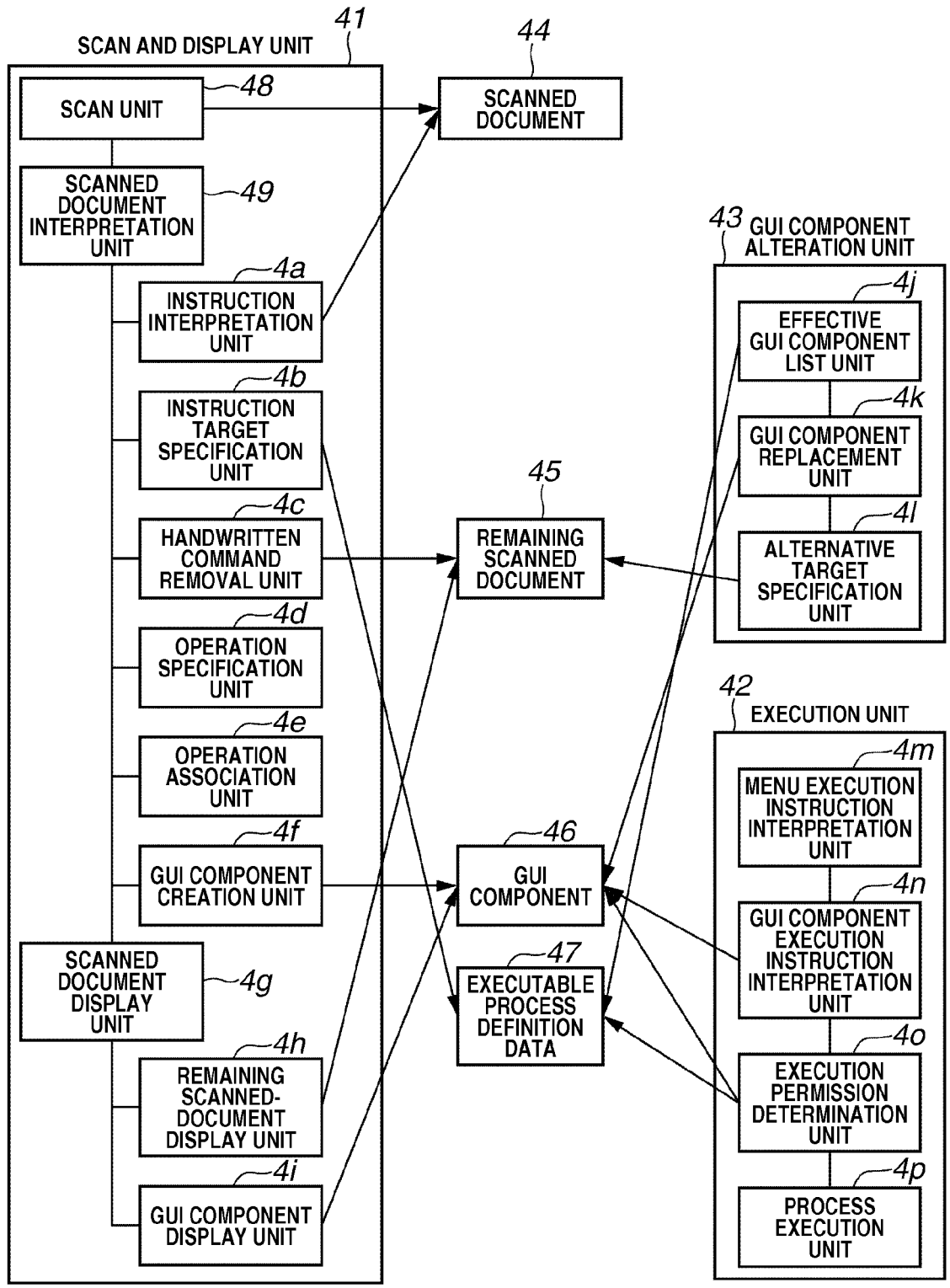
FIG. 4 is a block diagram illustrating an exemplary functional configuration of the display system in more detail.

FIG. 4 is a block diagram illustrating the functional configuration of the display system in more detail. Functions of the display system are achieved by the hardware of the image forming apparatus 22 and the display apparatus 23, which are shown in FIG. 2.

As shown in FIG. 4, the display system includes a scan and display unit 41, an execution unit 42, and a GUI component alteration unit 43 as main functional components. The scan and display unit 41 scans a document and displays the scanned document on a display screen. The execution unit 42 executes processes according to GUI components displayed on the display screen and to a user's operation instruction using menu items. The GUI component alteration unit 43 alters the GUI component displayed thereon.

The scan and display unit 41 includes a scan unit 48, a scanned document interpretation unit 49, and a scanned document display unit 4g. The scan unit 48 scans a document. The scanned document interpretation unit 49 interprets data which is generated by the scan unit 48 as computerized data representing a document 44 scanned by the scan unit 48. The scanned document display unit 4g displays a scanned document 45, which is obtained by removing a handwritten command, and a GUI component 46, which are results of analysis performed by the scanned document interpretation unit 49.

The scanned document interpretation unit 49 includes an instruction interpretation unit 4a, an instruction target specification unit 4b, a handwritten command removal unit 4c, an operation specification unit 4d, an operation association unit 4e, and a GUI component creation unit 4f. The instruction interpretation unit 4a interprets a handwritten command written on the scanned document 44 and specifies a process designated by the handwritten command. Processes to be designated by the handwritten command include a print process, a reproduction process, a next-page process, a sound-volume change process, and a transmission process. The instruction target specification unit 4b specifies data representing an object (instruction target object), which is designated by a handwritten command, by referring to executable process definition data 47. The instruction target object is data representing an instruction target, for example, a moving image, a still image, a scanned document itself (or the entire scanned document).

The handwritten command removal unit 4c removes a handwritten command from a scanned document to generate a remaining scanned document 45. The operation specification unit 4d specifies an operation corresponding to a process designated by a handwritten command. The operation association unit 4e associates a handwritten command with an operation corresponding to a process designated by the handwritten command. The GUI component creation unit 4f creates a GUI component 46 corresponding to a handwritten command and also creates GUI component data corresponding to the GUI component 46. The GUI component creation unit 4f creates the GUI component 46 and the GUI component data corresponding to the GUI component 46, for example, according to the process designated by a handwritten command, which is specified by the instruction interpretation unit 4a, and to an instruction target object specified by the instruction target specification unit 4b.

The scanned document display unit 4g includes a remaining scanned document display unit 4h and a GUI component display unit 4i. The remaining scanned document display unit 4h displays the remaining scanned document 45. The GUI component display unit 4i displays the GUI component 46.

The execution unit 42 includes a menu execution instruction interpretation unit 4m, a GUI component execution instruction interpretation unit 4n, an execution permission determination unit 4o, and a process execution unit 4p. The menu execution instruction interpretation unit 4m interprets an instruction given by a menu item to execute a process. The GUI component execution instruction interpretation unit 4n interprets an instruction given by a GUI component to execute a process. The execution permission determination unit 4o determines whether a designated process is executable. The process execution unit 4p executes a designated process.

The GUI component alteration unit 43 includes an effective GUI component list unit 4j, a GUI component replacement unit 4k, and an alternative target specification unit 4l. The effective GUI component list unit 4j displays a list of alterable effective GUI components. The GUI component replacement unit 4k replaces a designated GUI component with another GUI component. The alternative target specification unit 4l specifies, when a designated GUI component 46 is not present in a list displayed by the effective GUI component list unit 4j, an alternative instruction target.

First Exemplary Embodiment

A first exemplary embodiment adapted to display a GUI component corresponding to a handwritten command together with a document, on which the handwritten command is written, on the display screen of the display apparatus 23 according to the document scanned by the image forming apparatus 22 is described by referring to FIGS. 5 to 15. Also, an example, in which the display apparatus 23 displays a scanned document by removing a part interpreted as a handwritten command therefrom, is described below.

Figure 5:
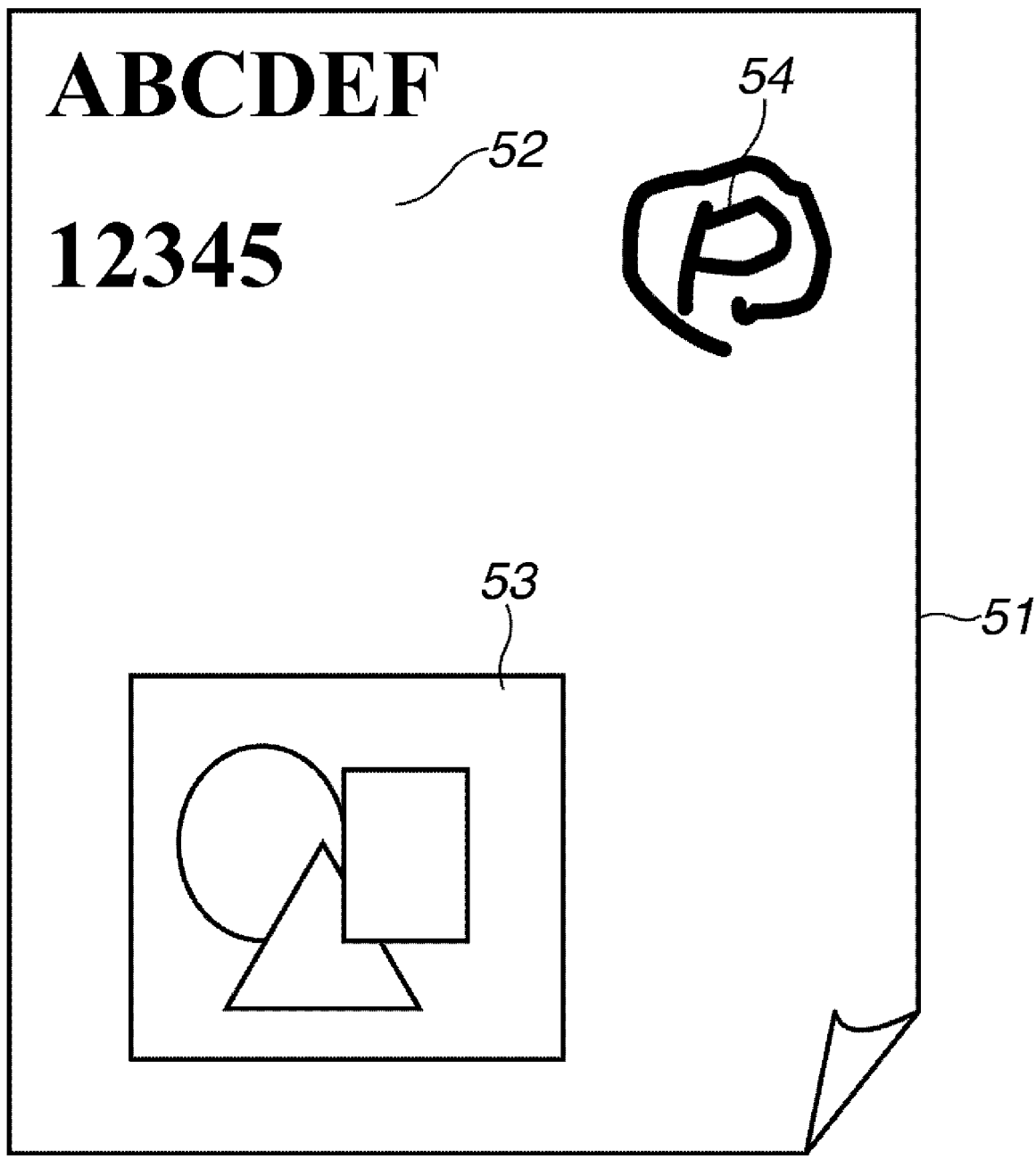
FIG. 5 is a diagram illustrating an example of a document to be scanned on which a handwritten command is written in a first exemplary embodiment.

FIG. 5 is a diagram illustrating an example of a paper document to be scanned on which a handwritten command is written in the first exemplary embodiment. The document 51 shown in FIG. 5 includes a text region 52 and an image region 53. A command 54 is written on the document 51 by hand.

Figures 6, 7:
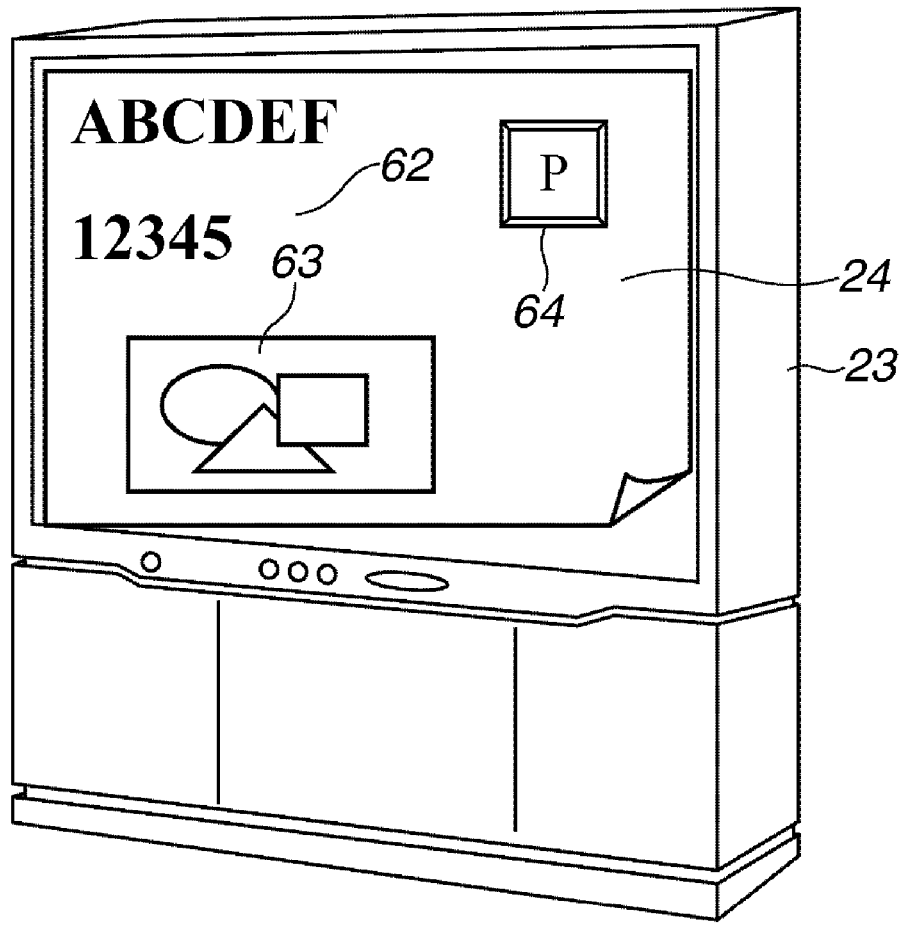
FIG. 6 is a diagram illustrating an example of a display screen image displayed in a display apparatus according to the first exemplary embodiment.
FIG. 7 is a table illustrating an example of data concerning a GUI component displayed in the display apparatus according to the first exemplary embodiment.

FIG. 6 is a diagram illustrating an example of a display screen image displayed in the display apparatus 23 according to the first exemplary embodiment. A scanned document 24 represented by computerized data corresponding to the document 51 shown in FIG. 5 is displayed on the screen of the display apparatus 23. The scanned document 24 includes a text region 62 and an image region 63. A GUI component 64 corresponding to a "print button", which is created by the handwritten command 54 shown in FIG. 5, is displayed on the screen of the display apparatus 23.

FIG. 7 is a table illustrating an example of data (attachment information) concerning a GUI component displayed in the display apparatus 23 according to the first exemplary embodiment. GUI component data 71 includes information on a function corresponding to a GUI component and information on the relative display position and the size of the GUI component. The GUI component data 71 shown in FIG. 7 corresponds to, for example, the GUI component 64 shown in FIG. 6. According to the GUI component data 71 shown in FIG. 7, a "print" function is recorded as the function corresponding to a process to be performed on an instruction target. Data (70, 10) and (90, 25) are recorded as the relative display position and the size of the GUI component. The data shown in FIG. 7 is stored in the data memory 5.

Figure 8:
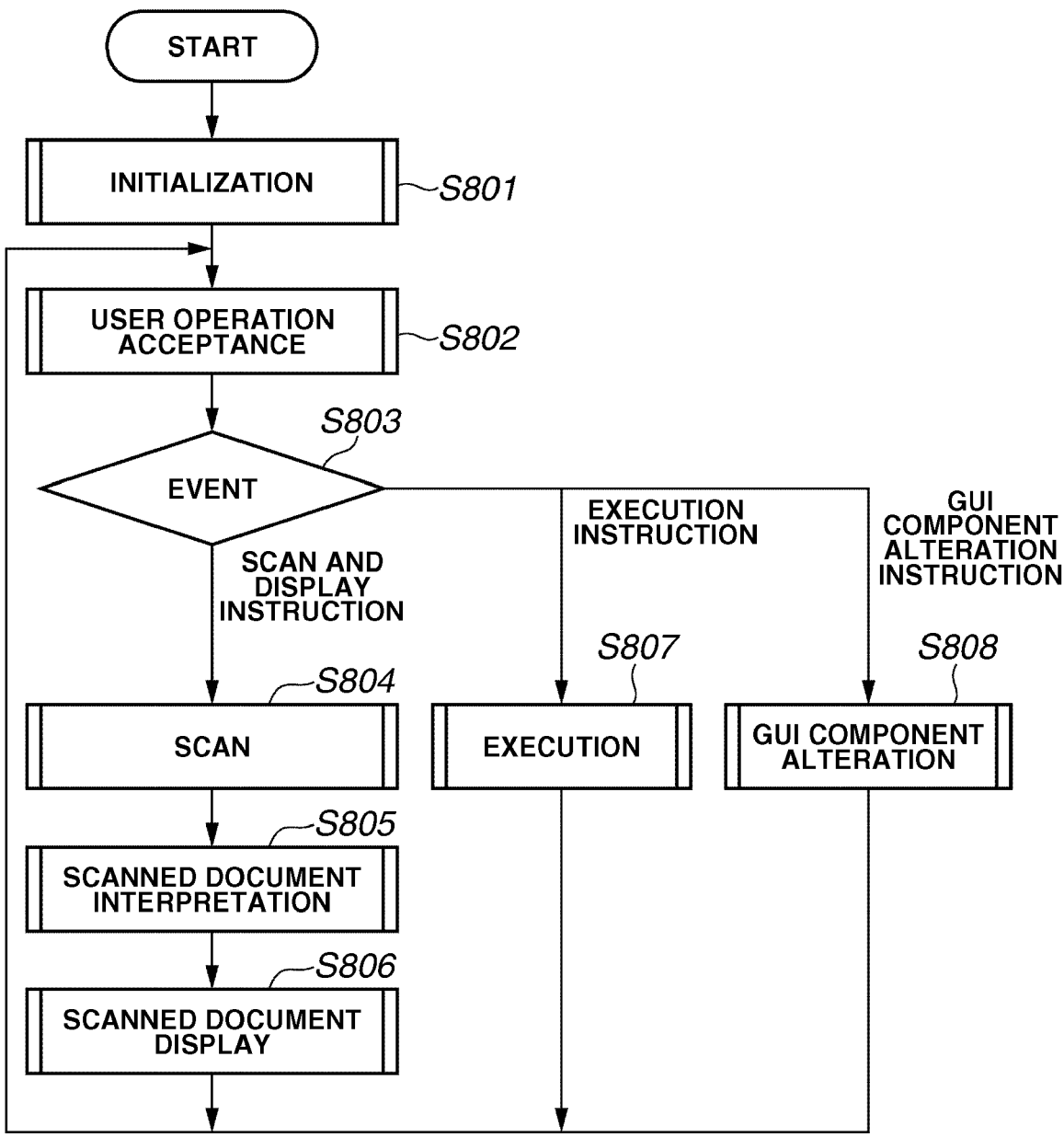
FIG. 8 is a flowchart illustrating an example of an overall process to be performed by the display apparatus according to the first exemplary embodiment.

FIG. 8 is a flowchart illustrating an example of an overall process to be performed by the display system according to the first exemplary embodiment. The following process is assumed to be executed by the CPU 2 of the display apparatus 23 or a CPU (not shown) of the image forming apparatus 22 according to a program preliminarily stored in the display apparatus 23 or the image forming apparatus 22.

In step S801, the image forming apparatus 22 or the display apparatus 23 performs initialization, for example, an operation of displaying an operation screen. Subsequently, in step S802, the image forming apparatus 22 or the display apparatus 23 performs a user operation and accepts a user operation (or event).

Then, in step S803, the image forming apparatus 22 or the display apparatus 23 determines an event. If the image forming apparatus 22 detects a scan and display instruction given by a user, the system advances to step S804. Alternatively, if the display apparatus 23 detects an execution instruction, the system proceeds to step S807. Alternatively, if the display apparatus 23 detects a GUI component alteration instruction, the system proceeds to step S808.

In step S804, the image forming apparatus 22 scans a document, on which a handwritten command is written, to acquire computerized data representing the scanned document. Then, the image forming apparatus 22 transfers the acquired data to the display apparatus 23. Subsequently, in step S805, the display apparatus 23 performs a scanned document interpretation process and interprets the handwritten command written on the scanned document as, for example, a GUI component. The scanned document interpretation process performed by the display apparatus 23 will be described in detail later by referring to FIG. 9. Then, in step S806, the display apparatus 23 performs a scanned document display process to display the GUI component together with the scanned document from which the written command is removed. Then, the system returns to step S802. The GUI component is displayed at a position corresponding to a position at which the handwritten command is written. The scanned document display process performed by the display apparatus 23 will be described in detail later by referring to FIG. 13.

In step S807, in response to an execution instruction, the display apparatus 23 performs a process corresponding to the menu item designated by a user or to the GUI component. Then, the system returns to step S802. The execution process performed by the display apparatus 23 is described below by referring to FIG. 15. In step S808, in response to a GUI component alteration instruction, the display apparatus 23 performs a GUI component alteration (or replacement) process to change the GUI component, which is currently displayed, to a designated GUI component. Then, the system returns to step S802. The GUI component alteration process performed by the display apparatus 23 will be described in detail later by referring to FIG. 31.

Figure 9:
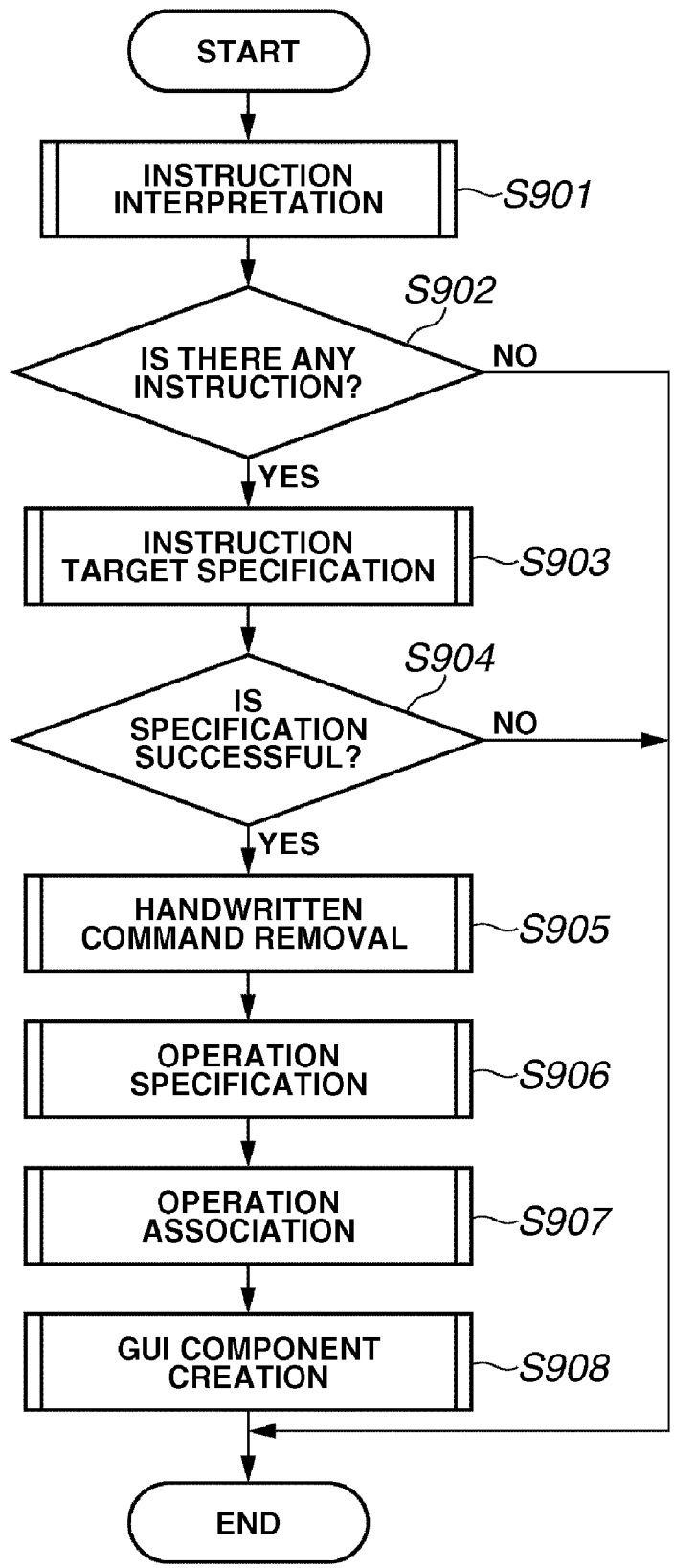
FIG. 9 is a flowchart illustrating an example of a scanned document interpretation process.

FIG. 9 is a flowchart illustrating an example of the scanned document interpretation process performed by the display apparatus 23. The process shown in FIG. 9 is described below being assumed to be performed by the scanned document interpretation unit 49 shown in FIG. 4 as a functional component of the display apparatus 23 (incidentally, hardware adapted to perform this process is the CPU 2).

In step S901, the scanned document interpretation unit 49 performs an instruction interpretation process to interpret a handwritten command written on a scanned document represented by computerized data. Thus, the scanned document interpretation unit 49 specifies a process designated by the handwritten command. Subsequently, in step S902, the scanned document interpretation unit 49 determines according to a result of interpretation performed in step S901 whether there is an instruction given by the handwritten command. If the scanned document interpretation unit 49 determines that there is an instruction given by the handwritten command, the processing advances to step S903. If the scanned document interpretation unit 49 determines that there is no instruction given by the handwritten command, the scanned document interpretation process ends.

In step S903, the scanned document interpretation unit 49 performs an instruction target specification process to specify an instruction target of the instruction given by the handwritten command. The instruction target specification process will be described in detail later by referring to FIG. 19. Subsequently, in step S904, the scanned document interpretation unit 49 determines whether the specification of the instruction target of the instruction given by the handwritten command in step S903 is successful. If the scanned document interpretation unit 49 determines that the specification of the instruction target of the instruction given by the handwritten command in step S903 is successful, the processing proceeds to step S905. If the scanned document interpretation unit 49 determines that the specification of the instruction target is not successful, the scanned document interpretation process ends.

In step S905, the scanned document interpretation unit 49 performs a handwritten command removal process to remove a handwritten command from the scanned document. The handwritten command removal process will be described in detail later by referring to FIG. 11. Subsequently, in step S906, the scanned document interpretation unit 49 performs the operation specification process. Thus, the scanned document interpretation unit 49 specifies an operation corresponding to the process designated by the handwritten command according to a character string written on the document, an electronic watermark embedded in the document, and definition data determined (or input) by a user. The operation specification process will be described in detail later by referring to FIG. 45.

Subsequently, in step S907, the scanned document interpretation unit 49 performs the operation association process to associate the handwritten command with an operation performed in the process that is designated by the handwritten command and that is specified in step S906. The operation association process will be described in detail later by referring to FIG. 46.

In step S908, the scanned document interpretation unit 49 performs the GUI component creation process according to the handwritten command and the operation performed in the process designated by the handwritten command, which are associated with each other in step S907, and to handwritten command definition data shown in FIG. 10 that will be described later. As a result of the GUI component creation process, the scanned document interpretation unit 49 creates the GUI component corresponding to the handwritten command and the operation performed in the process designated by the handwritten command, which are associated with each other in step S907. Then, the scanned document interpretation unit 49 finishes the scanned document interpretation process. The GUI component creation process will be described in detail later by referring to FIG. 12.

FIG. 10 is a table illustrating an example of handwritten command definition data. As shown in FIG. 10, the handwritten command definition data includes stroke information representing a handwritten command, a functional command concerning execution of an instruction, and a GUI component displayed on the display screen of the display apparatus 23. For example, handwritten command definition data 101 defines the same stroke information as that representing the handwritten command 54 written on the scanned document shown in FIG. 5. The handwritten command definition data 101 also defines the "print" command corresponding to the handwritten command written on the scanned document shown in FIG. 5. The handwritten command definition data 101 also defines the same GUI component as that 64 corresponding to the "print button" shown in FIG. 6. The handwritten command definition data is stored in the data memory 5.

Figure 11:
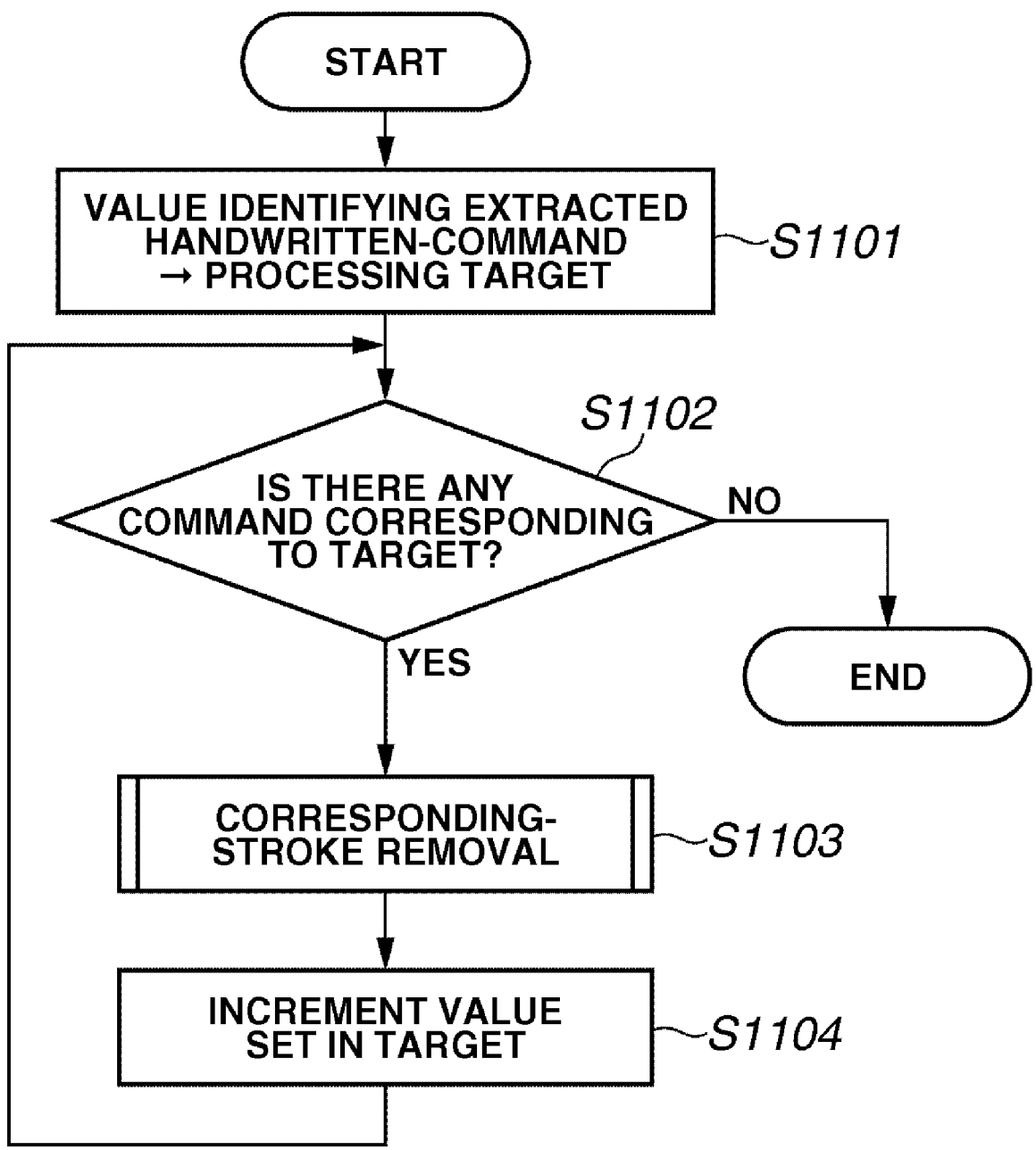
FIG. 11 is a flowchart illustrating a handwritten command removal process.

FIG. 11 is a flowchart illustrating the handwritten command removal process. The process shown in FIG. 11 is described below being assumed to be performed by the handwritten command removal unit 4c of the scanned document interpretation unit 49 shown in FIG. 4.

In step S1101, the handwritten command removal unit 4c sets a value identifying an extracted handwritten command in, for example, the variable "processing target" to initialize the variable "processing target". For example, in a case where there are two handwritten commands extracted, the handwritten command removal unit 4c sets a value representing a first one of the two handwritten commands in the variable "processing target".

In step S1102, the handwritten command removal unit 4c determines whether there is an extracted handwritten command corresponding to the value set in the variable "processing target". If the handwritten command removal unit 4c determines that there is an extracted handwritten command corresponding to the value set in the variable "processing target" (YES in step S1102), the processing advances to step S1103. Conversely, if the handwritten command removal unit 4c determines that there is no extracted handwritten command corresponding to the value set in the variable "processing target" (NO in step S1102), the handwritten command removal process ends.

In step S1103, the handwritten command removal unit 4c performs a corresponding stroke removal process to delete a handwritten command corresponding to the value set in the variable "processing target". That is, the handwritten command removal unit 4c removes a stroke corresponding to the handwritten command, which corresponds to the value set in the variable "processing target", from the scanned document. Subsequently, in step S1104, the handwritten command removal unit 4c increments the value set in the variable "processing target" by, for example, 1. Then, the processing returns to step S1102.

Figure 12:
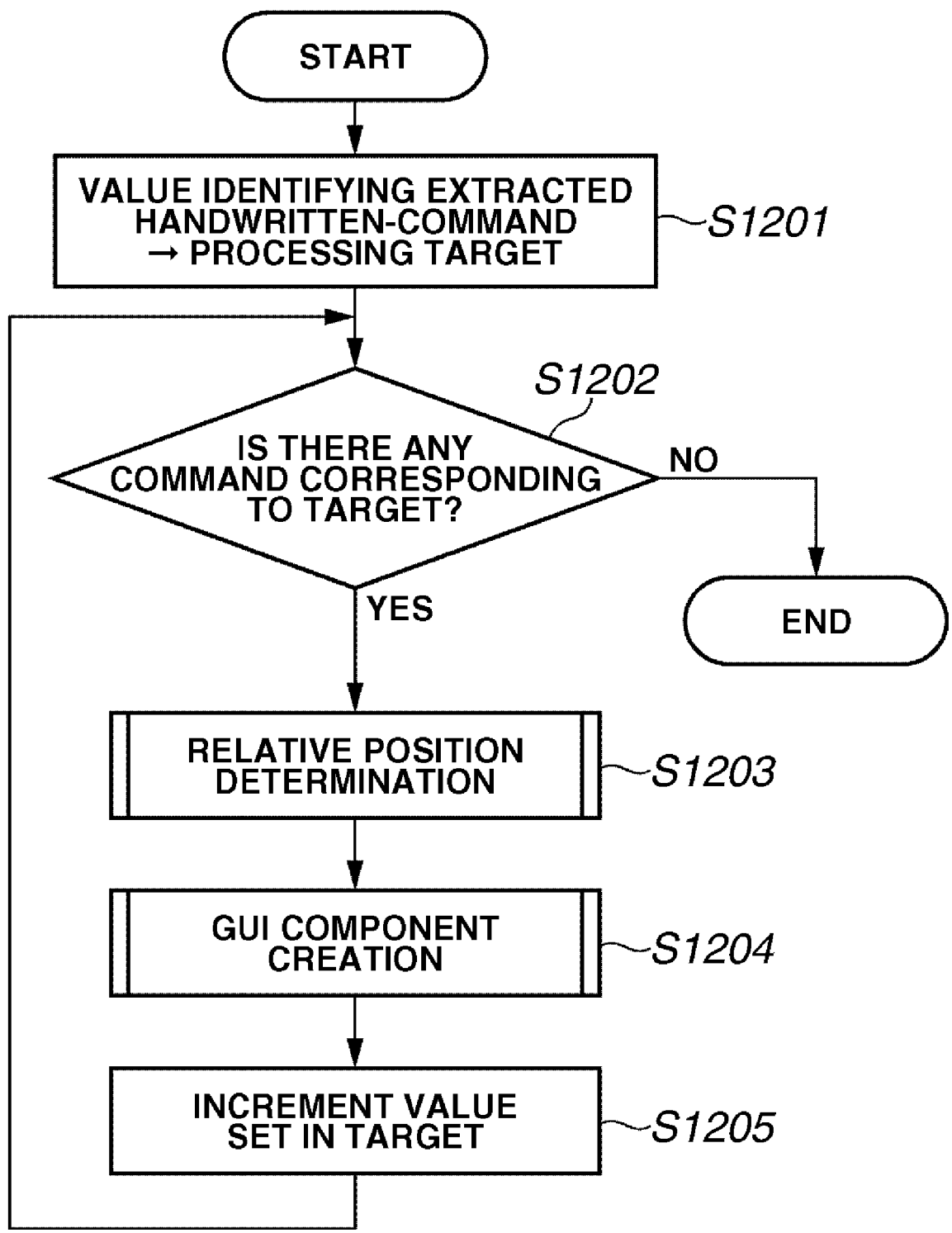
FIG. 12 is a flowchart illustrating a GUI component creation process.

FIG. 12 is a flowchart illustrating the GUI component creation process. The process shown in FIG. 12 is described below being assumed to be performed by the GUI component creation unit 4f of the scanned document interpretation unit 49 shown in FIG. 4.

In step S1201, the GUI component creation unit 4f sets a value identifying an extracted handwritten command in the variable "processing target" to initialize the variable "processing target." For example, in a case where there are two handwritten commands extracted, the GUI component creation unit 4f sets a value representing a first one of the two handwritten commands in the variable "processing target."

In step S1202, the GUI component creation unit 4f determines whether there is an extracted handwritten command corresponding to the value set in the variable "processing target." If the GUI component creation unit 4f determines that there is an extracted handwritten command corresponding to the value set in the variable "processing target" (YES in step S1202), the processing advances to step S1203. Conversely, if the GUI component creation unit 4f determines that there is no extracted handwritten command corresponding to the value set in the variable "processing target" (NO in step S1202), the GUI component creation process ends.

In step S1203, the GUI component creation unit 4f performs a relative position size determination process to determine the relative position and the size of a stroke, which corresponds to a handwritten command corresponding to the values set in the "processing target", with respect to the scanned document. Subsequently, in step S1204, the GUI component creation unit 4f performs the GUI component creation process to create a GUI component having the size obtained in step S1203 at the relative position (relative display position) obtained in step S1203.

Subsequently, in step S1205, the GUI component creation unit 4f increments the value set in the variable "processing target" by, for example, 1. Then, the processing returns to step S1202.

Figure 13:
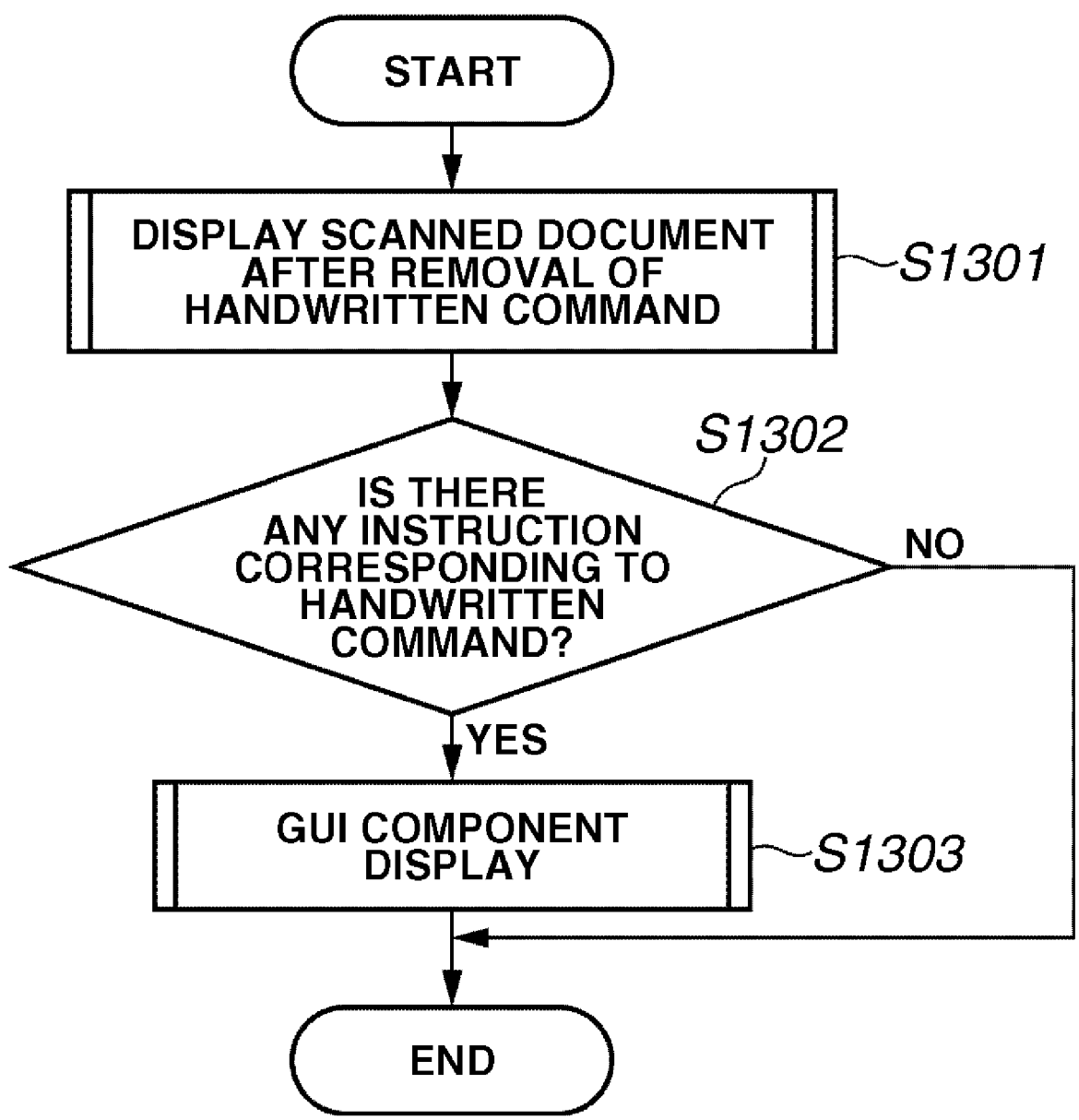
FIG. 13 is a flowchart illustrating a scanned document display process.

FIG. 13 is a flowchart illustrating an example of a scanned document display process. The process shown in FIG. 13 is described below being assumed to be performed by the scanned document display unit 4g shown in FIG. 4 as a functional component of the display apparatus 23.

In step S1301, the scanned document display unit 4g performs a remaining scanned document display process to display a scanned document put into a state, in which a handwritten command is removed therefrom, in the display apparatus 23. Subsequently, in step S1302, the scanned document display unit 4g determines according to a result of the interpretation of the handwritten command written in the currently displayed scanned document whether there is an instruction corresponding to the handwritten command. If the scanned document display unit 4g determines that there is an instruction corresponding to the handwritten command, the processing advances to step S1303. If the scanned document display unit 4g determines that there is no instruction corresponding to the handwritten command, the processing finishes the scanned document display process.

In step S1303, the scanned document display unit 4g performs the GUI component display process to display a GUI component corresponding to the instruction represented by the handwritten command. The GUI component display process is described in detail below by referring to FIG. 14.

Figure 14:
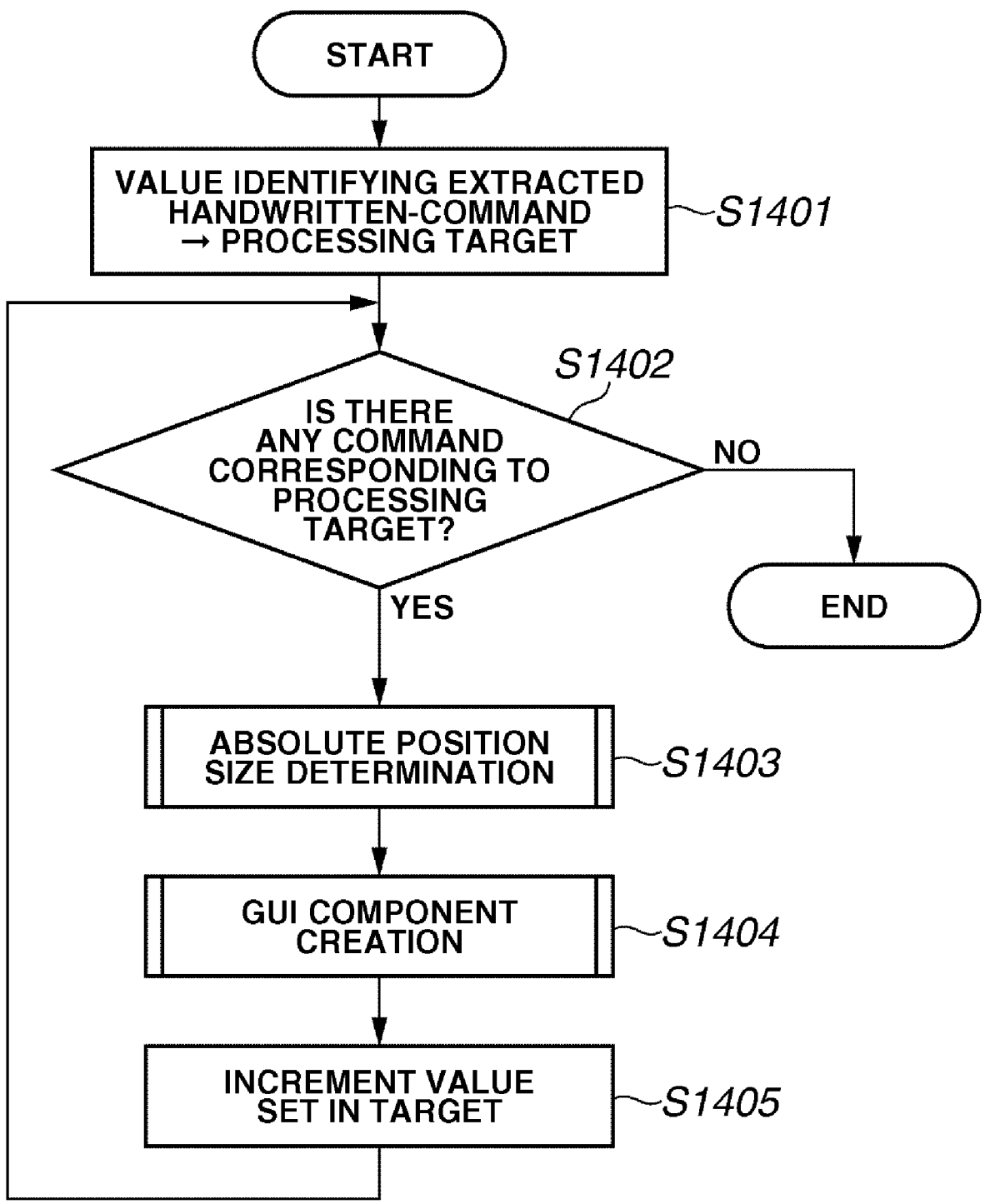
FIG. 14 is a flowchart illustrating a GUI component display process.

FIG. 14 is a flowchart illustrating an example of the GUI component display process. The process shown in FIG. 14 is described below being assumed to be performed by the GUI component display unit 4*i* of the scanned document display unit 4*g* shown in FIG. 4.

In step S1401, the GUI component display unit 4*i* sets a value identifying an extracted handwritten command in the variable "processing target" to initialize the variable "processing target." For example, in a case where there are two handwritten commands extracted, the GUI component display unit 4*i* sets a value representing a first one of the two handwritten commands in the variable "processing target."

In step S1402, the GUI component display unit 4*i* determines whether there is an extracted handwritten command corresponding to the value set in the variable "processing target." If the GUI component display unit 4*i* determines that there is an extracted handwritten command corresponding to the value set in the variable "processing target" (YES in step S1402), the processing advances to step S1403. Conversely, if the GUI component display unit 4*i* determines that there is no extracted handwritten command corresponding to the value set in the variable "processing target" (NO in step S1402), the GUI component display process ends.

In step S1403, the GUI component display unit 4*i* performs an absolute position size determination process to determine the absolute position and the size of the GUI component on the screen of the display apparatus 23 according to the GUI component (or GUI component data representing the GUI component) created in step S1204 shown in FIG. 12. Subsequently, in step S1404, the GUI component display unit 4*i* performs the GUI component display process to display the GUI component, which corresponds to the handwritten command corresponding to the value set in the "processing target" and has the size obtained in step S1403, at the position determined in step S1403.

Subsequently, in step S1405, the GUI component display unit 4*i* increments the value set in the variable "processing target" by, for example, 1. Then, the processing returns to step S1402.

Additionally, the GUI component display unit 4*i* displays the hand written command directly instead of the generated GUI components in FIG. 12.

Figure 15:
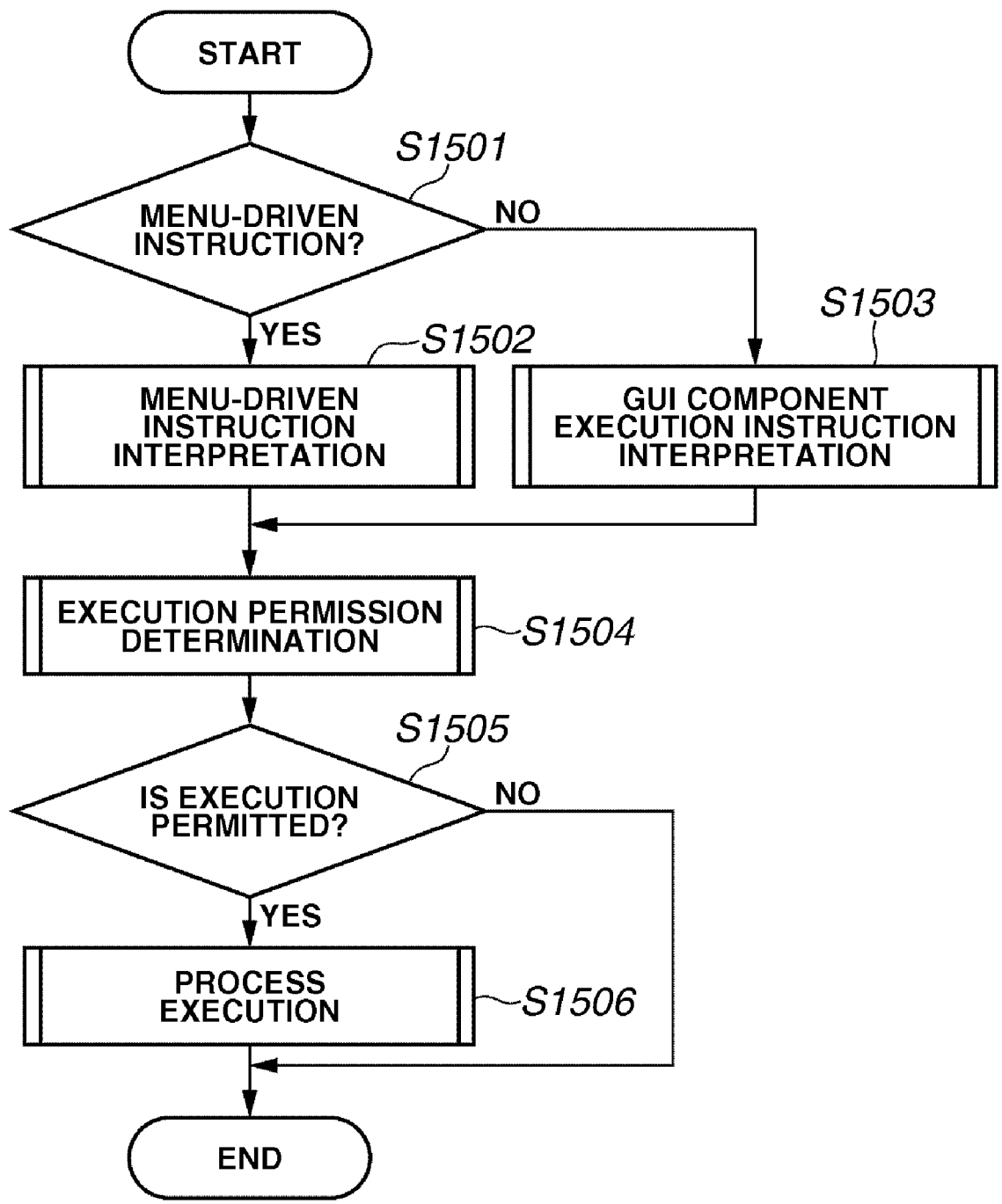
FIG. 15 is a flowchart illustrating an execution process.

FIG. 15 is a flowchart illustrating an example of the execution process. The process shown in FIG. 15 is described below being assumed to be performed by the execution unit 42 of the display apparatus 23, which is shown in FIG. 4.

In step S1501, the execution unit 42 determines whether an operation performed by a user is an instruction to execute a process designated by a menu item. If the execution unit 42 determines that an operation performed by a user is an instruction to execute a process designated by a menu item, the processing advances to step S1502. If the execution unit 42 determines that an operation performed by a user differs from an instruction to execute a process designated by a menu item, the processing proceeds to step S1503.

In step S1502, the execution unit 42 performs the menu-driven instruction interpretation process to interpret an instruction to execute a process designated by the menu item. On the other hand, in step S1503, the execution unit 42 performs the GUI component execution instruction interpretation process to interpret the instruction to execute the process corresponding to the GUI component. For example, the execution unit 42 specifies a process (or function corresponding to the process), an operation performed in the process, and an instruction target corresponding to the process according to the GUI component data corresponding to the GUI component operated by the user.

In step S1504, the execution unit 42 performs an execution permission determination process to determine whether a user's instruction to execute a process is executable. The execution permission determination process will be described in detail later by referring to FIG. 41. Subsequently, if the execution unit 42 determines in step S1505 according to a result of determination in step S1504 that the execution is permitted, the processing proceeds to step S1506. If the execution unit 42 determines that the execution is not permitted, the processing finishes the execution process.

In step S1506, the execution unit 42 issues instructions to perform a process execution. Thus, each process is performed.

As described above, according to the first exemplary embodiment, the display apparatus 23 causes a GUI component, which represents a result of recognition of a handwritten command, to appear on the screen of the display apparatus. This eliminates the necessity for a special confirmation step performed to prevent occurrence of misrecognition. Simultaneously, the risk of occurrence of a malfunction can be reduced. Also, operability with respect to data representing a currently displayed document can be enhanced.

According to the first exemplary embodiment, as shown in FIG. 6, the display apparatus 23 causes a GUI component to reside on the screen thereof. Thus, a user can perform a process on the document data any number of times by using the GUI component. Consequently, the operability with respect to data representing a currently displayed document can be enhanced.

According to the first exemplary embodiment, the display apparatus 23 recognizes a handwritten command written on a general document and displays a result of recognition by causing a GUI component to appear on the screen thereof. This eliminates the need for use of exclusive paper. Thus, the operability with respect to data representing a currently displayed document can more easily be enhanced.

According to the first exemplary embodiment, the display apparatus 23 displays a result of recognition of a handwritten command by causing a GUI component to appear at a position corresponding to the handwritten command on the screen thereof. Also, the display apparatus 23 displays a scanned document on the screen thereof. Thus, a user can instruct the execution of a process, such as a print process, using a GUI component after or while the scanned document is checked by the display apparatus. Consequently, the operability with respect to data representing a currently displayed document can be enhanced.

According to the first exemplary embodiment, the display apparatus 23 stores data representing a scanned document and a GUI component corresponding thereto in the database 35 shown in FIG. 3 by associating the scanned document with the GUI component. Thus, when the scanned document is reutilized, the corresponding GUI component can also be reutilized. Consequently, the operability with respect to data representing a currently displayed document can be enhanced.

Although the example of displaying a scanned document, from which a handwritten command is removed, on the screen of the display apparatus 23 has been described in the description of the first exemplary embodiment, a scanned document may be displayed without removing a handwritten command therefrom. Alternatively, an original document corresponding to a scanned document may be displayed by searching the data memory 5 for data representing the original document.

Second Exemplary Embodiment

A second exemplary embodiment, in which the display apparatus 23 displays a GUI component in a case where a specific region of a document includes an instruction target, is described next by referring to FIGS. 16 to 24. The configuration of a display system including an image forming apparatus 22 and a display apparatus 23 is similar to the display system according to the first exemplary embodiment. Thus, the description of the display system is not repeated.

Figure 16:
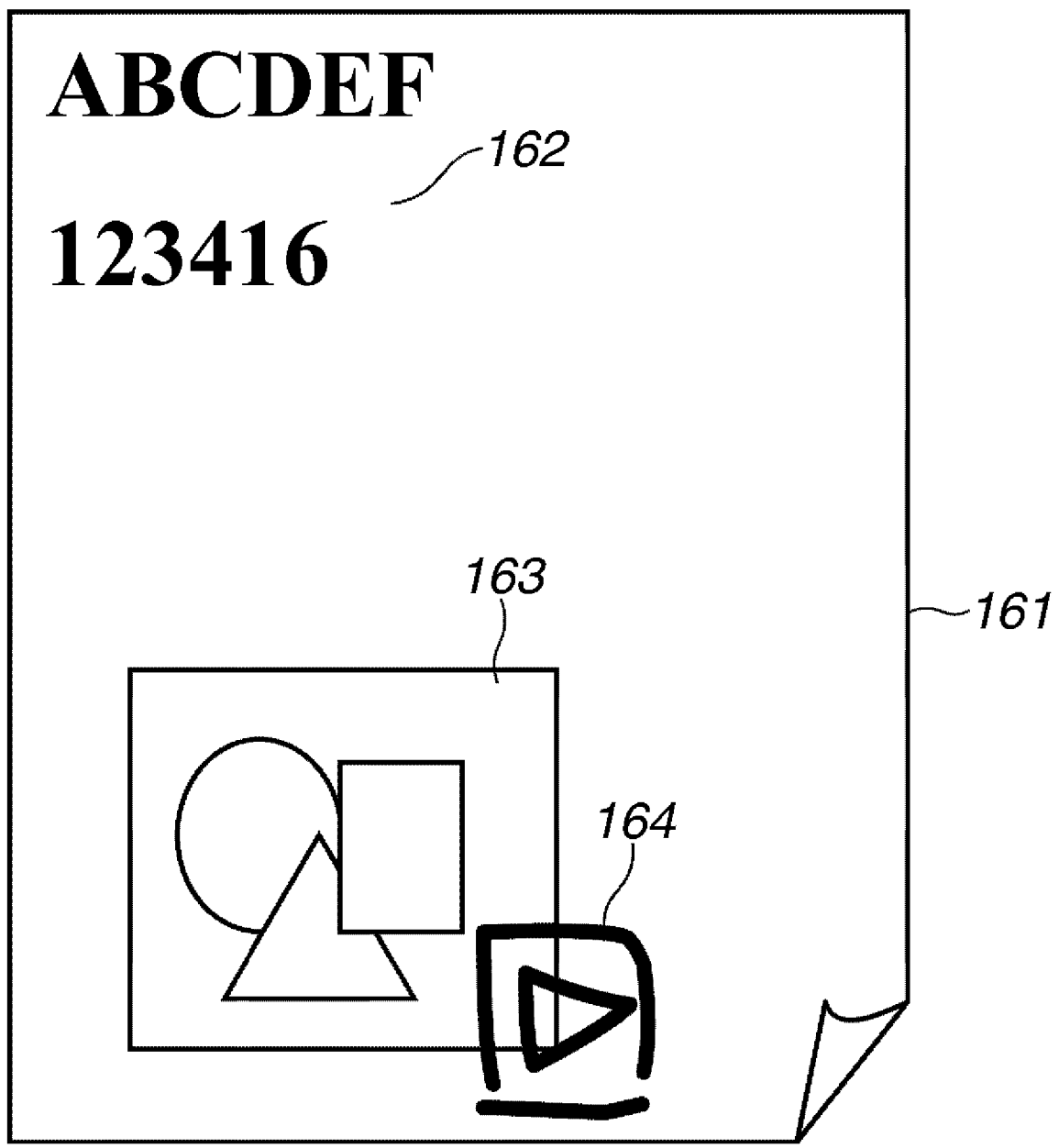
FIG. 16 is a diagram illustrating an example of a document to be scanned on which a handwritten command is written in a second exemplary embodiment.

FIG. 16 is a diagram illustrating an example of a paper document to be scanned on which a handwritten command is written in the second exemplary embodiment. A document 161 shown in FIG. 16 includes a text region 162 and an image region 163. A command 164 is written on the document 161 by hand to overlap with the image region 163.

Figures 17, 18:
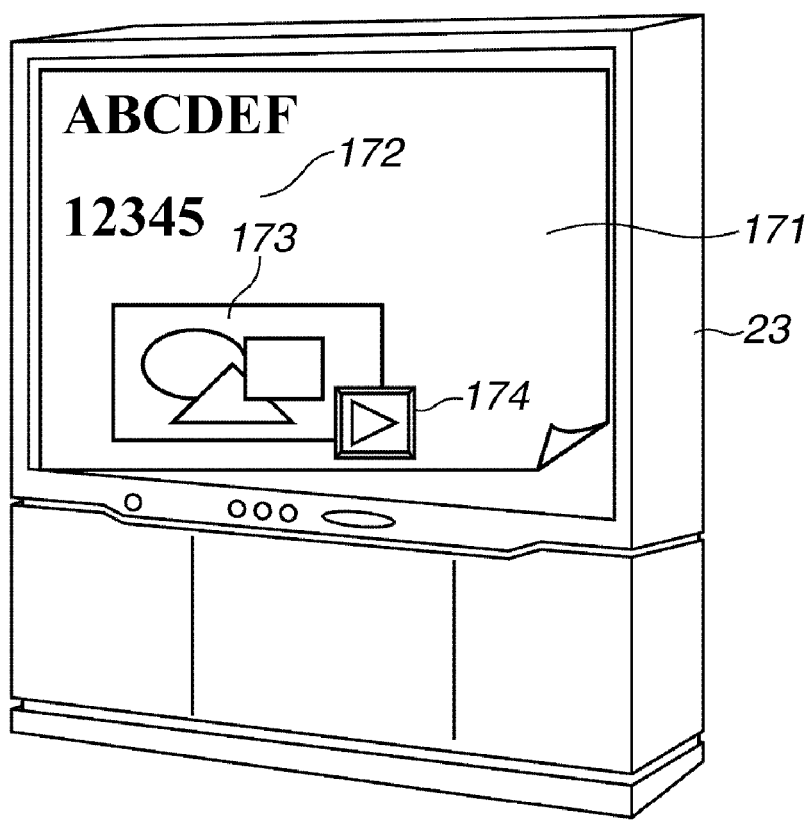
FIG. 17 is a diagram illustrating an example of a display screen image displayed in a display apparatus according to the second exemplary embodiment.
FIG. 18 is a table illustrating an example of data concerning a GUI component displayed in the display apparatus according to the second exemplary embodiment.

FIG. 17 is a diagram illustrating a display screen image displayed in the display apparatus 23 according to the second exemplary embodiment. A scanned document 171 represented by computerized data corresponding to the document 161 shown in FIG. 16 is displayed on the screen of the display apparatus 23. The scanned document 171 includes a text region 172 and an image region 173. A GUI component 174 corresponding to a "reproduction button", which is created by the handwritten command 164 shown in FIG. 16, is displayed on the screen of the display apparatus 23. The image region 173 is associated with a moving image included in the original document that corresponds to the scanned document 171 and that is searched for by the display apparatus 23. The "reproduction button" means that an operation on the moving image can be performed.

FIG. 18 is a table illustrating data concerning a GUI component displayed in the display apparatus 23 according to the second exemplary embodiment. GUI component data 181 includes information on a function corresponding to a GUI component, information on the relative display position and the size of the GUI component, and information on an instruction target object. The GUI component data 181 shown in FIG. 18 corresponds to, for example, the GUI component 174 shown in FIG. 17. According to the GUI component data 181 shown in FIG. 18, a "moving image object 173" is recorded as an instruction target. A "reproduction" function is recorded as the function corresponding to a process to be performed on the instruction target. Data (50, 85) and (60, 95) is recorded as the relative display position and the size of the GUI component. The GUI component data 181 is stored in the data memory 5.

Figure 19:
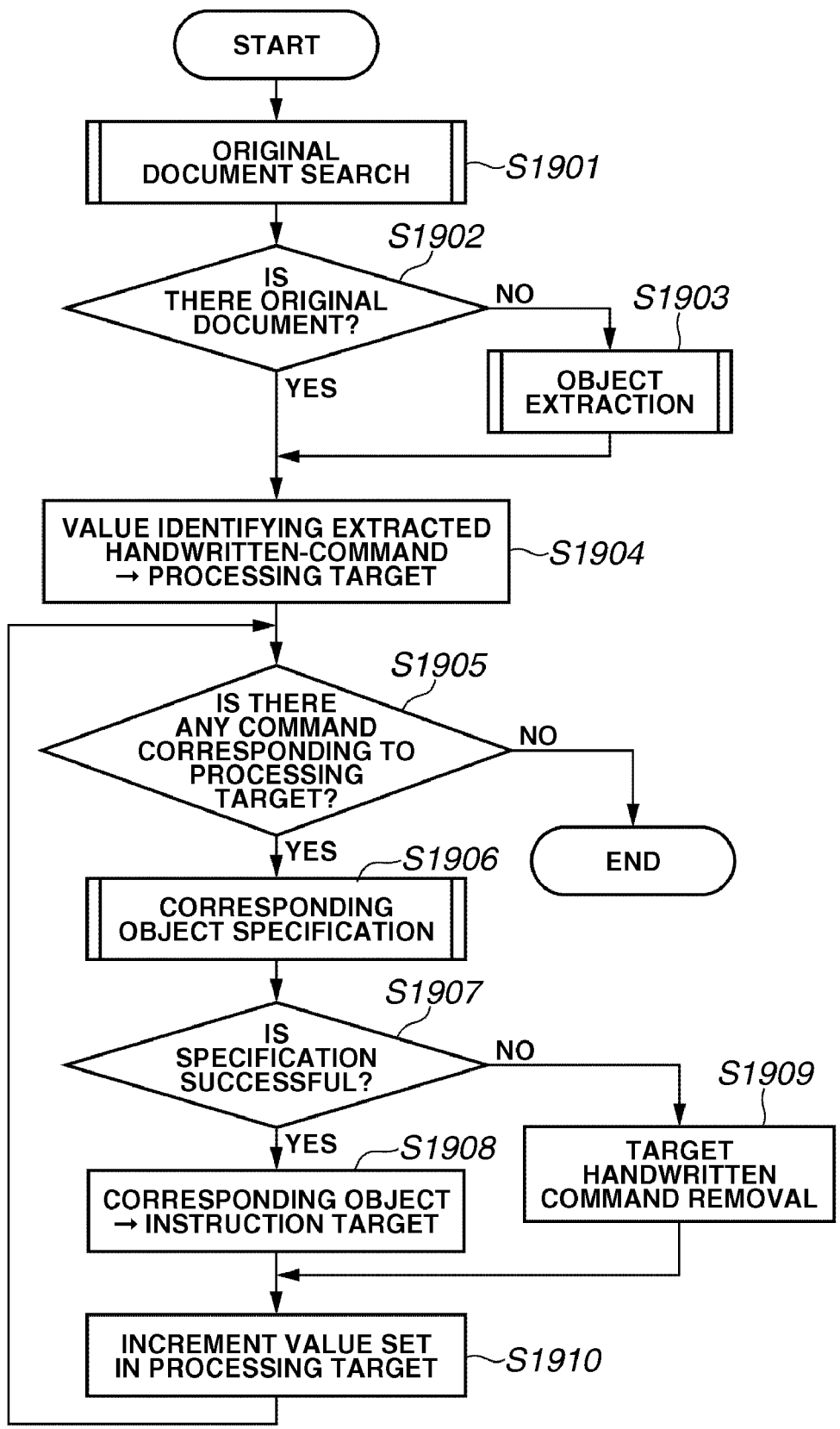
FIG. 19 is a flowchart illustrating an example of an instruction target specification process.

FIG. 19 is a flowchart illustrating an example of an instruction target specification process. The process shown in FIG. 19 is described below being assumed to be performed by the instruction target specification unit 4b of the scanned document interpretation unit 49, which is shown in FIG. 4 and serves as a functional component of the display apparatus 23.

In step S1901, the instruction target specification unit 4b performs an original document search process to search for an original document corresponding to the scanned document. Subsequently, if the instruction target specification unit 4b determines in step S1902 according to a result of the search in step S1091 that there is the original document, the processing proceeds to step S1904. If the instruction target specification unit 4b determines that there is no original document, the processing advances to step S1903.

In step S1903, the instruction target specification unit 4b performs an object extraction process to extract objects, such as text, graphics, and images, by performing image analysis on the scanned document. Subsequently, the processing proceeds to step S1904.

In step S1904, the instruction target specification unit 4b sets a value identifying an extracted handwritten command in, for example, the variable "processing target" to initialize the variable "processing target." For example, in a case where there are two handwritten commands extracted, the instruction target specification unit 4b sets a value representing a first one of the two handwritten commands in the variable "processing target."

In step S1905, the instruction target specification unit 4b determines whether there is an extracted handwritten command corresponding to the value set in the variable "processing target." If the instruction target specification unit 4b determines that there is an extracted handwritten command corresponding to the value set in the variable "processing target" (YES in step S1905), the processing advances to step S1906. If the instruction target specification unit 4b determines that there is no extracted handwritten command corresponding to the value set in the variable "processing target" (NO in step S1905), the instruction target specification process ends.

In step S1906, the instruction target specification unit 4b performs a corresponding object specification process using the executable process definition data 47 that corresponds to an instruction target kind shown in FIG. 4. The instruction target specification unit 4b specifies an object, which is an instruction target designated by a handwritten command that is a processing target, in the original document or the objects extracted in step S1903. The executable process definition data 47 will be described in detail below by referring to FIG. 20. The corresponding object specification process will be described in detail below by referring to FIG. 21.

Subsequently, in step S1907, the instruction target specification unit 4b determines whether the specification of an object, which is an instruction target designated by the handwritten command that is a processing target, is successful in the corresponding object specification process performed in step S1906. If the instruction target specification unit 4b determines that the specification of an object is successful, the processing advances to step S1908. If the instruction target specification unit 4b determines that the specification of an object is unsuccessful, the processing advances to step S1909.

In step S1908, the instruction target specification unit 4b employs the object, which is specified in step S1906, as an instruction target designated by the handwritten command that is a processing target. On the other hand, in step S1909, the instruction target specification unit 4b determines that the recognition of an object as a handwritten command, which is performed in, for example, step S901 shown in FIG. 9, is erroneous. Then, the instruction target specification unit 4b deletes the handwritten command, which is currently employed as a processing target, from the scanned document. Subsequently, the processing proceeds to step S1910.

In step S1910, the instruction target specification unit 4b increments the value set in the variable "processing target" by, for example, 1. Then, the processing returns to step S1905.

FIG. 20 is a table illustrating an example of executable process definition data corresponding to an instruction target kind shown in FIG. 4. These data are held by the data memory 5. The executable process definition data shown in FIG. 20 includes instruction target kind data and executable process list data representing an executable process list that corresponds to each target kind data. For instance, the executable process definition data 201 defines the instruction target kind to be a "moving image" corresponding to the moving image object 173 shown in FIG. 17. The executable process definition data 201 defines the executable process list corresponding to the instruction target kind "moving image" to be a list including a "print" process, a "reproduction" process, a "sound-volume change" process, and a "transmission" process. The executable process definition data 202 defines the executable process list corresponding to the instruction target kind "still image" to be a list including a "print" process, and a "transmission" process. The executable process definition data 203 defines the executable process list corresponding to the instruction target kind "scanned document itself" to be a list including a "print" process, a "next page" process, and a "transmission" process.

Figure 21:
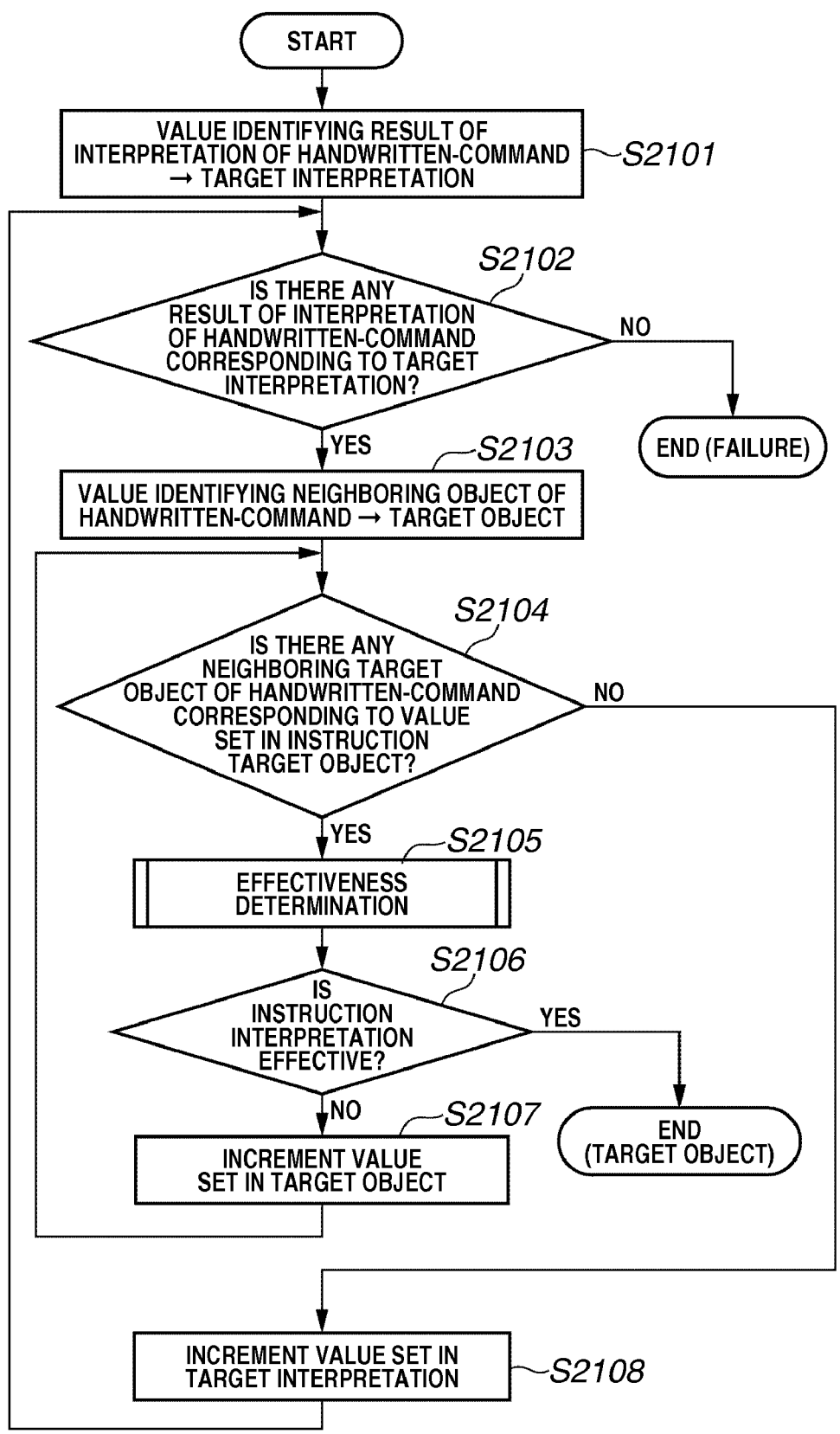
FIG. 21 is a flowchart illustrating a corresponding object specification process.

FIG. 21 is a flowchart illustrating an example of a corresponding object specification process. The process shown in FIG. 21 is described below being assumed to be performed by the instruction target specification unit 4b shown in FIG. 4.

In step S2101, the instruction target specification unit 4b sets a value identifying a result of interpretation of the handwritten command, which is performed in the instruction interpretation process in step S901 shown in FIG. 9, in the variable "target interpretation" to initialize the variable "target interpretation." For example, in a case where there are two results of the interpretation of the handwritten command, the instruction target specification unit 4b sets a value representing a first one of the two results of the interpretations of the handwritten command in the variable "target interpretation."

In step S2102, the instruction target specification unit 4b determines whether there is a result of the interpretation of the handwritten command corresponding to the value set in the variable "target interpretation." If the instruction target specification unit 4b determines that there is a result of the interpretation of the handwritten command corresponding to the value set in the variable "target interpretation" (YES in step S2102), the processing advances to step S2103. If the instruction target specification unit 4b determines that there is no result of the interpretation of the handwritten command corresponding to the value set in the variable "target interpretation" (NO in step S2102), the instruction target specification process ends.

In step S2103, the instruction target specification unit 4b sets a value identifying an object located in the vicinity of the handwritten command in the variable "instruction target object" to initialize the variable "instruction target object." For example, in a case where there are two objects in the vicinity of the handwritten command, the instruction target specification unit 4b sets a value representing one of the two objects, which is closest to the handwritten command, in the variable "instruction target object."

In step S2104, the instruction target specification unit 4b determines whether there is an object, which is located in the vicinity of the handwritten command and corresponds to the value set in the variable "instruction target object." If the instruction target specification unit 4b determines that there is an object, which is located in the vicinity of the handwritten command and corresponds to the value set in the variable "instruction target object" (YES in step S2104), the processing advances to step S2105. If the instruction target specification unit 4b determines that there is no object, which is located in the vicinity of the handwritten command and corresponds to the value set in the variable "instruction target object" (NO in step S2104), the processing advances to step S2108.

In step S2105, the instruction target specification unit 4b performs an effectiveness determination process by referring to the executable process definition data shown in FIG. 20. The instruction target specification unit 4b determines whether the interpretation of the instruction designated by the handwritten command (that is, the process designated by the handwritten command), which is performed in the instruction interpretation process performed in, for example, step S901 shown in FIG. 9, is an effective process for the instruction target object.

If, in step S2106, the instruction target specification unit 4b determines that the process indicated by the interpretation of the instruction designated by the handwritten command is an ineffective process for the instruction target object, the processing advances to step S2107. If the instruction target specification unit 4b determines that the process indicated by the interpretation of the instruction designated by the handwritten command is an effective process for the instruction target object, the corresponding object specification process ends.

In step S2107, the instruction target specification unit 4b increments the value set in the variable "instruction target object" by, for example, 1. Then, the processing returns to step S2104. In step S2108, the instruction target specification unit 4b increments the value set in the variable "target interpretation" by, for example, 1. Then, the processing returns to step S2102.

In the effectiveness determination process performed in step S2105, the instruction target specification unit 4b can determine the effectiveness by referring to the executable process definition data shown in FIG. 20 and by, for example, determining whether the functions (or processes) to be performed on the same instruction target object overlap with each other. That is, in a case where similar two handwritten commands are written for the same instruction target object in the document, the functions (or processes) to be performed on the same instruction target object overlap with each other. Thus, the instruction target specification unit 4b can determine that the interpretation of the instruction represented by the handwritten command is ineffective. Alternatively, in the above-described case, the instruction target specification unit 4b can be adapted not to determine that the interpretation is ineffective. That is, the instruction target specification unit 4b can interpret the two handwritten commands as commands respectively having different functions, instead of commands having the same function. Thus, the instruction target specification unit 4b can determine that the interpretation is effective.

Figure 22:
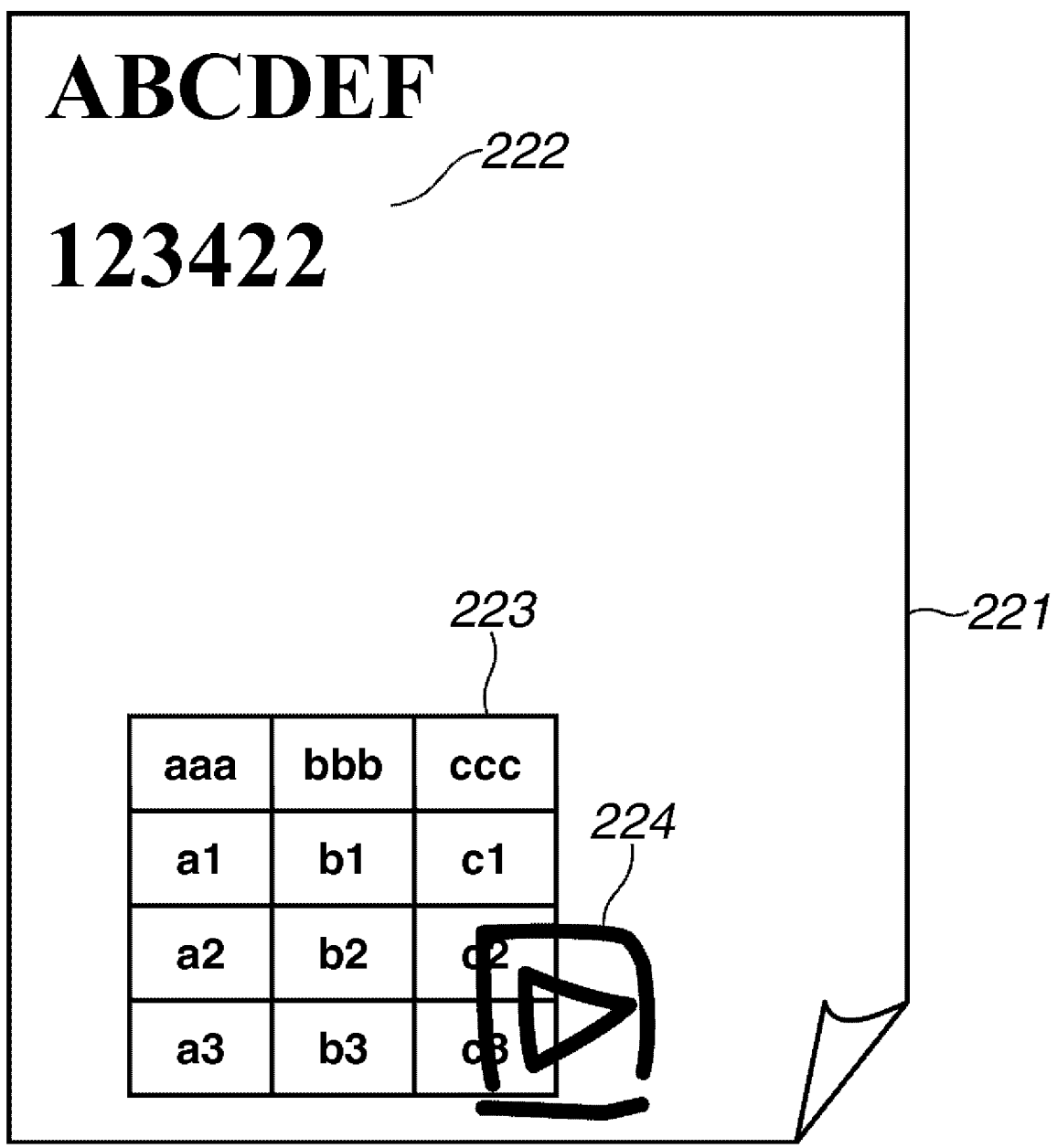
FIG. 22 is a diagram illustrating another example of a document to be scanned on which a handwritten command is written in the second exemplary embodiment.

FIG. 22 is a diagram illustrating another example of a document 221 to be scanned on which a handwritten command is written in the second exemplary embodiment. The document 221 shown in FIG. 22 includes a text region 222 and a table region 223. A command 224 is written by hand to overlap with the table region 223.

Figures 23, 24:
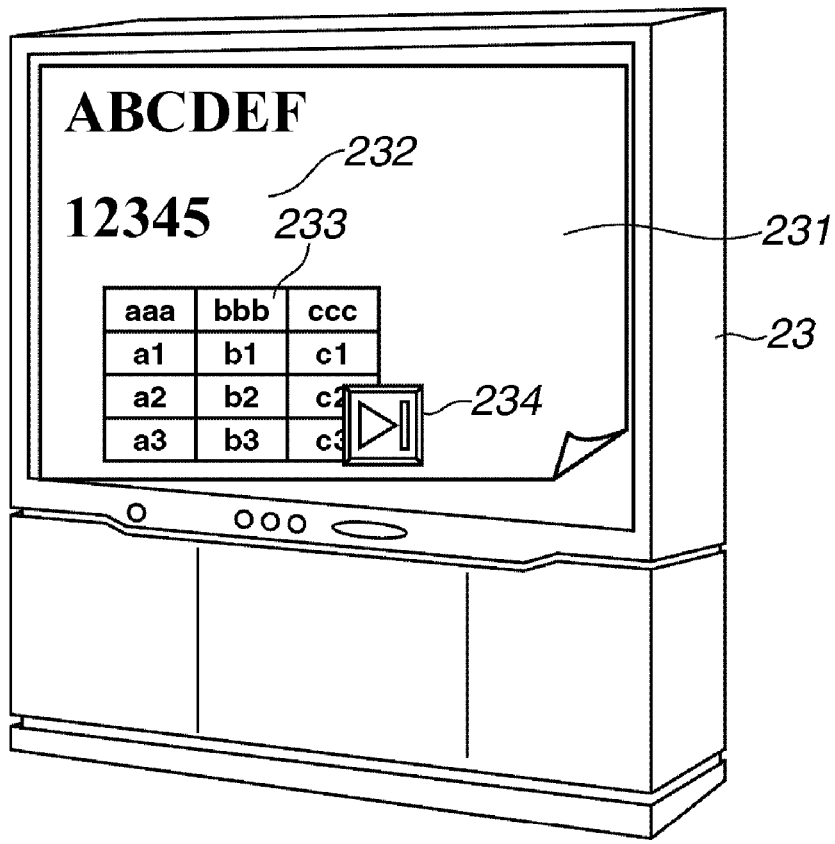
FIG. 23 is a diagram illustrating another example of a display screen image displayed in the display apparatus according to the second exemplary embodiment.
FIG. 24 is a table illustrating another example of data concerning a GUI component displayed in the display apparatus according to the second exemplary embodiment.

FIG. 23 is a diagram illustrating another example of a display screen image displayed in the display apparatus 23 according to the second exemplary embodiment. A scanned document 231 represented by computerized data corresponding to the document 221 shown in FIG. 22 is displayed on the screen of the display apparatus 23. The scanned document 231 includes a text region 232 and a table region 233. The table region 233 is associated with a table included in a region corresponding to the original document searched for in the scanned document 231 by the display apparatus 23.

A GUI component 234 corresponding to a "next page button", the processing target of which is the scanned document itself, is displayed on the screen of the display apparatus 23. This is because no processes can be performed on the table, which is the instruction target, in the case of using the "reproduction button" corresponding to the handwritten command 224 shown in FIG. 22. Thus, the display apparatus 23 changes the instruction target and the GUI component.

FIG. 24 is a table illustrating another example of data concerning a GUI component displayed in the display apparatus 23 according to the second exemplary embodiment. GUI component data 241 includes information on a function corresponding to the GUI component, information on the relative display position and the size of the GUI component, and information on an instruction target object. The GUI component data 241 shown in FIG. 24 corresponds to, for example, the GUI component 234 shown in FIG. 23. The GUI component data 241 shown in FIG. 24 means that the "scanned document itself" 231 is recorded as an instruction target, that the "next page" function is recorded as the function to be performed on the instruction target, and that values (50, 85) and (60, 95) are recorded as the relative display position and the size of the GUI component. The GUI component data 241 is held in the data memory 5.

As described above, according to the second exemplary embodiment, the display apparatus 23 appropriately specifies the instruction target corresponding to the GUI component. Thus, the operability with respect to document data representing a currently displayed document can be enhanced. Also, according to the second exemplary embodiment, the display apparatus 23 creates only effective GUI components.

Consequently, the operability with respect to the document data representing the currently displayed document can be enhanced.

Third Exemplary Embodiment

A third exemplary embodiment, in which a display apparatus 23 changes an erroneously recognized GUI component, is described by referring to FIGS. 25 to 35. The configuration of a display system including an image forming apparatus 22 and the display apparatus 23 is similar to the display system according to the first exemplary embodiment. Thus, the description of the display system is not repeated.

Figure 25:
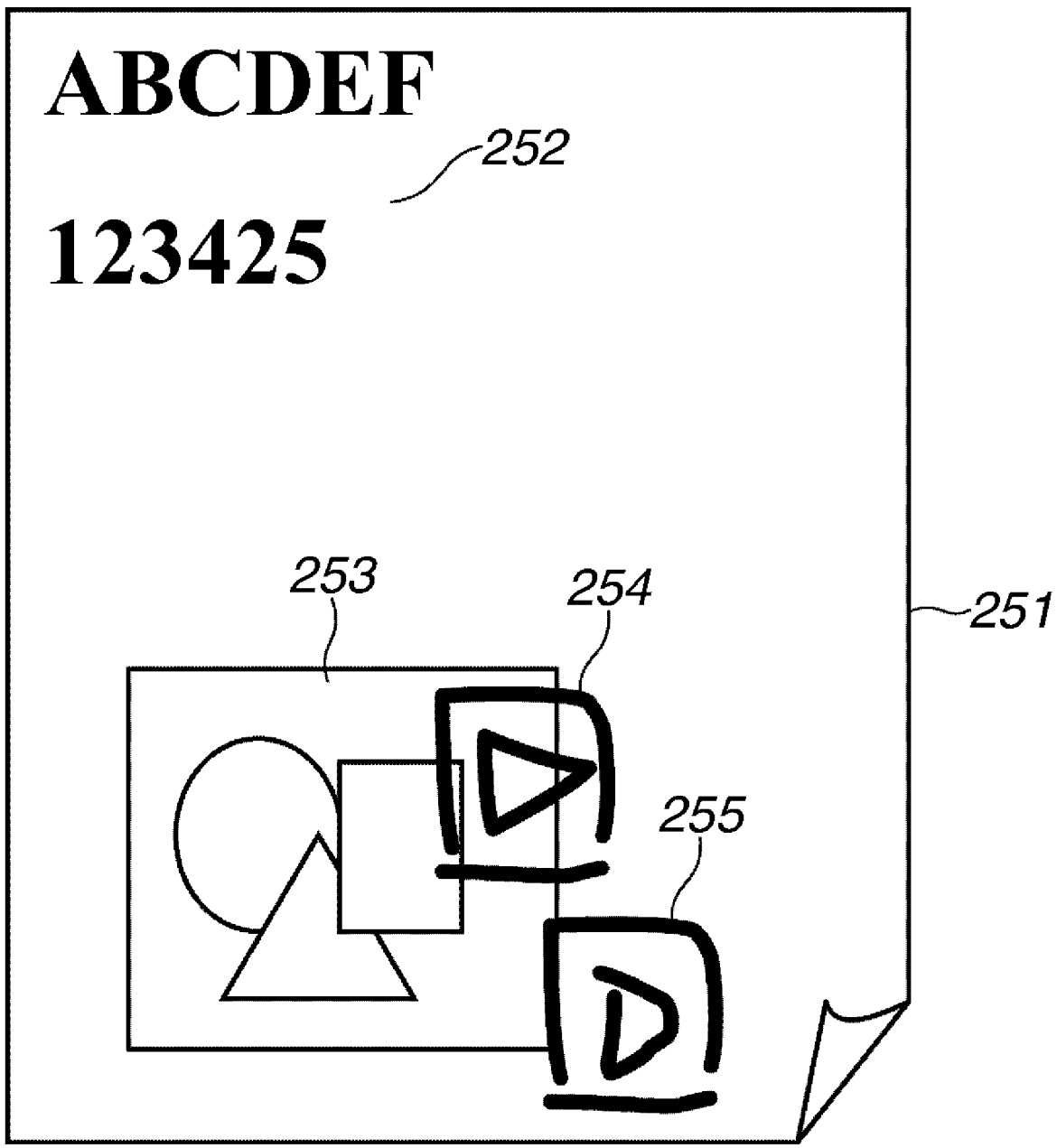
FIG. 25 is a diagram illustrating an example of a document to be scanned on which a handwritten command is written in a third exemplary embodiment.

FIG. 25 is a diagram illustrating an example of a paper document 251 to be scanned on which a handwritten command is written in the third exemplary embodiment. A document 251 shown in FIG. 25 includes a text region 252 and an image region 253. Commands 254 and 255 are written on the document 251 by hand.

Figure 26:
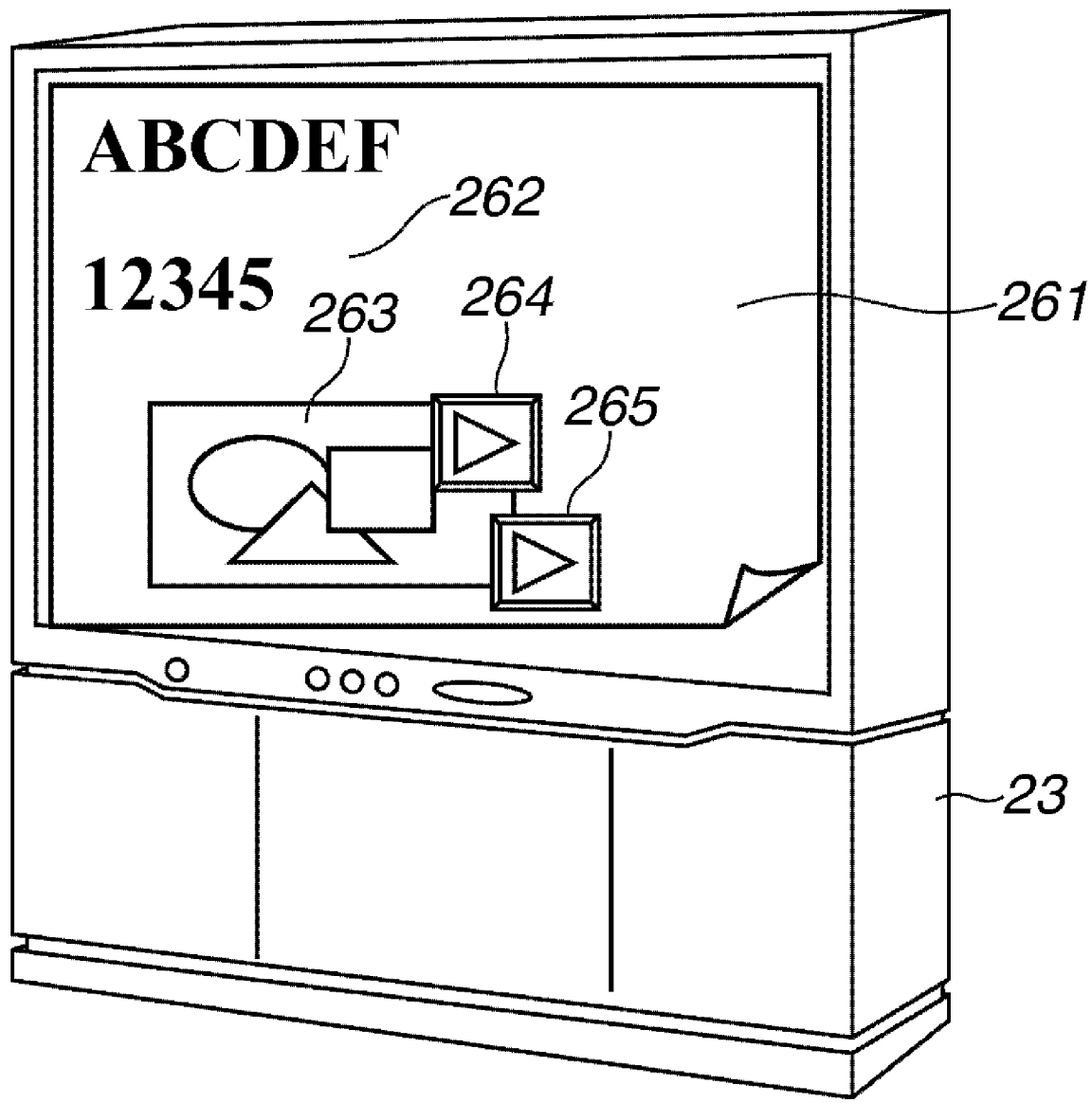
FIG. 26 is a diagram illustrating an example of a display screen image displayed in a display apparatus according to the third exemplary embodiment.

FIG. 26 is a diagram illustrating a display screen image displayed in the display apparatus 23 according to the third exemplary embodiment. A scanned document 261 represented by computerized data corresponding to the document 251 shown in FIG. 25 is displayed on the screen of the display apparatus 23. The scanned document 261 includes a text region 262 and an image region 263. GUI components 264 and 265 respectively corresponding to "reproduction buttons", which are created by the handwritten commands 254 and 255 shown in FIG. 25, are displayed on the screen of the display apparatus 23. The image region 263 is associated with a moving image included in the original document that corresponds to the scanned document 261 and that is searched for by the display apparatus 23. The "reproduction button" means that an operation on the moving image can be performed.

Figures 27, 28:
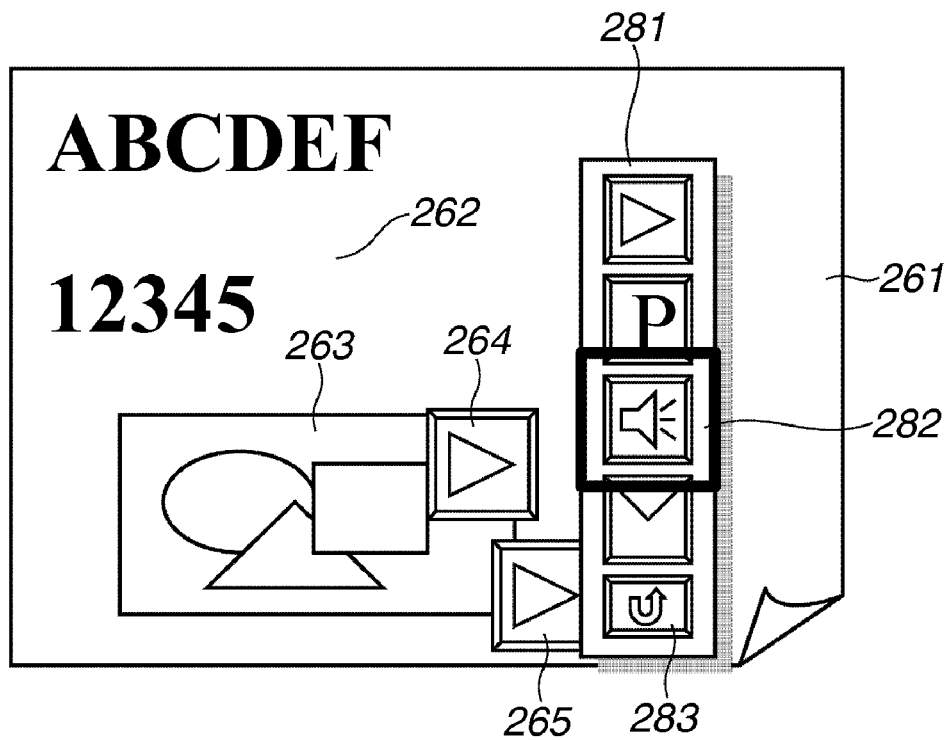
FIG. 27 is a table illustrating an example of data concerning a GUI component displayed in the display apparatus according to the third exemplary embodiment.
FIG. 28 is a diagram illustrating a GUI component alteration operation screen image displayed in the display apparatus according to the third exemplary embodiment.

FIG. 27 is a table illustrating an example of data concerning a GUI component displayed in the display apparatus 23 according to the third exemplary embodiment. GUI component data includes information on a function corresponding to a GUI component, information on the relative display position and the size of the GUI component, and information on an instruction target object. The GUI component data 271 is held in the data memory 5. The GUI component data 271 shown in FIG. 27 corresponds to, for example, the GUI component 264 shown in FIG. 26.

According to the GUI component data 271 shown in FIG. 27, a "moving image object 263" is recorded as an instruction target. A "reproduction" function is recorded as the function corresponding to a process to be performed on the instruction target. Data (50, 55) and (60, 65) is recorded as the relative display position and the size of the GUI component. The present exemplary embodiment is assumed to permit the GUI components, which have the same function performed on the same instruction target (or perform the same process thereon), to overlap with each other, so that two "reproduction buttons" are provided. In a case where GUI components, which have the same function performed on the same instruction target (or perform the same process thereon), are inhibited from overlapping with each other, GUI components having different functions are provided.

FIG. 28 is a diagram illustrating a GUI component alteration operation screen image displayed in the display apparatus 23 according to the third exemplary embodiment. A scanned document 261 corresponding to the document 251 shown in FIG. 25 is displayed on the display screen of the display apparatus 23 shown in FIG. 28. Also, the text region 262, the image region 263, and the GUI components 264 and 265, which represent the "reproduction buttons" created from the handwritten commands 254 and 255 shown in FIG. 25, are displayed on the display screen of the display apparatus 23 shown in FIG. 28.

FIG. 28 shows an example in which an effective GUI list window 281 is displayed in response to an effective GUI list window display instruction operation performed by a user designating the GUI component 265 corresponding to the "reproduction button." In the effective GUI list window 281 of this example, a GUI component 282 corresponding to a "sound-volume change button" is brought into a selected state. Also, in this example, the region 263 including an instruction target object, which corresponds to the GUI component in the effective GUI list, is indicated with a thick frame to be distinguishable by the user.

For example, when the button corresponding to the GUI component is pushed, e.g., for at least a predetermined period of time, by a user using a pointing device, the display apparatus 23 determines that the user performs an effective-GUI-list-window display instruction operation. Then, the display apparatus 23 displays the effective GUI list window 281 on the screen thereof, as shown in FIG. 28.

Figures 29, 30:
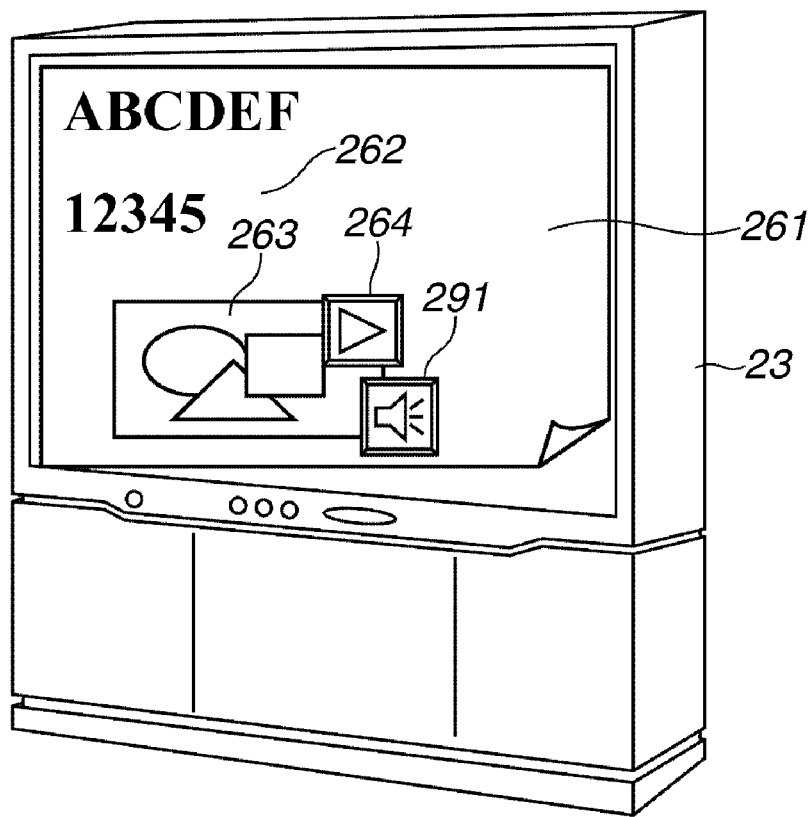
FIG. 29 is a diagram illustrating an example of a display screen image displayed in the display apparatus after a GUI component alteration operation illustrated in FIG. 28 is performed on the display screen illustrated in FIG. 26.
FIG. 30 is a table illustrating another example of data concerning a GUI component displayed in the display apparatus according to the third exemplary embodiment.

FIG. 29 is a diagram illustrating an example of a display screen image displayed in the display apparatus after a GUI component alteration operation illustrated in FIG. 28 is performed on the display screen illustrated in FIG. 26. The display screen image shown in FIG. 29 differs from the display screen image shown in FIG. 26 in that the GUI component 265 corresponding to the "reproduction button" is changed to the GUI component 291 corresponding to the "sound-volume change button."

FIG. 30 is a table illustrating data concerning a GUI component displayed in the display apparatus 23 according to the third exemplary embodiment. The GUI component data shown in FIG. 30 differs from the GUI component data shown in FIG. 27 in that the GUI component data 272 is changed to (or is replaced with) the GUI component data 301. The GUI component data shown in FIG. 30 is held in the data memory 5.

Figure 31:
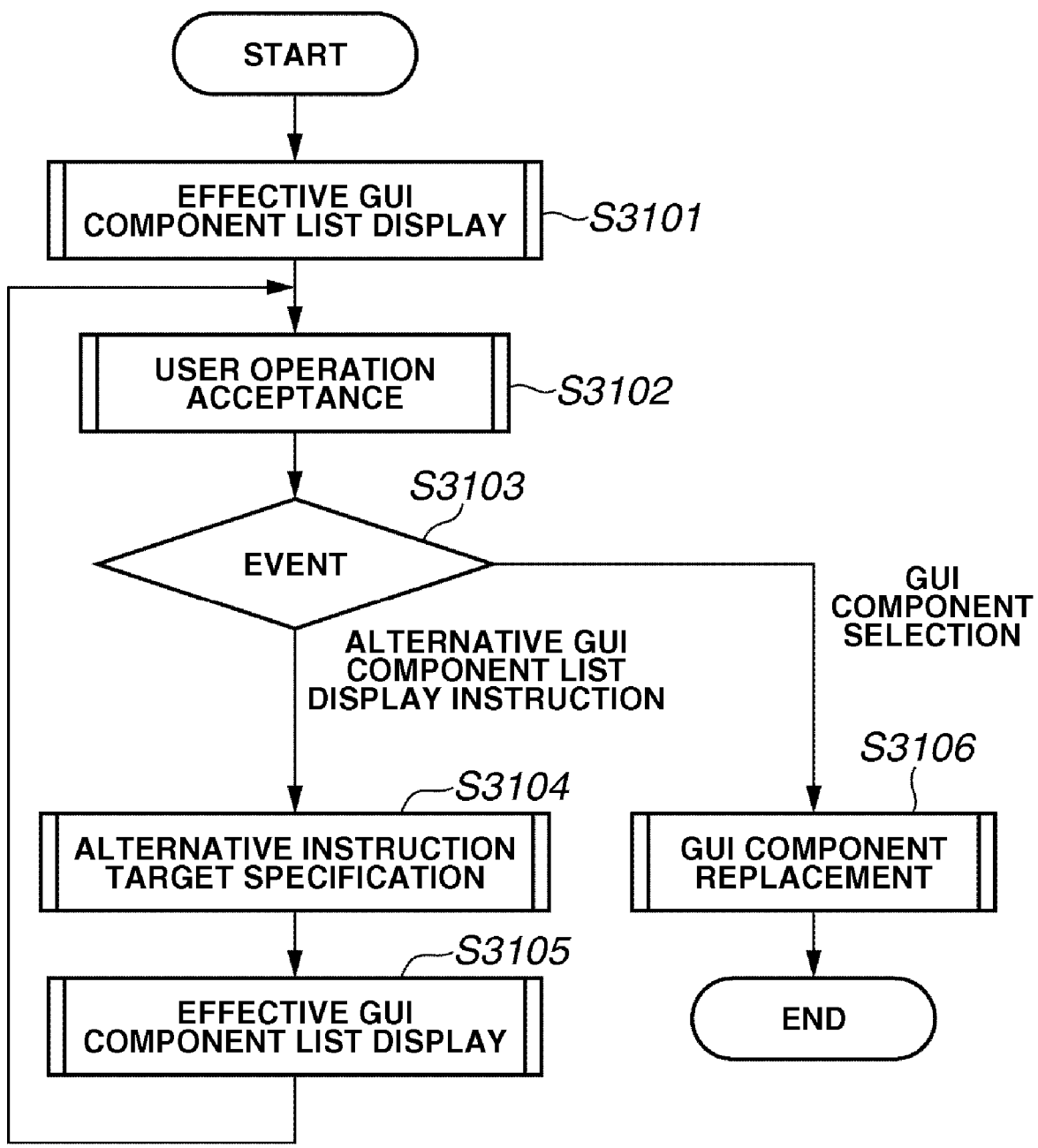
FIG. 31 is a flowchart illustrating an example of a GUI component alteration process.

FIG. 31 is a flowchart illustrating an example of the GUI component alteration process. The process shown in FIG. 31 is described below being assumed to be performed by the GUI component alteration unit 43 shown in FIG. 4, which serves as a functional component of the display apparatus 23.

In step S3101, the GUI component alteration unit 43 performs an effective GUI component list process. The GUI component alteration unit 43 displays a list (or effective GUI list window) of the GUI components that are selected, e.g., by being pushed via a pointing device, from the GUI components currently displayed and that correspond to instruction target objects which can be employed as instruction targets. The effective GUI component list process will be described in detail below by referring to FIG. 32.

In step S3102, the GUI component alteration unit 43 performs a user operation process and accepts a user operation (or event). If, in step S3103, the GUI component alteration unit 43 determines that a user instructs the display of an alternative GUI component list, the processing advances to step S3104. If, in step S3103, the GUI component alteration unit 43 determines that a user instructs the selection of an alternative GUI component, the processing proceeds to step S3106.

In step S3104, the GUI component alteration unit 43 performs an alternative instruction target specification process to specify an alternative instruction target object instead of an instruction target object that is an instruction target corresponding to the GUI component currently selected in the scanned document. Subsequently, in step S3105, the GUI component alteration unit 43 performs the effective GUI component list process and displays a list of effective GUI components (that is, an effective GUI list window) relating to the alternative instruction target object specified in step S3104. Then, the processing returns to step S3102.

In step S3106, the GUI component alteration unit 43 performs a GUI component replacement process. The GUI component alteration unit 43 replaces a GUI component currently selected in the scanned document (for example, the GUI component 265 shown in FIG. 28) with a GUI component selected from the effective GUI list window (for instance, the GUI component 282 shown in FIG. 28).

Figure 32:
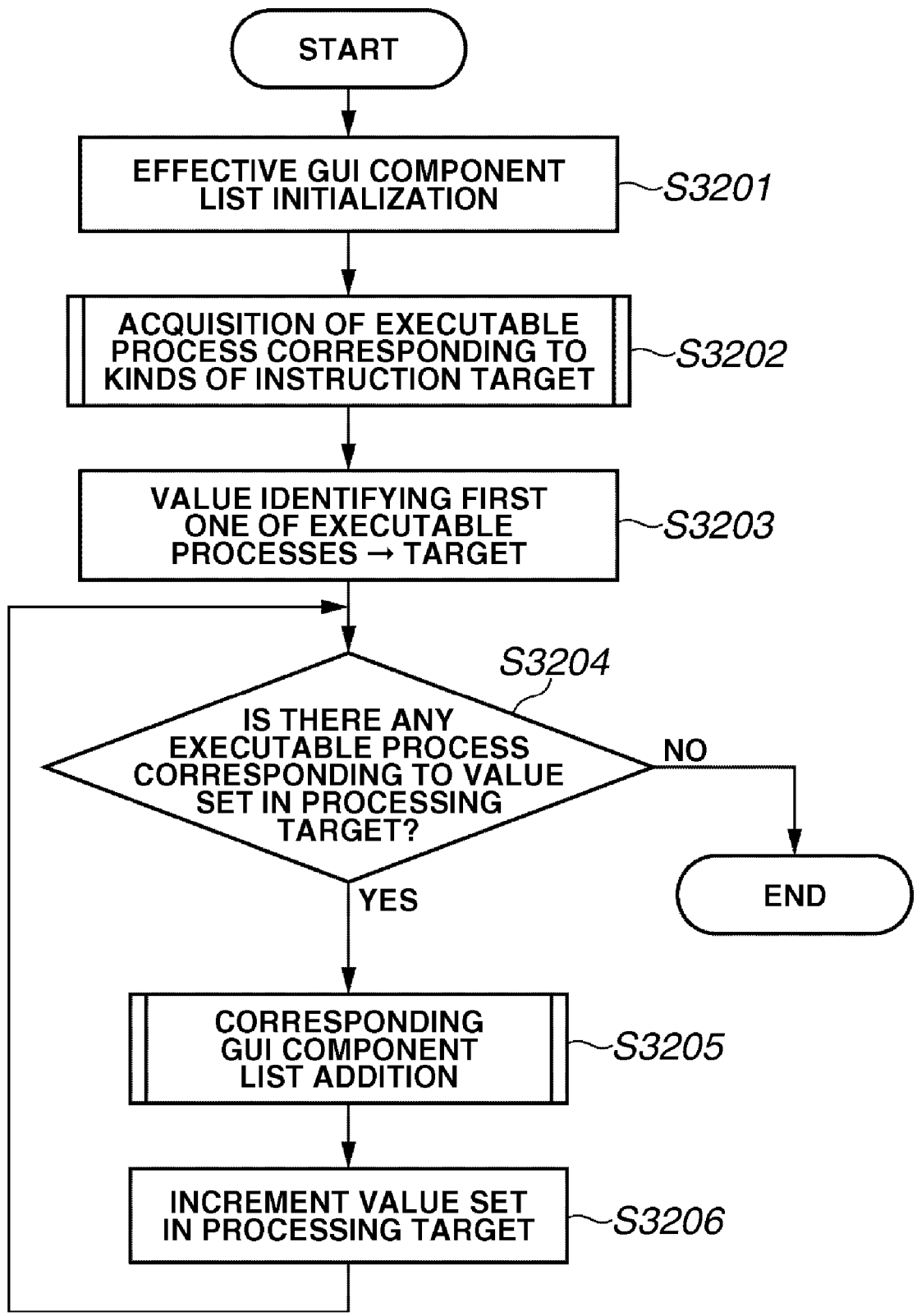
FIG. 32 is a flowchart illustrating an example of an effective GUI component list process.

FIG. 32 is a flowchart illustrating an example of the effective GUI component list process. The process shown in FIG. 32 is described below being assumed to be performed by the effective GUI component list unit 4j of the GUI component alteration unit 43 shown in FIG. 4.

In step S3201, the effective GUI component list unit 4j initializes the effective GUI component list. Subsequently, in step S3202, the effective GUI component list unit 4j performs a process to acquire data representing an executable process corresponding to the instruction target kind. The effective GUI component list unit 4j acquires an executable process list of executable processes, which correspond to current instruction target objects (for example, a moving image, a still image, and a scanned document itself), from the executable process definition data shown in FIG. 20. For example, in a case where the current instruction target object is a moving image, the effective GUI component list unit 4j acquires an executable process list including a "print" process, a "reproduction" process, a "sound-volume change" process, and a "transmission" process.

In step S3203, the effective GUI component list unit 4j sets a value identifying an executable process, which is included in the executable process list acquired in step S3202, in the variable "processing target" to initialize the variable "processing target." For example, in a case where there are four executable processes in the executable process list, the effective GUI component list unit 4j sets a value representing an executable process recorded in the leading cell of the executable process list in the variable "processing target."

In step S3204, the effective GUI component list unit 4j determines whether there is an executable process corresponding to the value set in the variable "processing target." If the effective GUI component list unit 4j determines that there is an executable process corresponding to the value set in the variable "processing target" (YES in step S3204), the processing advances to step S3205. If the effective GUI component list unit 4j determines that there is no executable process corresponding to the value set in the variable "processing target" (NO in step S3204), the effective GUI component list process ends.

In step S3205, the effective GUI component list unit 4j performs a corresponding GUI component list addition process to add a GUI component corresponding to the executable process, which is performed on the instruction target object to be processed, to a list of the effective GUI components. Then, the effective GUI component list unit 4j displays the list.

Subsequently, in step S3206, the effective GUI component list unit 4j increments the value set in the variable "processing target" by, for example, 1. Then, the processing returns to step S3204.

The effective GUI component list unit 4j can display an effective GUI component list, in which the GUI components are arranged in the order defined by the executable process definition data shown in FIG. 20, in the effective GUI component list process. Alternatively, in the effective GUI component list process, the effective GUI component list unit 4j can display an effective GUI component list, in which GUI components are arranged from the GUI component closest in shape to the handwritten command in the order of degree of similarity in shape, according to a result of interpretation of a handwritten command, which is performed by, for example, the scanned document interpretation unit 49. Thus, a user can find an effective GUI component, which is closest in shape to the handwritten command written by the user, by serially checking the cells of the list from the top of the list to search the list for the GUI component.

Alternatively, the effective GUI component list unit 4j can exclude GUI components, the shape of each of which differs from that of the handwritten command by an amount that is equal to or more than a threshold value, from the effective GUI component list in the effective GUI component list process. Thus, the GUI components, the shape of each of which differs from that of the handwritten command by an amount that is equal to or more than a threshold value, can be deleted from the effective GUI component list. Consequently, a list of appropriate GUI components can be displayed.

Figure 33:
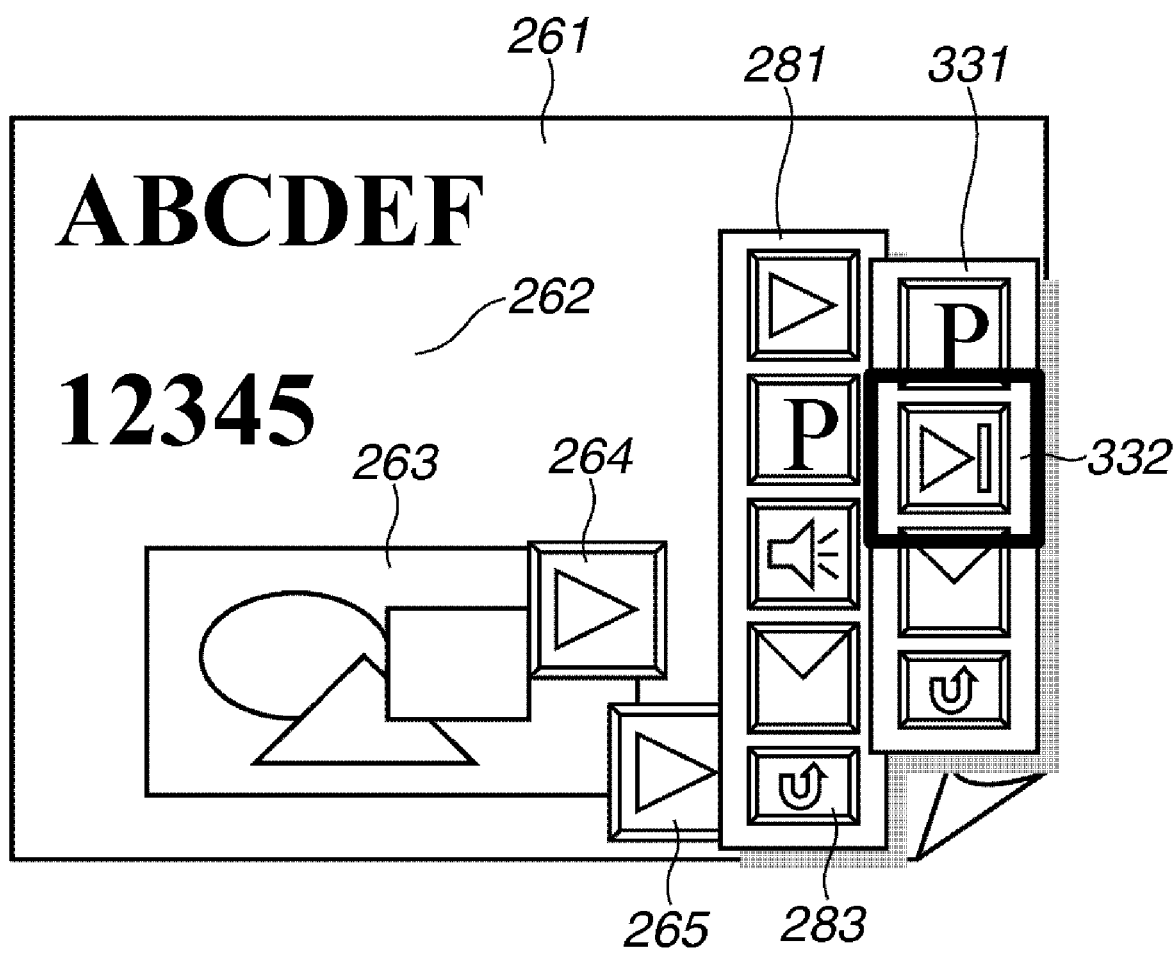
FIG. 33 is a diagram illustrating a GUI component alteration operation screen image displayed in the display apparatus according to the third exemplary embodiment.

FIG. 33 is a diagram illustrating an example of a GUI component alteration operation screen image displayed in the display apparatus 23 according to the third exemplary embodiment. FIG. 33 shows an example in which a list 331 of effective GUI components corresponding to alternative instruction target objects is displayed on the GUI component alteration operation screen shown in FIG. 28 as a result of performing an alternative GUI component list instruction operation by a user. The alternative GUI component list instruction operation performed by a user is, for example, an operation of depressing an alternative GUI component list display button 283. FIG. 33 also shows an example in which a GUI component 332 corresponding to the "next page button" is selected by a user in the effective GUI component list 331.

The effective GUI component list 331 shown in FIG. 33 is displayed in the display apparatus 23 in response to a change of the instruction target object 263 corresponding to the GUI component 265 to the alternative instruction target object 261. The effective GUI component list 331 shown in FIG. 33 is displayed in the display apparatus 23 so that the change of the instruction target object corresponding to the GUI component 265 can be seen.

Figures 34, 35:
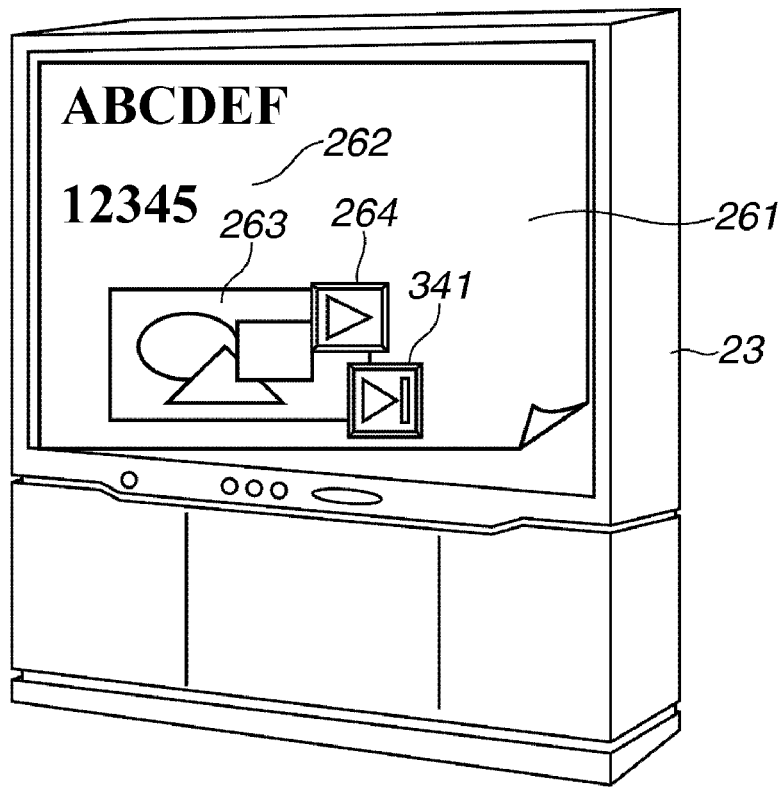
FIG. 34 is a diagram illustrating an example of a display screen image displayed in the display apparatus after a GUI component alteration operation is performed on the display screen illustrated in FIG. 33.
FIG. 35 is a table illustrating an example of data concerning a GUI component displayed in the display apparatus after a GUI component alteration operation is performed on the display screen illustrated in FIG. 33.

FIG. 34 is a diagram illustrating an example of a display screen image displayed in the display apparatus 23 after the GUI component alteration operation is performed on the GUI component alteration operation display screen illustrated in FIG. 33. The display screen image shown in FIG. 34 differs from the display screen image shown in FIG. 33 in that the GUI component 265 corresponding to the "reproduction button" is replaced with the GUI component 341 corresponding to the "next page button."

FIG. 35 is a table illustrating data concerning a GUI component displayed in the display apparatus 23 after the GUI component alteration operation is performed on the GUI component alteration operation display screen illustrated in FIG. 33. The GUI component data shown in FIG. 35 differs from the GUI component data shown in FIG. 27 in that the GUI component 272 is changed to the GUI component 351.

According to the GUI component data 272 shown in FIG. 27, the "reproduction" function is recorded as the function performed in the process on the instruction target. The "moving image 263" is recorded as the instruction target. Meanwhile, according to the GUI component data 351 shown in FIG. 35, the "next page" function is recorded as the function performed in the process on the instruction target. The "scanned document itself 261" is recorded as the instruction target. The GUI component data shown in FIG. 35 is held in the data memory 5.

As described above, according to the third exemplary embodiment, the display apparatus 23 changes an erroneously recognized GUI component to an appropriate GUI component according to an instruction from a user. Thus, the operability with respect to document data representing a currently displayed document can be enhanced.

According to the third exemplary embodiment, the display apparatus 23 displays a list of effective GUI components corresponding to an instruction target according to an instruction from a user. Thus, the operability with respect to document data representing a currently displayed document can be enhanced.

According to the third exemplary embodiment, the display apparatus 23 can iteratively perform a process of specifying an alternative instruction target. Thus, for example, in a case where no effective GUI component is included in the effective GUI list window, a user can re-specify an instruction target. Consequently, the operability with respect to document data representing a currently displayed document can be enhanced.

Fourth Exemplary Embodiment

A fourth exemplary embodiment, in which a display apparatus 23, when displaying a scanned document, switches between display and non-display of an associated GUI component corresponding to the scanned document, is described by referring to FIGS. 36 to 39. The configuration of a display system including an image forming apparatus 22 and the display apparatus 23 is similar to the display system according to the first exemplary embodiment. Thus, the description of the display system is not repeated.

Figure 36:
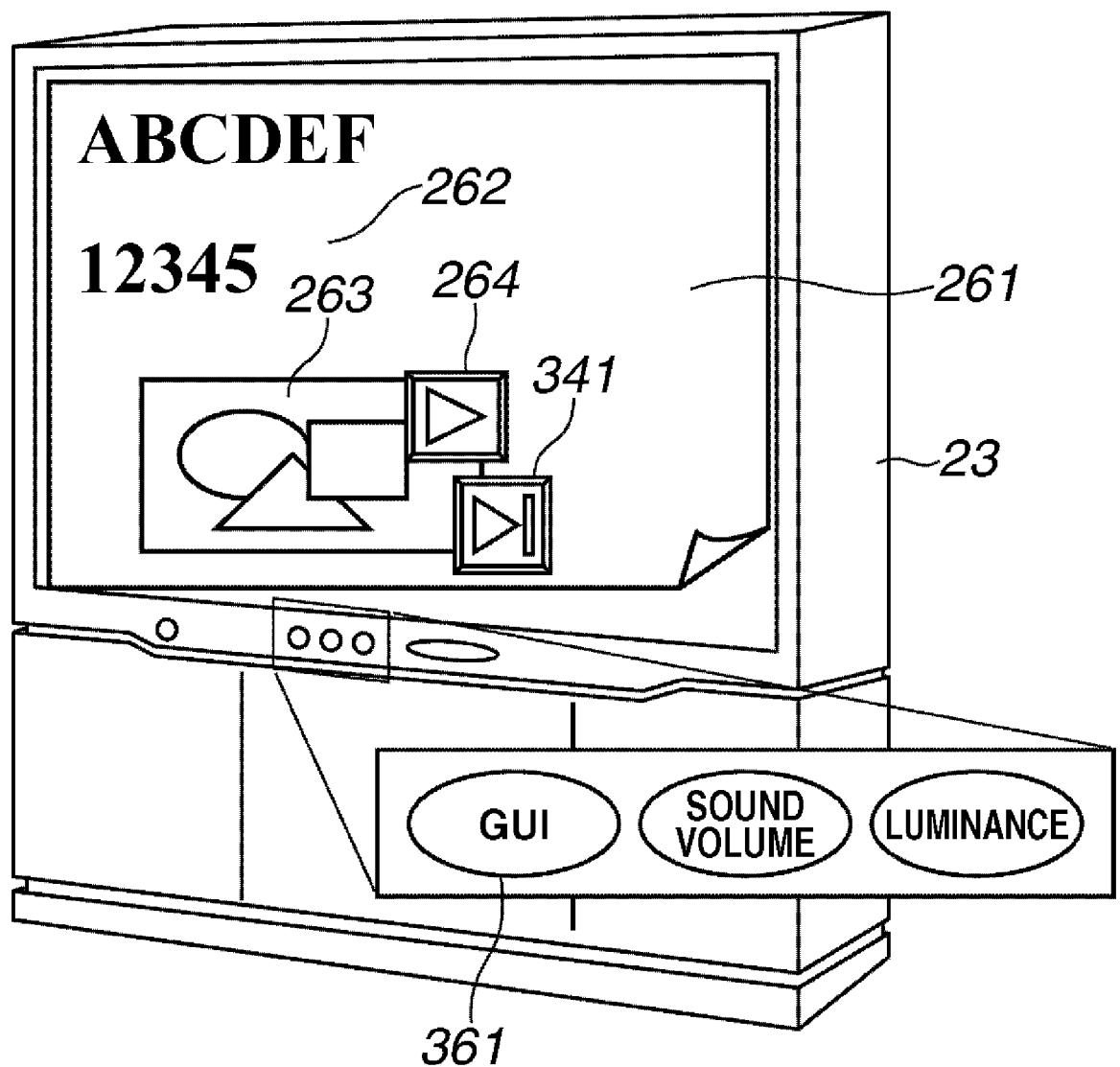
FIG. 36 is a diagram illustrating an example of a display screen image displayed in a display apparatus according to a fourth exemplary embodiment.

FIG. 36 is a diagram illustrating an example of a display screen image displayed in the display apparatus 23 according to the fourth exemplary embodiment. A scanned document 261 represented by computerized data and GUI components 264 and 341 are displayed on the screen of the display apparatus 23.

The display apparatus 23 shown in FIG. 36 has a GUI component display switch button 361. For example, when receiving a GUI component switch instruction issued by a user depressing the GUI component switch button 361, the display apparatus 23 switches between display and non-display of each of the GUI components 264 and 341.

Figure 37:
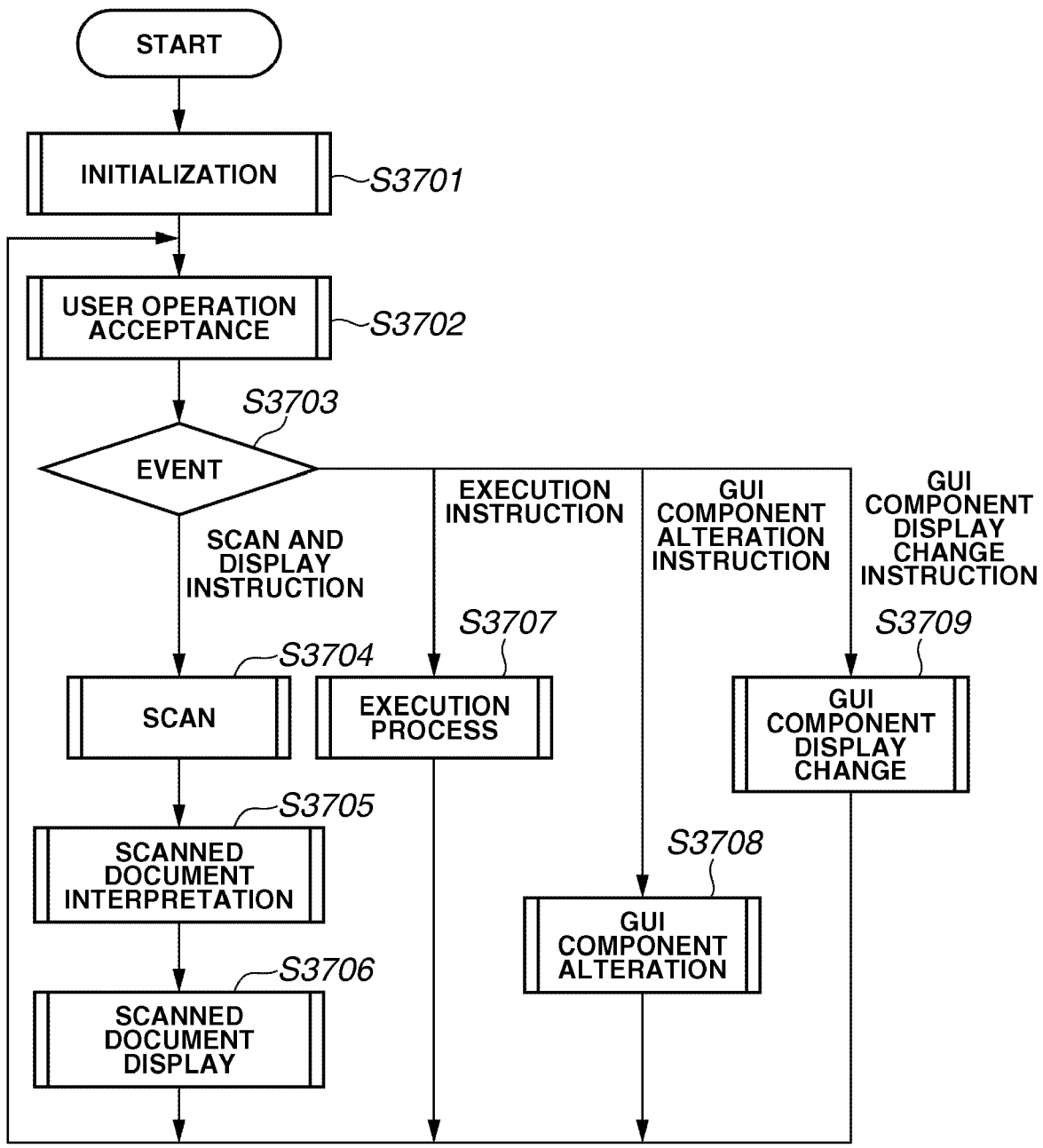
FIG. 37 is a flowchart illustrating an example of an overall process to be performed by the display apparatus according to the fourth exemplary embodiment.

FIG. 37 is a flowchart illustrating an example of an overall process to be performed by the display system according to the fourth exemplary embodiment. In step S3701, the image forming apparatus 22 and the display apparatus 23 perform an initialization process to perform an initialization operation, such as an operation of displaying an operation screen image. Subsequently, in step S3702, the image forming apparatus 22 and the display apparatus 23 accept a user operation (or event).

Subsequently, in step S3703, the image forming apparatus 22 and the display apparatus 23 determine an event. If the image forming apparatus 22 determines that a user instructs the scan and the display, the processing proceeds to step S3704. If the display apparatus 23 determines that a user instructs the execution of a process, the processing proceeds to step S3707. If the display apparatus 23 determines that a user instructs the alteration of a GUI component, the processing proceeds to step S3708. If the display apparatus 23 determines that a user instructs the switch of the display of a GUI component, the processing proceeds to step S3709.

In step S3704, a document, on which a handwritten command is written, is scanned by the image forming apparatus 22. Thus, the image forming apparatus 22 acquires computerized data representing the scanned document. Subsequently, in step S3705, the display apparatus 23 performs a scanned document interpretation process to interpret, for example, a handwritten command written on the scanned document as a GUI component. Then, in step S3706, the display apparatus 23 performs a scanned document display process to display the GUI component together with a scanned document from which a handwritten command is removed.

In step S3707, the display apparatus 23 performs an execution process. Thus, the display apparatus 23 performs a process, which is instructed by a user and corresponds to a menu item or to a GUI component. In step S3708, the display apparatus 23 performs a GUI component alteration (or replacement) process. Thus, the display apparatus 23 changes a currently displayed GUI component to a designated GUI component. In step S3709, the display apparatus 23 performs the GUI component display switch process. Thus, the display apparatus 23 switches between the display and the non-display of a GUI component. The GUI component display switch process is described in detail below by referring to FIG. 39.

After processing the event (steps S3704-S3706 for a scan and display instruction, step S3707 for an execution instruction, step S3708 for a GUI component alteration instruction or step S3709 for a component display change instruction), processing returns to step S3702.

FIG. 38 is a table illustrating an example of GUI component data according to the fourth exemplary embodiment. The GUI component data includes information representing ID that identifies GUI component data, information on a function corresponding to the GUI component, information on the relative display position and the size of the GUI component, information on a scanned document ID identifying a corresponding scanned document, and information on an instruction target object. The GUI component data shown in FIG. 38 is held in the data memory 5. According to GUI component data 382, the ID "115" representing the GUI component data is recorded. The "next page" function is recorded as the function corresponding to the instruction target. The data (60, 85) and (70, 95) is recoded as the relative display position and the size of the GUI component. According to the GUI component data 382, the scanned document ID "file021" (corresponding to, for example, the scanned document 261 shown in FIG. 36) is recorded. Also, the information representing "the scanned document itself 261" is recorded as information representing an instruction target.

Figure 39:
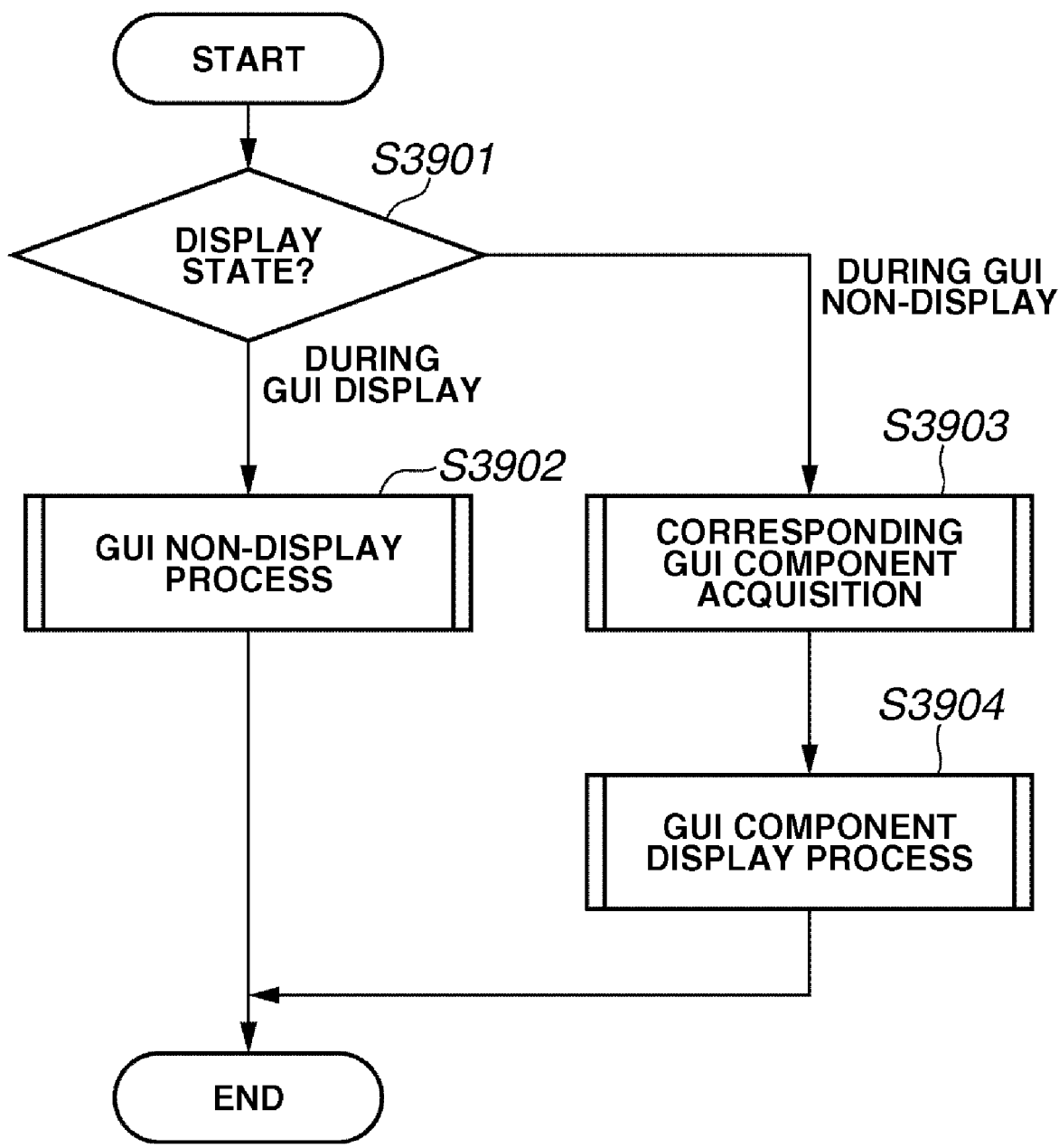
FIG. 39 is a flowchart illustrating another example of the GUI component alteration process.

FIG. 39 is a flowchart illustrating an example of the GUI component alteration process. In step S3901, the display apparatus 23 determines a current display state of the GUI component. If the display apparatus 23 determines that the GUI component is currently displayed, the processing advances to step S3902. If the display apparatus 23 determines that the GUI component is currently put in a non-display state, the processing proceeds to step S3903.

In step S3902, the display apparatus 23 performs a GUI component non-display process to put the currently displayed GUI component into a non-display state. Then, the display apparatus 23 the GUI component display switch process ends. On the other hand, in step S3903, the display apparatus 23 performs a corresponding GUI component acquisition process to search the GUI component data shown in FIG. 38 for the GUI component corresponding to the scanned document currently displayed in the display apparatus 23.

Subsequently, in step S3904, the display apparatus 23 performs a GUI component display process. Then, the display apparatus 23 displays all the GUI components, which are acquired in step S3903, on the screen thereof. Subsequently, the display apparatus 23 terminates the GUI component display switch process.

In the foregoing description, it has been described that if the display apparatus 23 determines that a user instructs the switch of the display of the GUI component, the display apparatus 23 switches between the display and the non-display of the GUI component. However, if the display apparatus 23 determines that a user instructs the switch of the display of the GUI component, a display mode can be switched. Also, the display apparatus 23 can perform the display and the non-display of the GUI component according to the display mode in the scanned document display process after the display mode is switched.

As described above, according to the fourth exemplary embodiment, the display apparatus 23 associates the scanned document with the corresponding GUI component and stores and manages the scanned document and the corresponding GUI component. Also, the display apparatus 23 performs the display and the non-display of the GUI component according to an instruction from a user. Thus, the display apparatus 23 can display the GUI component only when needed. Consequently, the operability with respect to the document data representing a currently displayed document can be enhanced.

Fifth Exemplary Embodiment

Hereinafter, a fifth exemplary embodiment, in which a display apparatus 23 can inhibit processes other than the execution of a process corresponding to the GUI component, is described by referring to FIGS. 40 and 41. The configuration of a display system including an image forming apparatus 22 and the display apparatus 23 is similar to the display system according to the first exemplary embodiment. Thus, the description of the display system is not repeated.

Figure 40:
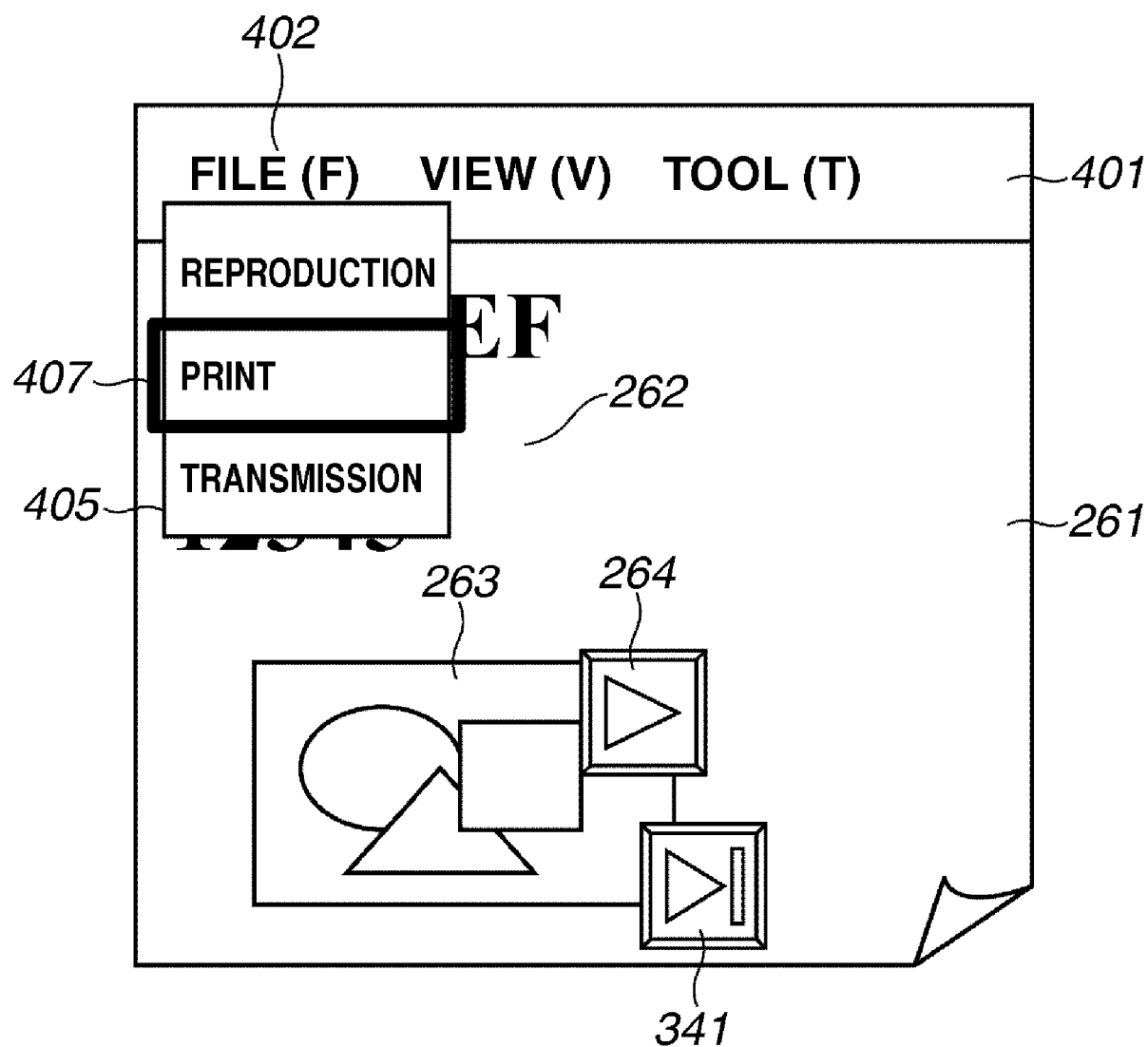
FIG. 40 is a diagram illustrating an example of a display screen image displayed in a display apparatus according to a fifth exemplary embodiment.

FIG. 40 is a diagram illustrating an example of a display screen image displayed in the display apparatus 23 according to the fifth exemplary embodiment. A scanned document 261 represented by computerized data, GUI components 264 and 341, and a menu bar 401 are displayed on the screen of the display apparatus 23. In the example shown in FIG. 40, a submenu 405 of a menu item 402 is displayed being deployed from the menu bar 401, and a user selects a "print" process that is a submenu item 407.

Figure 41:
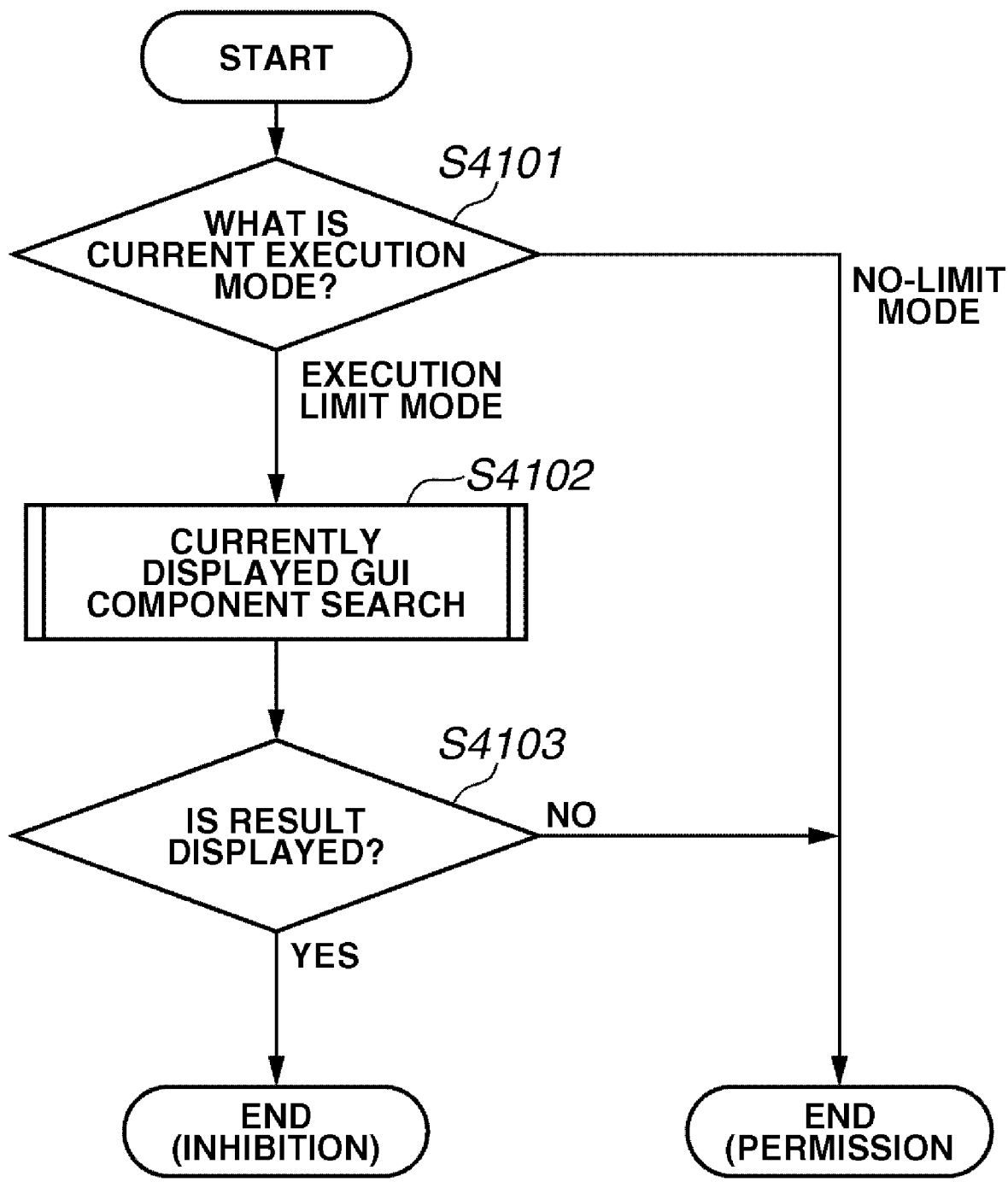
FIG. 41 is a flowchart illustrating an example of an execution permission determination process.

FIG. 41 is a flowchart illustrating an example of an execution permission determination process. The process shown in FIG. 41 is described below being assumed to be performed by the execution unit 42 shown in FIG. 4. In step S4101, the execution unit 42 determines the current execution mode. If the execution unit 42 determines that the current execution mode is an execution limit mode, the processing advances to step S4102. If the execution unit 42 determines that the current execution mode is a no-limit mode, the processing permits the execution and finishes the execution permission determination process.

In step S4102, the execution unit 42 performs a currently displayed GUI component search process to determine whether a GUI component corresponding to a process, the execution of which is instructed by a user using a menu item, is displayed in the display apparatus 23. If, in step S4103, the execution unit 42 determines that a GUI component corresponding to a process, the execution of which is instructed by a user using a menu item, is displayed in the display apparatus 23, the execution unit 42 permits the execution of the process. Then, the execution unit 42 finishes the execution permission determination process. If, in step S4103, the execution unit 42 determines that no GUI component corresponding to a process, the execution of which is instructed by a user using a menu item, is displayed in the display apparatus 23, the execution unit 42 inhibits the execution of the process. Then, the execution unit 42 finishes the execution permission determination process.

As described above, according to the fifth exemplary embodiment, the display apparatus 23 can inhibit the execution of processes other than the execution of the process corresponding to the GUI component created and displayed. Thus, a malfunction can be prevented. The operability with respect to the document data representing a currently displayed document can be enhanced. Because a malfunction can be prevented, safety can be ensured (that is, security can be enhanced).

Sixth Exemplary Embodiment

A process, in which the display apparatus 23 specifies an operation corresponding to a handwritten command and associates this operation with the handwritten command, is described by referring to FIGS. 42 to 48.

Figure 42:
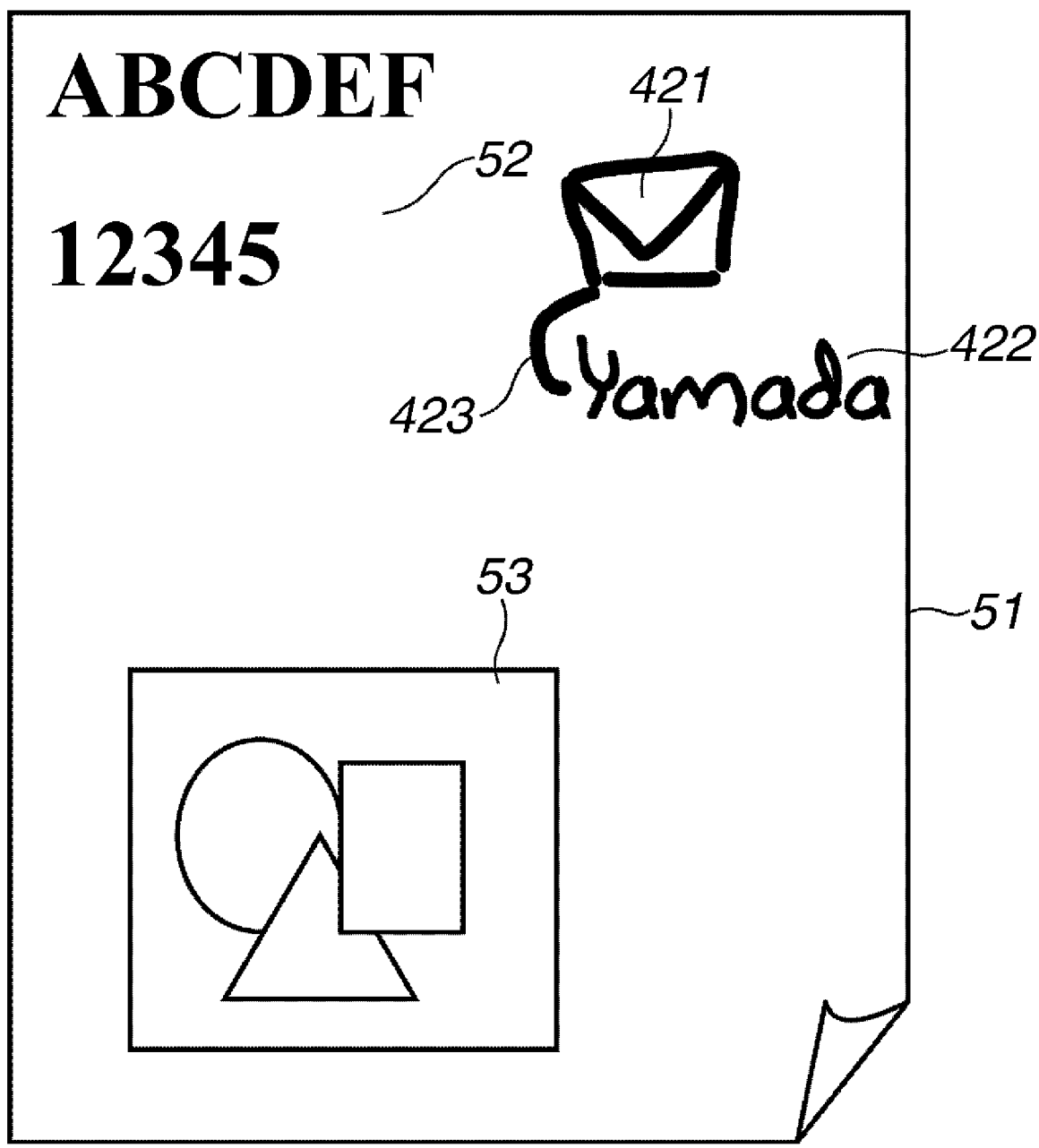
FIG. 42 is a diagram illustrating an example of a document on which a handwritten command and handwritten operation content are written.

FIG. 42 is a diagram illustrating an example of a document on which a handwritten command and handwritten operation content are written. A document 51 shown in FIG. 42 includes a text region 52 and an image region 53. Also, a handwritten command 421, handwritten operation content 422 and a handwritten command association instruction 423 are written on the document 51.

Figures 43, 44:
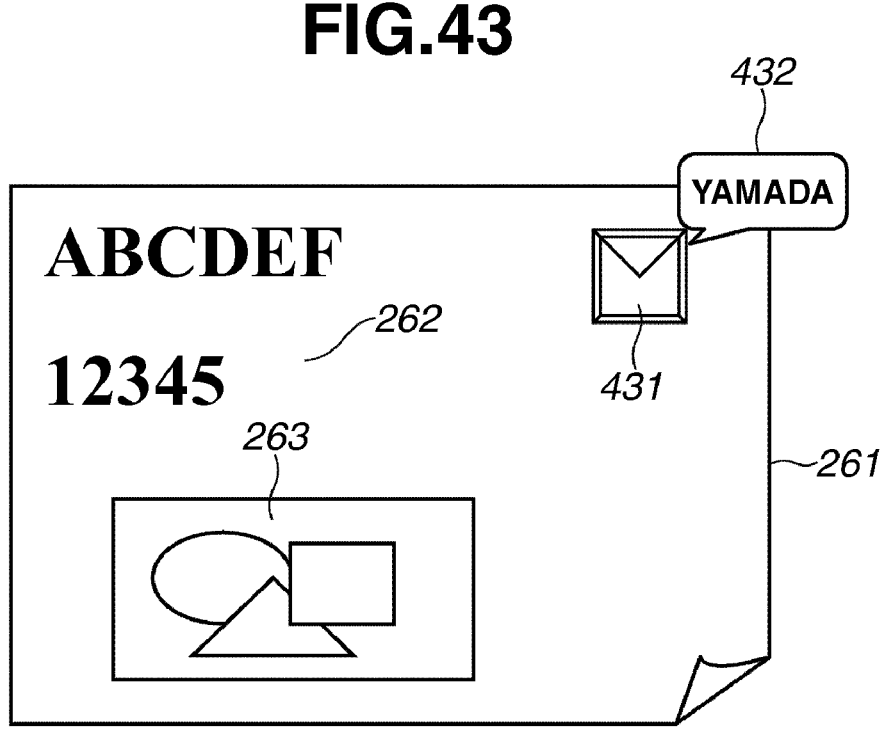
FIG. 43 is a diagram illustrating an example of a display screen image displayed in a display apparatus according to a sixth exemplary embodiment.
FIG. 44 is a table illustrating an example of data concerning a GUI component displayed in the display apparatus according to the sixth exemplary embodiment.

FIG. 43 is a diagram illustrating an example of a display screen image displayed in the display apparatus 23 according to the sixth exemplary embodiment. A scanned document 261 represented by computerized data corresponding to the document 51 shown in FIG. 42 is displayed on the screen of the display apparatus 23. Also, a GUI component 431 corresponding to a "transmission", which is created from the handwritten command 421 shown in FIG. 42, and an operation balloon help 432 created from the handwritten operation content 422 shown in FIG. 42 are displayed on the screen of the display apparatus 23. The GUI component 431 and the operation balloon help 432 are associated with each other by the handwritten command association instruction 423. The operation balloon help 432 can be adapted to be displayed by the display apparatus 23 when a pointing device is positioned on the GUI component 431.

FIG. 44 is a table illustrating an example of data concerning a GUI component displayed in the display apparatus 23 according to the sixth exemplary embodiment. GUI component data includes information on a function corresponding to a GUI component, information on the relative display position and the size of the GUI component, information on an instruction target object, and information on an operation corresponding to the GUI component. The GUI component data shown in FIG. 44 is held in the data memory 5. For example, according to GUI component data 441, the "transmission" is recorded as the function corresponding to an instruction target. Data (70, 10) and (90, 25) is recorded as the relative display position and the size of the GUI component, respectively. According to the GUI component data 441, the "scanned document itself 261" is recorded as an instruction target. Also, the expression "Yamada" is recorded as data representing an operation. That is, when the GUI component corresponding to the GUI component data 441 is depressed by a user, the execution unit 42 transmits data representing the entire scanned document 261 to "Yamada" according to the GUI component data 441.

Figure 45:
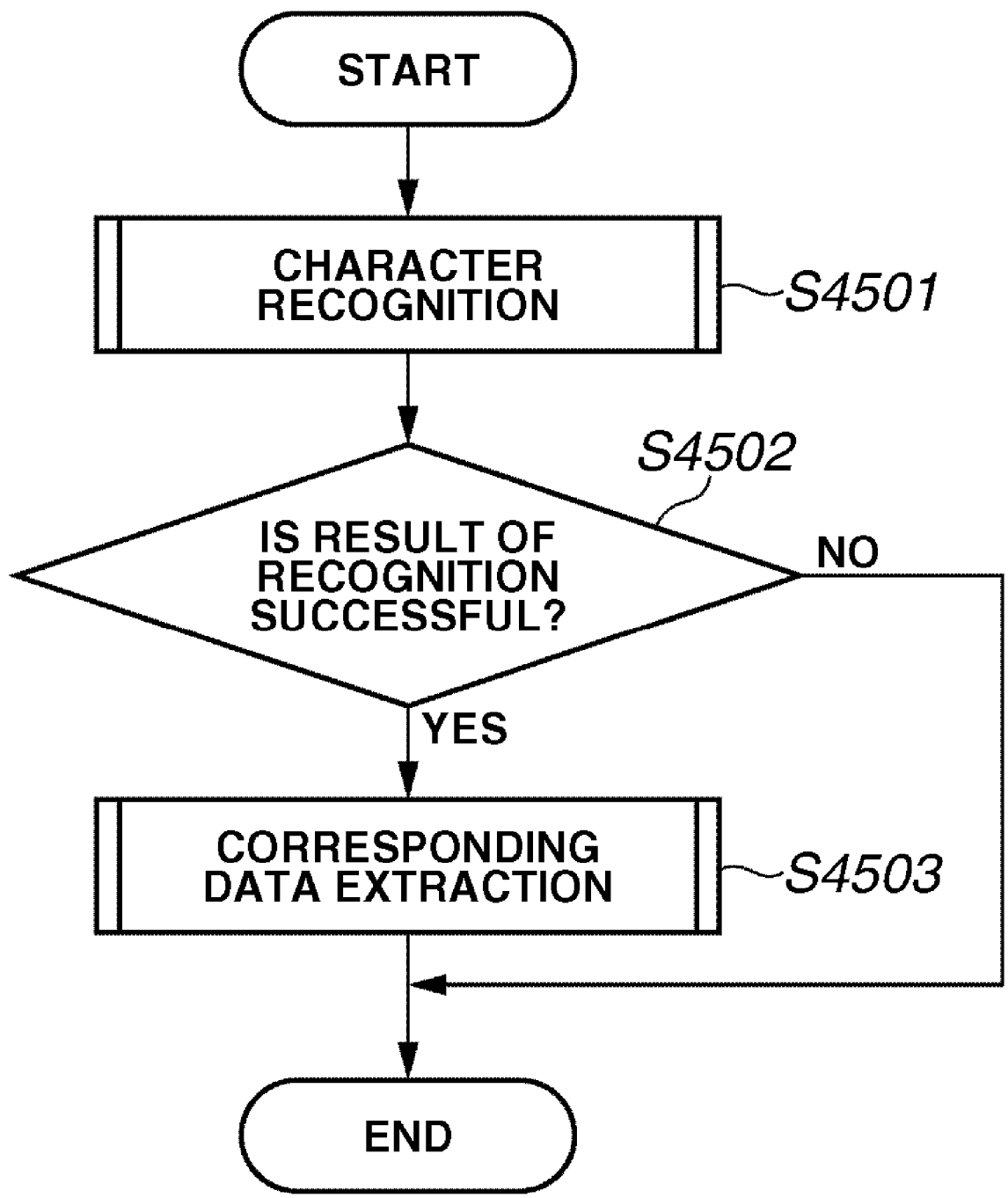
FIG. 45 is a flowchart illustrating an example of an operation specification process.

FIG. 45 is a flowchart illustrating an example of an operation specification process. The process shown in FIG. 45 is described below being assumed to be performed by the operation specification unit 4d of the scanned document interpretation unit 49 shown in FIG. 4.

In step S4501, the operation specification unit 4d performs a character recognition process to recognize characters written on the scanned document. Subsequently, in step S4502, the operation specification unit 4d determines whether character recognition performed in step S4501 is successful. If the operation specification unit 4d determines that the character recognition performed in step S4501 is successful, the processing advances to step S4503. If the operation specification unit 4d determines that the character recognition performed in step S4501 is not successful, the operation specification process ends.

In step S4503, the operation specification unit 4d performs a corresponding data extraction process to extract data corresponding to characters or a character string recognized in step S4501 (for example, the handwritten operation content 422 shown in FIG. 42) from the scanned document. Then, the processing finishes the operation specification process.

Figure 46:
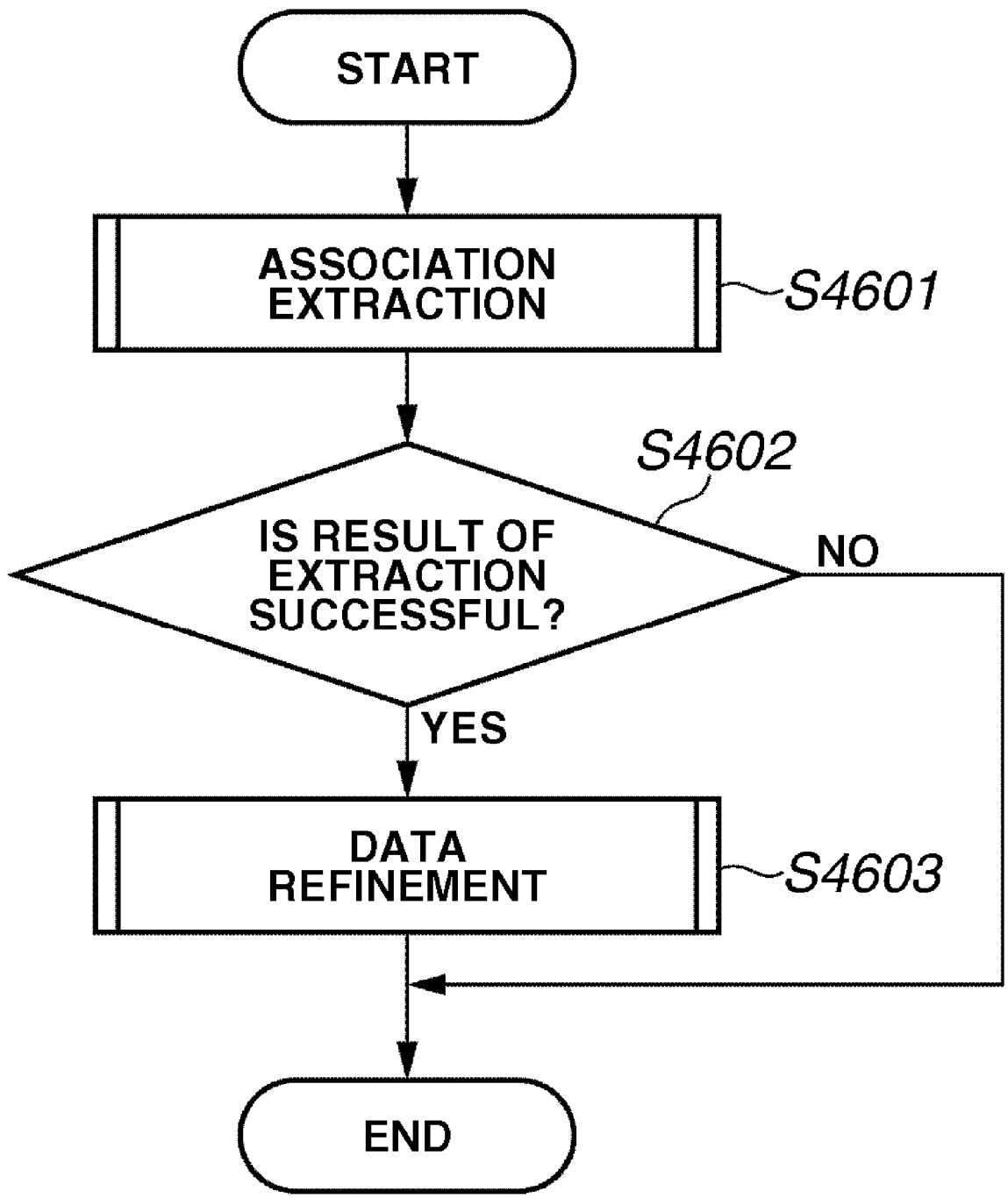
FIG. 46 is a flowchart illustrating an example of an operation association process.

FIG. 46 is a flowchart illustrating an example of the operation association process. The process shown in FIG. 46 is described below being assumed to be performed by the operation association unit 4e of the scanned document interpretation unit 49 shown in FIG. 4.

In step S4601, the operation association unit 4e performs an association extraction process to extract information on the association between a handwritten command and an operation from a handwritten command association instruction (for example, the handwritten command association instruction 423 shown in FIG. 42) written on the scanned document. Subsequently, in step S4602, the operation association unit 4e determines whether extraction of information on the association, which is performed in step S4601, is successful. If the operation association unit 4e determines that the extraction of information on the association, which is performed in step S4601, is successful, the processing advances to step S4603. If the operation association unit 4e determines that the extraction of information on the association, which is performed in step S4601, is not successful, the operation association process ends.

In step S4603, the operation association unit 4e performs a data refinement process to refine the combination between the handwritten command and the operation from information on the association extracted in step S4601.

Figure 47:
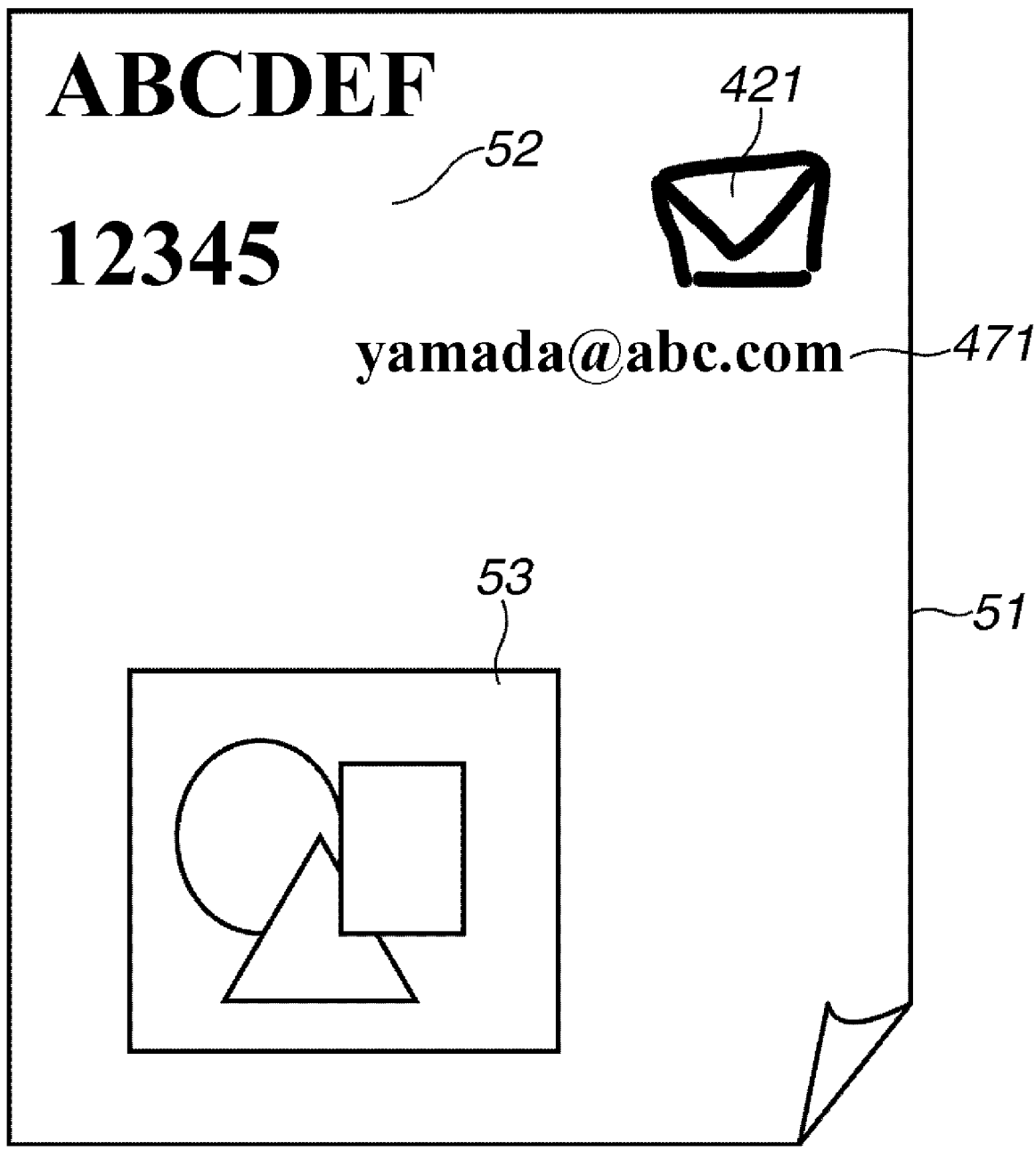
FIG. 47 is a diagram illustrating an example of a document on which a handwritten command is written and in which an electronic watermark representing operation content is embedded.

FIG. 47 is a diagram illustrating an example of a document on which a handwritten command is written and is which an electronic watermark representing operation content is embedded. A document 51 shown in FIG. 47 includes a text region 52 and an image region 53. Also, a handwritten command 421 is written on the document 51. Electronic watermark operation content 471 is embedded in the document 51. Although not shown in FIG. 4, the display apparatus 23 can have a print unit, which is adapted to print, as a functional component. Thus, the document 51 shown in, for example, FIG. 47 can be printed or output. Alternatively, data to be printed can be output to the image forming apparatus 22.

In a case where data representing operation content is embedded in the document as an electronic watermark, for example, the operation specification unit 4d recognizes the electronic watermark embedded in the document in the operation specification process illustrated in FIG. 45. The operation specification unit 4d extracts data corresponding to the recognized electronic watermark from the scanned document. The data corresponding thereto is, for example, the electronic watermark operation content 471 shown in FIG. 47.

Figure 48:
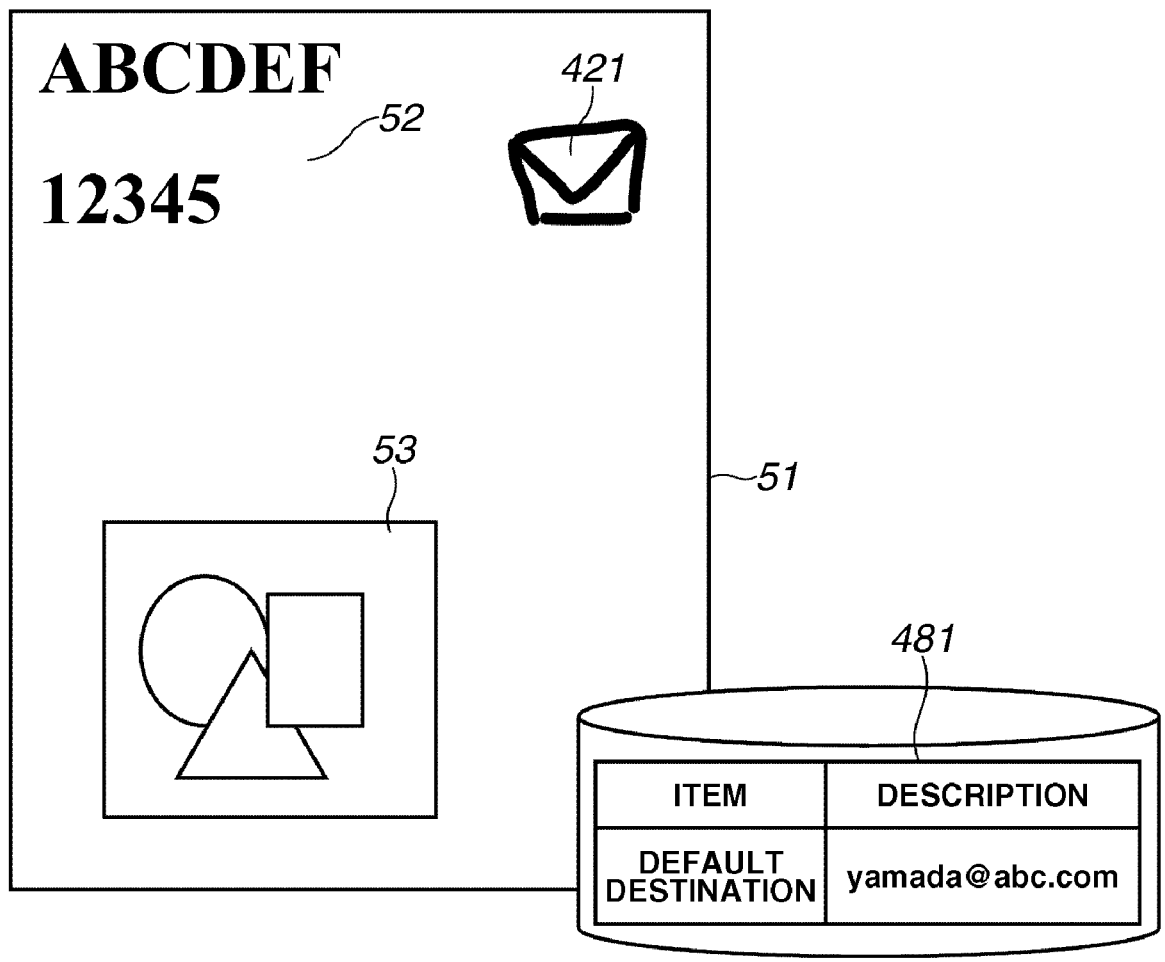
FIG. 48 is a diagram illustrating an example of each of a document on which a handwritten command is written and definition data used by a user to define an operation corresponding to the document or the handwritten command via an input unit.

FIG. 48 is a diagram illustrating an example of each of a document on which a handwritten command is written and definition data used by a user to define an operation corresponding to the document or the handwritten command through an input unit. A document 51 shown in FIG. 48 includes a text region 52 and an image region 53. Also, a handwritten command 421 is written on the document 51. A user defines definition data 481, which defines an operation, corresponding to the document 51 or the handwritten command 421 shown in FIG. 48 in the display apparatus 23, for example, when the document 51 is read into the display apparatus 23.

As described above, according to the sixth exemplary embodiment, the display apparatus 23 associates the handwritten command (or the GUI component) with the operation content, based on the handwritten command, the handwritten operation content, and the handwritten command association instruction written on the document. Thus, the operability with respect to document data representing a currently displayed document can be enhanced.

According to the sixth exemplary embodiment, the display apparatus 23 associates the handwritten command written on the document with the operation content corresponding to the handwritten command embedded therein by using an electronic watermark. Thus, the operability with respect to document data representing a currently displayed document can be enhanced.

According to the sixth exemplary embodiment, the display apparatus 23 associates the handwritten command (or GUI component) with the operation content, based on the handwritten command written on the document and definition data defining the operation content by a user through the input unit. Thus, the operability with respect to document data representing a currently displayed document can be enhanced.

Seventh Exemplary Embodiment

Figure 49:
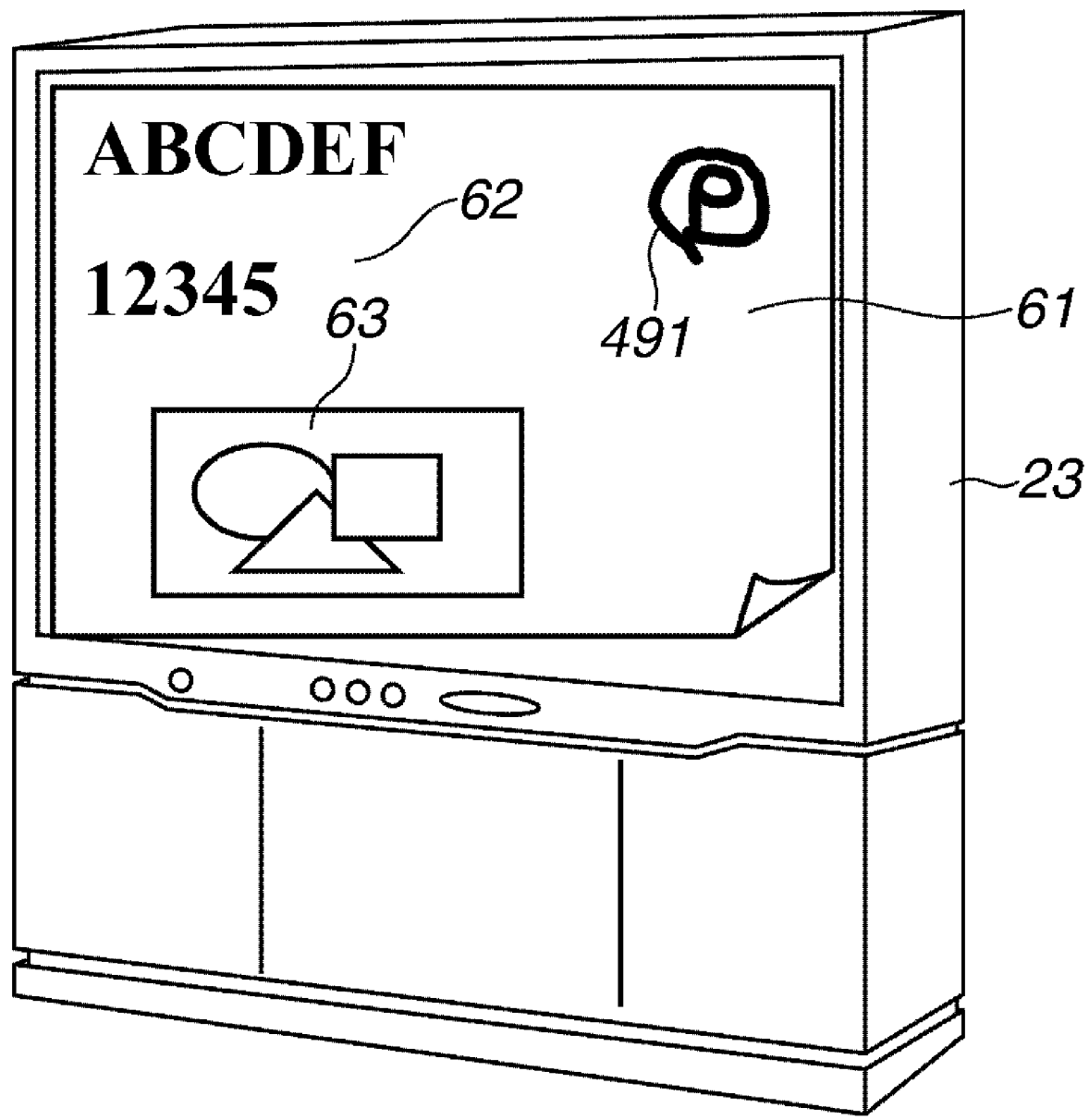
FIG. 49 is a diagram illustrating an example of a display screen image displayed in a display apparatus having a digitizer.
Figure 50:
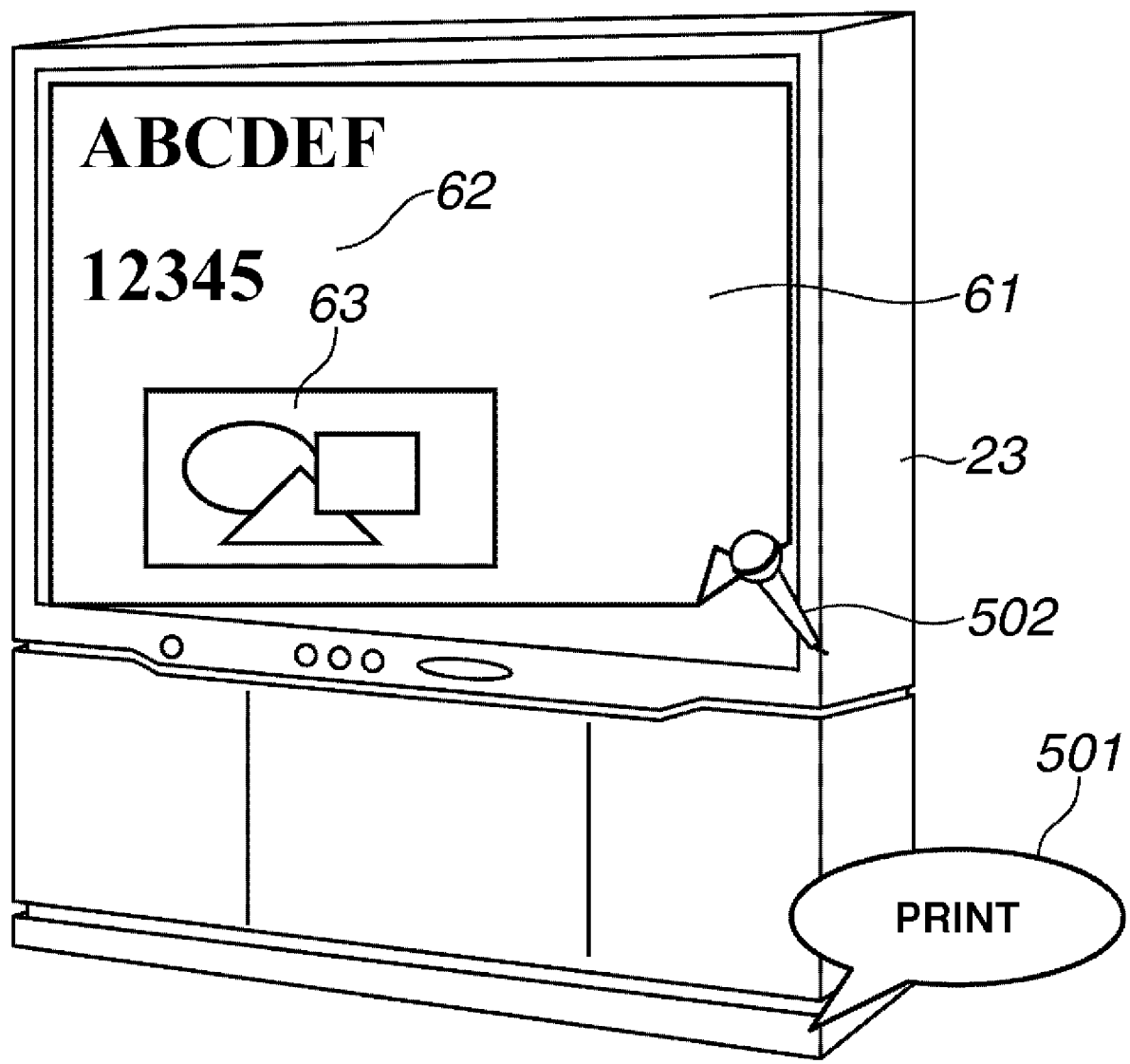
FIG. 50 is a diagram illustrating an example of a display screen image displayed in a display apparatus having a microphone.
Figure 51:
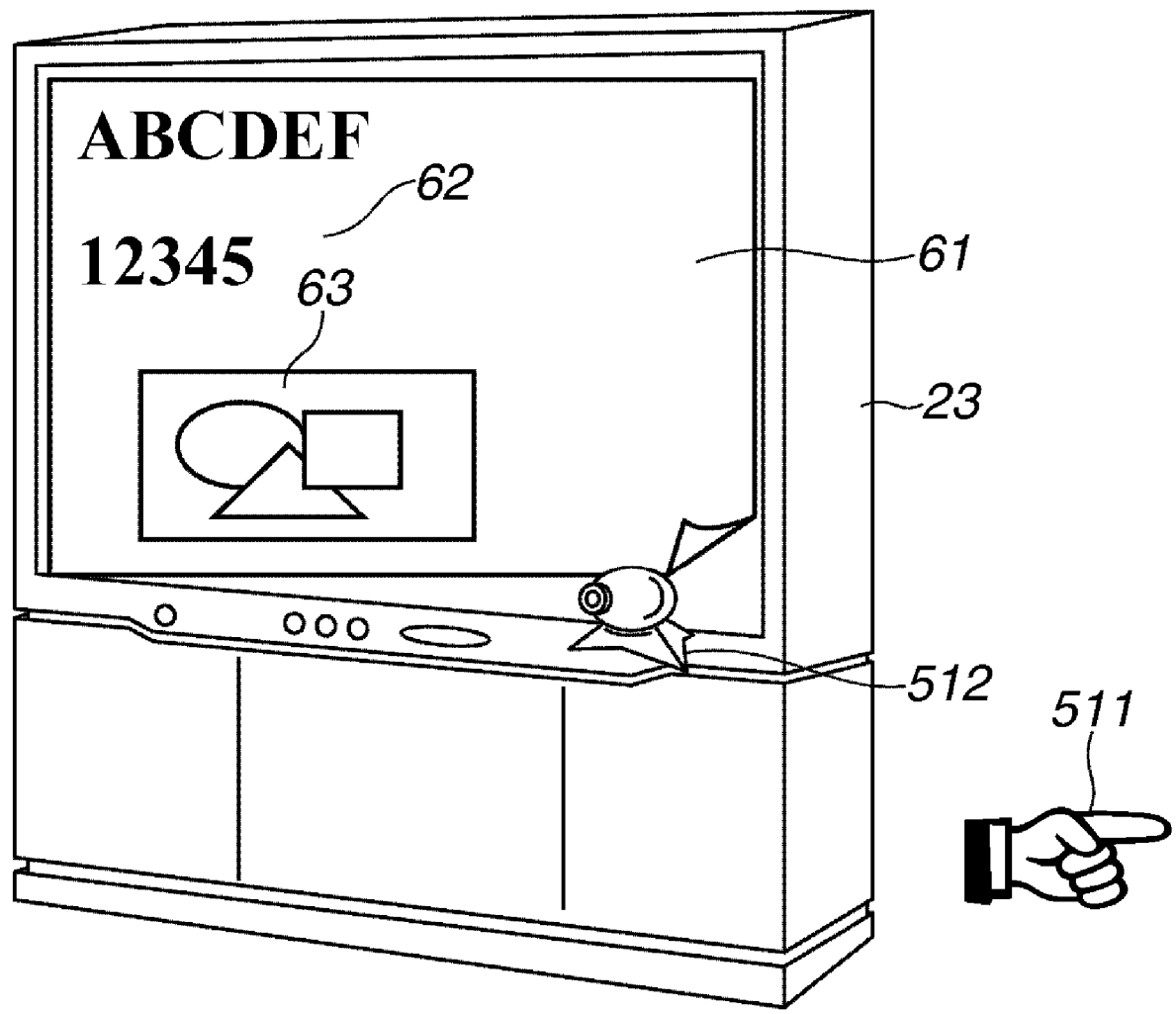
FIG. 51 is a diagram illustrating an example of a display screen image displayed in a display apparatus having a camera.

A seventh exemplary embodiment, in which the display apparatus 23 creates a GUI component according to data other than a handwritten command written on a scanned document, is described by referring to FIGS. 49 to 51.

FIG. 49 is a diagram illustrating an example of a display screen image displayed in the display apparatus 23 having a digitizer. A handwritten command 491 is written by performing a pen input operation on the display screen using the digitizer (coordinate input apparatus). Thus, an operation similar to those performed in the above-described exemplary embodiments can be achieved.

FIG. 50 is a diagram illustrating an example of a display screen image displayed in the display apparatus 23 having a microphone. A voice command 501 is written to the display apparatus 23 by performing a voice input operation using a microphone 502. Thus, an operation similar to those performed in the above-described exemplary embodiments can be achieved. To cause the display apparatus 23 to specify the relative display position and the size of the GUI component, similarly to the above-described exemplary embodiments, a user can issue a corresponding instruction using voice.

FIG. 51 is a diagram illustrating an example of a display screen image displayed in the display apparatus 23 having a camera. A gesture command 511 is written to the display apparatus 23 by performing an image input operation using a camera 512. Thus, an operation similar to those performed in the above-described exemplary embodiments can be achieved. To cause the display apparatus 23 to specify the relative display position and the size of the GUI component, similarly to the above-described exemplary embodiments, a user can issue a corresponding instruction by performing a gesture.

As described above, according to the seventh exemplary embodiment, the display apparatus 23 can perform operations, such as the creation and the display of a GUI component, similar to those performed in the above-described exemplary embodiments, based on a handwritten command input by performing a pen input operation. Thus, the operability with respect to document data representing a currently displayed document can be enhanced.

According to the seventh exemplary embodiment, the display apparatus 23 can perform operations, such as the creation and the display of a GUI component, similar to those performed in the above-described exemplary embodiments, based on a voice command input by using a microphone. Thus, the operability with respect to document data representing a currently displayed document can be enhanced.

According to the seventh exemplary embodiment, the display apparatus 23 can perform operations, such as the creation and the display of a GUI component, similar to those performed in the above-described exemplary embodiments, based on a gesture command input by using a camera. Thus, the operability with respect to document data representing a currently displayed document can be enhanced.

Thus, as described above, according to the exemplary embodiments of the present invention, operability with respect to document data representing an image of a document, which is currently displayed, can be enhanced.

The present invention can be applied to a system including a plurality of devices (for example, a display device and a composite apparatus). Also, the present invention can be applied to a single apparatus device (for example, a display device having a scanning function, a multifunction peripheral having a display unit, such as a monitor, or a multifunction peripheral capable of displaying a scanned document on a touch panel).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-261126 filed Sep. 8, 2005, which is hereby incorporated by reference herein in its entirety.

What is claimed is:

1. A method for displaying a scanned document comprising:
   scanning a paper document that includes a text region, an image region and a handwritten command and generating a scanned document;
   interpreting the handwritten command in the paper document;
   determining a relative position and size of the handwritten command in the paper document and creating a graphical user interface (GUI) component in the scanned document that corresponds to the handwritten command and has the determined relative position and size;
   determining an instruction that corresponds to the GUI component and displaying the scanned document including the text region, the image region and the GUI component; and
   executing the determined instruction when a user performs an operation on the GUI component.

2. An information processing apparatus, comprising:
   a display;
   a central processing unit;
   an image forming apparatus configured to scan a paper document that includes a text region, an image region and a handwritten command and to generate a scanned document;
   a scanned document interpretation unit configured to interpret the handwritten command in the paper document;
   a graphical user interface (GUI) component creation unit configured to determine a relative position and size of the handwritten command in the paper document and to create a GUI component in the scanned document that corresponds to the handwritten command and has the determined relative position and size;
   a scanned document display unit configured to determine an instruction that corresponds to the GUI component and to display the scanned document including the text region, the image region and the GUI component; and
   an execution unit configured to execute the determined instruction when a user performs an operation on the GUI component.

3. A non-transitory computer-readable storage medium storing computer-readable instructions for performing a method for displaying a scanned document, the method comprising:
   scanning a paper document that includes a text region, an image region and a handwritten command and generating a scanned document;
   interpreting the handwritten command in the paper document;
   determining a relative position and size of the handwritten command in the paper document and creating a graphical user interface (GUI) component in the scanned document that corresponds to the handwritten command and has the determined relative position and size;
   determining an instruction that corresponds to the GUI component and displaying the scanned document including the text region, the image region and the GUI component; and
   executing the determined instruction when a user performs an operation on the GUI component.

* * * * *